(12) United States Patent
Cohen et al.

(10) Patent No.: US 7,673,340 B1
(45) Date of Patent: Mar. 2, 2010

(54) SYSTEM AND METHOD FOR ANALYZING SYSTEM USER BEHAVIOR

(75) Inventors: Tal Cohen, Tucker, GA (US); Nissim Harel, Tucker, GA (US); Dean Jerding, Roswell, GA (US)

(73) Assignee: Clickfox LLC, Atlanta, GA (US)

( * ) Notice: Subject to any disclaimer, the term of this patent is extended or adjusted under 35 U.S.C. 154(b) by 1308 days.

(21) Appl. No.: 11/143,778

(22) Filed: Jun. 2, 2005

Related U.S. Application Data

(60) Provisional application No. 60/576,220, filed on Jun. 2, 2004.

(51) Int. Cl.
   *G06F 11/30* (2006.01)
(52) U.S. Cl. .................................. 726/22; 379/266.08
(58) Field of Classification Search ............ 379/266.08; 726/22
   See application file for complete search history.

(56) References Cited

U.S. PATENT DOCUMENTS

| | | | |
|---|---|---|---|
| 2003/0115333 A1* | 6/2003 | Cohen et al. | 709/227 |
| 2005/0183143 A1* | 8/2005 | Anderholm et al. | 726/22 |
| 2006/0235280 A1* | 10/2006 | Vonk et al. | 600/300 |

* cited by examiner

*Primary Examiner*—Creighton Smith
(74) *Attorney, Agent, or Firm*—Troutman Sanders LLP; James E. Schutz

(57) ABSTRACT

A system and method for monitoring and analyzing user activity of an interactive system, providing insight and recommendations to improve the interactive system based on the user activity. The present invention analyzes user behavior in the context of the structure of the interactive system as experienced by the user, the analysis of business-critical user tasks, the automated generation of recommendations for improving the interactive system, reports on the interactive system's application logic and data, unique visualizations of user behavior through the use of graphical displays, and secure report viewing and creation. The present invention can be applied to number of interactive systems or a combination thereof.

4 Claims, 44 Drawing Sheets

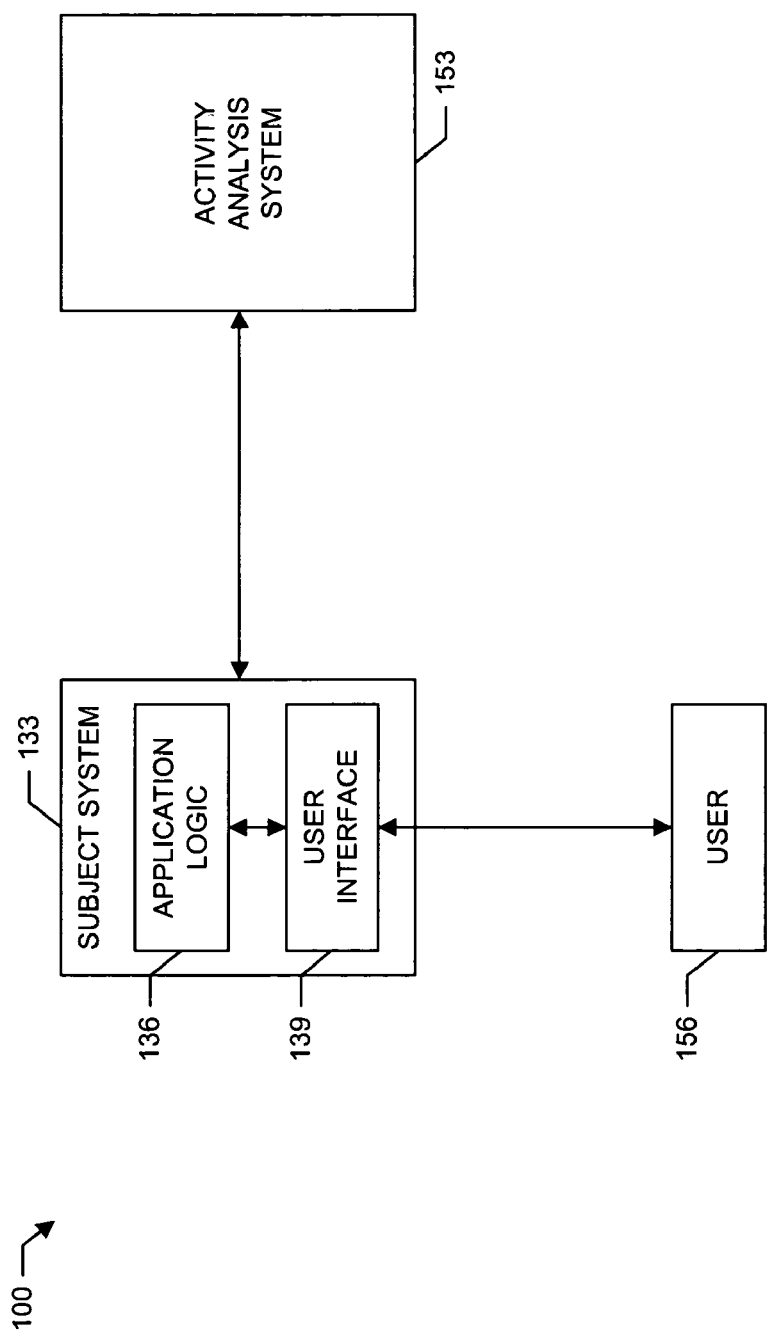

Un-ordered Task Occurrences task reports shown in the legend
accompanying each table.

Back to Top

Ranking

Completed Both Tasks in Call

| | Completed Task A | Also Completed Task B | Calls Completing Both | % of Task A Completions | % of Task B Completions |
|---|---|---|---|---|---|
| (1) | BackOffMenuToFunnels | MainMenuToFunnels | 2,856 | 100% | 10.0% |
| (2) | BillingAndPaymentsDisambigFunnel | MainMenuToFunnels | 1,917 | 100% | 6.7% |
| (3) | BackOffMenuToFunnels | BillingAndPaymentsDisambigFunnel | 497 | 17.4% | 25.9% |
| (4) | BackOffMenuToErrorToErrorDirect | MainMenuToFunnels | 131 | 20.5% | 0.5% |
| (5) | BackOffMenuToErrorToErrorDirect | BackOffMenuToFunnels | 89 | 13.9% | 3.1% |
| (6) | BackOffMenuToErrorToErrorDirect | BillingAndPaymentsDisambigFunnel | 18 | 2.8% | 0.9% |

Likelihood to Complete Both Tasks in Call

| | If Completed Task A | % of Calls | Who Also Completed Task B |
|---|---|---|---|
| (1) | BackOffMenuToFunnels | 100% | MainMenuToFunnels |
| (2) | BillingAndPaymentsDisambigFunnel | 100% | MainMenuToFunnels |
| (3) | BillingAndPaymentsDisambigFunnel | 25.9% | BackOffMenuToFunnels |
| (4) | BackOffMenuToErrorToErrorDirect | 20.5% | MainMenuToFunnels |
| (5) | BackOffMenuToFunnels | 17.4% | BillingAndPaymentsDisambigFunnel |
| (6) | BackOffMenuToErrorToErrorDirect | 13.9% | BackOffMenuToFunnels |
| (7) | MainMenuToFunnels | 10.0% | BackOffMenuToFunnels |
| (8) | MainMenuToFunnels | 6.7% | BillingAndPaymentsDisambigFunnel |
| (9) | BackOffMenuToFunnels | 3.1% | BackOffMenuToErrorToErrorDirect |
| (10) | BackOffMenuToErrorToErrorDirect | 2.8% | BillingAndPaymentsDisambigFunnel |
| (11) | BillingAndPaymentsDisambigFunnel | 0.9% | BackOffMenuToErrorToErrorDirect |

FIG. 26C

SYSTEM AND METHOD FOR ANALYZING SYSTEM USER BEHAVIOR

CROSS REFERENCE TO RELATED APPLICATION

This application claims the benefit of U.S. Provisional Application 60/576,220, filed on Jun. 2, 2004 and entitled, "SYSTEM AND METHOD FOR OPTIMIZING AN INTERACTIVE SYSTEM BY ANALYZING USER BEHAVIOR."

TECHNICAL FIELD

This invention provides a unique system and method for analyzing a user's behavior while interacting with a system, comparing expected user behavior with observed user behavior, and discovering anomalies or trends in the user's behavior. The discoveries can be used to alter the system's structure to better facilitate user tasks. The invention can be applied to user interactions across various systems or domains where the system structure can be modeled and the user interaction recorded.

BACKGROUND OF THE INVENTION

Customer service centers and other customer-oriented businesses have sought ways to increase the productivity of customer service agents or provide products or services to customers through more automated mechanisms. Accordingly, customer-oriented businesses have invested significant resources in developing interactive systems to provide certain services to customers. Such self-service systems permit customers to perform desired tasks, while not requiring the help of a customer service agent. Such interactive systems include interactive voice response (IVR) systems (both dual tone multi-frequency (DTMF) and speech recognition), web sites and applications, customer relationship management (CRM) systems, enterprise resource planning (ERP) systems, sales force automation (SFA) systems, and kiosks.

Generally, these interactive systems are designed with user interfaces that provide a variety of options and functionality. Unfortunately, there is no effective way of evaluating whether the user interface is designed in the most efficient and advantageous manner. The task is difficult, because each customer or user of the interactive system may be trying to accomplish different goals.

Using the IVR domain as an example, many customer-oriented businesses have implemented IVR technology as a solution to resolve routine customer service tasks, thereby reducing the number of tasks requiring human customer service interaction. Such IVR systems can save significant dollars for customer service centers. IVR systems are capable of handling simple problems while siphoning the more complex customer service calls to live agents. In the late 1990s, many companies began to take advantage of a newer technology—the Internet—to provide an additional self-service option to their customers.

Though many companies have developed self-service web applications, the Gartner Group states that 92% of all customer interactions still take place over the telephone. In fact, customers are three times more likely to call a toll-free 800 number than use self-service web applications. Further, using new technologies such as speech recognition, today's IVR systems have the potential to allow organizations to automate a wide variety of complex customer interaction tasks at a much lower cost than an agent-handled transaction. Despite these advantages, IVR systems have been often ignored in favor of the Internet and outsourced call centers.

Overall, IVR trails all other interactive channels in customer satisfaction levels. This phenomenon is a by-product of many factors, including the fact that users' experiences within the IVR system are virtually invisible and often poorly understood. Additionally, IVR systems must balance ease-of-use with the economic need to allow users to accomplish increasingly complex tasks. To further complicate the situation, there is a greater risk of errors in the system design and programming of IVR system than any other channel.

One significant problem with IVR system efficiency is that when an IVR system does not meet a customer's expectations, he become frustrated and hangs up or "zeros out" to a live agent. Currently, IVR systems must rely on predictors of behavior (e.g. customer demographics, psychographics, purchasing histories) in order to design tasks and experiences that are aligned with user needs. In addition, companies use indicators of behavior (e.g. sales reports, transaction logs, call logs) to make a best guess as to why the IVR is not meeting customers' needs. Companies are not using actual methodology or technology to pinpoint what part of the system needs to be modified, in what way, and why.

A key component to IVR success is to measure how customers use the system and to align these usage patterns with the business objectives for the system. These items can be used to continuously modify and evolve the IVR to maximize cost savings and customer satisfaction. When customers complete their tasks quickly and successfully without having to wait in a queue, they are happier and require the assistance of a live agent less often. The result—if customers are successful in an automated, interactive channel, the company can quickly realize substantial cost savings.

According to Forrester Research, customer satisfaction levels with IVR systems fall in the 10% range, compared with a satisfaction rate of approximately 80% for face-to-face interactions. This is not just a customer relations issue—it's a financial problem.

Consider this conservative example:
  A company receives 50,000 customer calls each day.
  20% zero out to live agents.
  Each live agent call costs $10.

In this example, the company is spending $100,000 each day to have live agents unnecessarily complete simple customer transactions. In many instances, customers are unable to accomplish their task via IVR systems. This could be for one of two reasons. First, they call the IVR with a particular task in mind and the system is not set up to handle that task. Second, the IVR is set up to handle the task, but the customer finds the system difficult to use, confusing or incomplete. The customer then chooses to zero out to a live agent—or worse—ceases to engage with the company altogether.

One reason why so many customers do not find their task options available on the IVR, or have a difficult time using the system even if the task is there, is because companies often fail to take into account three factors when designing an IVR system—business objectives, user objectives and business environment dynamics. A business objective is what the organization wants to accomplish via the IVR system and must be articulated as a user outcome in the IVR. User objectives are what the customers hope to accomplish via the IVR system. These may overlap with the business objectives, but often the user has goals that the IVR designers did not take into account, or chose not to put into the IVR for business reasons. Business environment factors include the competition, market conditions and awareness of market desires. Many times, the data conundrum gets in the way of this alignment. Predictors do not tell companies what users are attempting to do. Business outcomes only show the successes or failures at the end of the user experience. What is missing is a measurement that exposes user goals, needs and wants. Only then can organizations align their business goals with the objectives of their users.

Accordingly, there is a need in the art for a system and method for monitoring user activity of an interactive system.

Additionally, there is a need in the art for a system and method for providing recommendations to improve an interactive system, based on the analysis of user activity.

Further, there is a need in the art for a system and method for generating reports regarding the analysis of user activity, so that further modifications can be made to the interactive system.

Also, there is a need in the art for a system and method for monitoring user activity of an interactive system, without hindering users from using the interactive system.

Still further, there is a need in the art for a system and method for defining a task as a sequence of steps within the interactive system and for analyzing whether the defined task is being completed properly by users.

SUMMARY OF THE INVENTION

Generally described, the present invention comprises a system and method for monitoring and analyzing user activity of an interactive system, providing insight and recommendations to improve the interactive system based on the user activity. The present invention provides for analysis of user behavior in the context of the structure of the interactive system as experienced by the user, the analysis of business-critical user tasks, the automated generation of recommendations for improving the interactive system, reports on the interactive system's application logic and data, unique visualizations of user behavior through the use of graphical displays, and secure report viewing and creation. Because of the present invention's unique approach to modeling system structure and behavior, the present invention can be applied to any number of interactive systems, such as but not limited to the following: interactive voice response (IVR) systems—both DTMF & speech recognition, web sites and applications, customer relationship management (CRM) systems, enterprise resource planning (ERP) systems, sales force automation (SFA) systems, kiosks, and multi-channel analysis which takes a holistic view of a subject system as a combination of multiple sub-systems of the aforementioned types, i.e., a company's web site and call center.

More specifically, the present invention comprises a system modeling unit to model the subject interactive system into one or more state machines (e.g., nodes and transitions). A logging unit is provided to collect and process event logs regarding the usage of the subject system, organized according to the log source that generated the behavior data such as a web server or interactive call system.

Further, the present invention includes a projects unit that identifies a set of state machines and log sources that are to be examined for analysis purposes. Then, a sessions unit identifies sessions of sequential user interaction with the subject system based on the log data and built in the context of the system model; sessions are constructed for the state machine graphs defined in a project by traversing the event log data and mapping the log entries onto the modeled states of the system (the nodes in the state machines), each session corresponding to the interactions of an individual user.

A reporting unit generates a variety of reports for the subject system based on the user activity expressed in the sessions and the system structure expressed in the graphs provided by the graphs unit. The present invention utilizes a tasks unit to define and analyze specific expected user behavior within the subject system, which can then be included in the reports. It also incorporates a rule engine unit to automatically generate recommendations for changes in the system structure to better facilitate user behavior, also included in the reports.

In operation, a user can interact with the user interface to define projects and generate reports that represent the monitored user activity of the subject system. Via a user interface, the reports can be generated and viewed. The reports generally include statistical data, charts and graphs, and recommendations. The recommendations suggest how to modify the subject system to better handle the user activity and to achieve the business objectives of the subject system. The data analyzed within the report can represent predefined tasks within the subject system, multiple sessions of a particular user, activity of a user across subject systems of different domains being analyzed, etc. The reports can then be used to improve the subject system to reach business objectives or to improve the experience of the user.

These and other objects, features and advantages of the present invention will become more apparent upon reading the following specification in conjunction with the accompanying drawings.

BRIEF DESCRIPTION OF DRAWINGS

FIGS. 1A-1B display block diagram representations of an environment, including a network environment, which may be utilized in accordance with some embodiments of the present invention.

FIGS. 26A-26C, collectively known as FIG. 26, display screenshots of a cross task overview view of the cross task topic, illustrating an HTML display, in accordance with some embodiments of the present invention.

DETAILED DESCRIPTION OF THE INVENTION

Figure 1B:
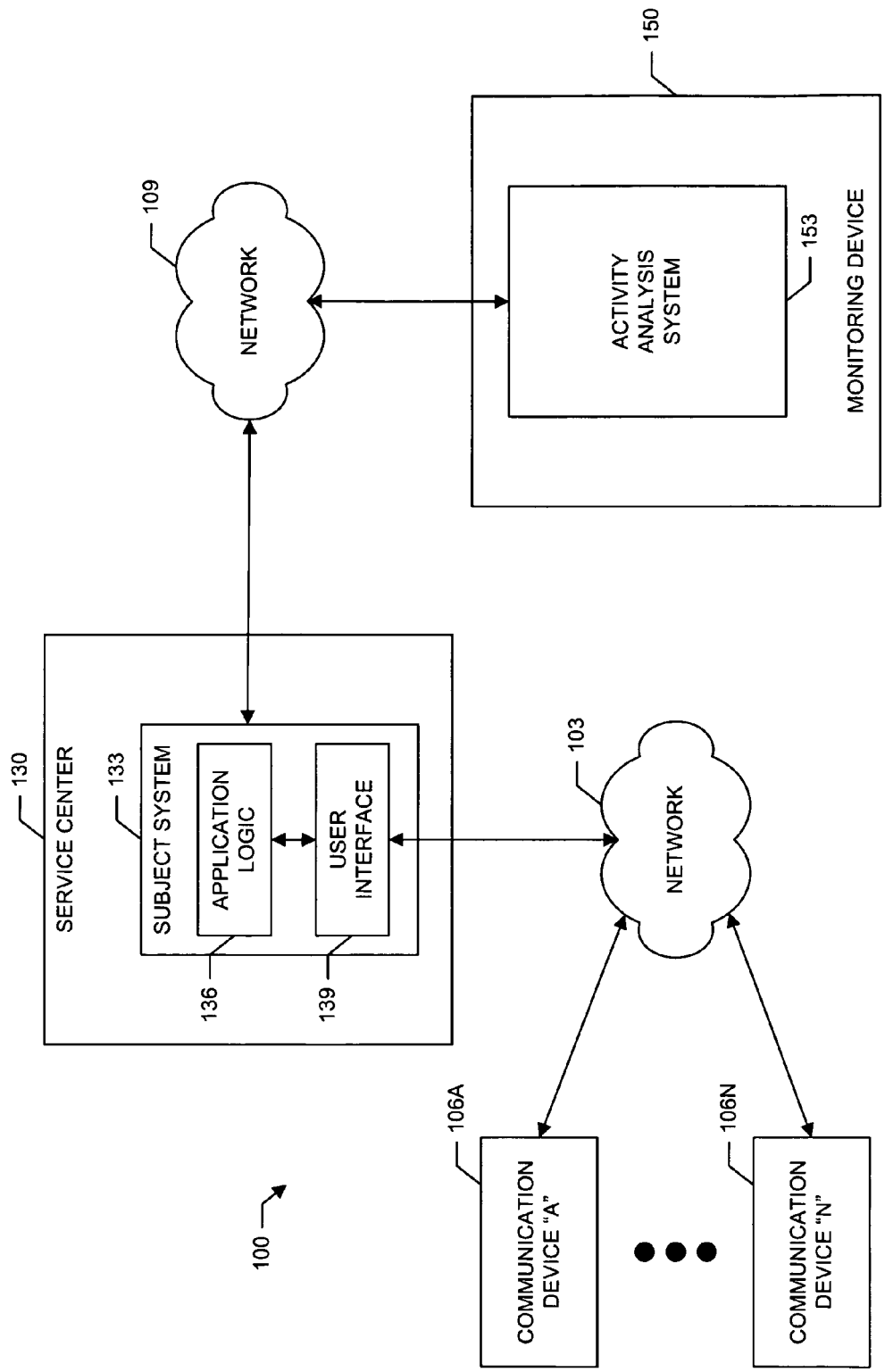

Referring now to the drawings, in which like numerals represent like components or steps throughout the several views, FIGS. 1A-1B display block diagram representations of an environment 100, including a network environment, which may be utilized in accordance with some embodiments of the present invention. The environment 100 comprises a user 156, a subject system 133, and an activity analysis system 153.

Generally, the subject system 133 comprises software modules adapted to perform varying functionality during interaction of a user via a communication device 106. Accordingly, the subject system 133 includes a user interface 139 for interacting with a user accessing the subject system 133 and application logic 136 for properly implementing the offered functionality of the user interface 139. One skilled in the art will recognize that the subject system 133 of the service center 130 can embody a variety of interactive systems. Such interactive systems include, but are not limited to, interactive voice response (IVR) systems (both dual tone multi-frequency (DTMF) and speech recognition), web sites and applications, customer relationship management (CRM) systems, enterprise resource planning (ERP) systems, sales force automation (SFA) systems, kiosks, and other similar systems. The subject system 133 may also be a combination of multiple interactive sub-systems such as those mentioned above, thereby interacting with the user via multiple channels—each with their own system made up of a user interface and application logic. In such a case, the activity analysis system 153 would be analyzing multiple sub-subject systems 133 internal to the holistic subject system 133 representing the entire system of multiple channels.

The activity analysis system 153 is adapted to analyze and/or monitor user activity of the subject system 133. The activity analysis system 153, therefore, comprises software modules and hardware for performing the functionality and operational characteristics described herein. Upon the analyzing of user activity of the subject system 133, the activity analysis system 153 can provide recommendations for modifying or altering the subject system 133, such as recommending improvements to the user interface 139 and corresponding application logic 139.

In operation, the activity analysis system 153 analyzes interaction of the user 156 with the subject system 133 in the context of that subject system's 133 structure, reporting on the behavior of the users and how the structure of the subject system 133 can be improved to better facilitate the goals of the users and the goals of the subject system's 133 designers. Through a generic approach to modeling the subject system 133, described more fully below, and user behavior of the subject systems 133, the activity analysis system 153 can be applied in many different subject system 133 domains. Additionally, the activity analysis system 153 can analyze user behavior across multiple domains through several related systems. For example, the activity analysis system 153 can follow a user from web self-service to an IVR system to a CRM application, analyzing user behavior across different channels. While several example domains may be discussed within the description, one skilled in the art will recognize that the present invention can be adapted for use with a variety of domains.

Users 156 of many interactive systems are human, including those users described above in the provided examples. Those skilled in the art will recognize, however, that the activity analysis system 153 can be used to analyze system behavior when the user 156 of the system is not human. For example, the subject system 133 might be a traffic management system where the users 156 are vehicles on a road, or a network management system where the users are various network devices.

Generally, the activity analysis system 153 is designed and implemented with software modules using the object-oriented paradigm and, therefore, components described herein can map to interfaces, classes, and objects in the implementation language. As described more fully below, the activity analysis system 153 allows an analyst to model the subject system 133, provide event trace logs for analysis, create the data that fuses the structural model and behavior, and define, execute and view reports based on the data.

The subject system 133 and the activity analysis system 153 need not be in communication with each other or may communicate with each other indirectly. Additionally, the activity analysis system 153 and the subject system 133 may communicate with each other through a network environment, as illustrated in FIG. 1B. In an embodiment of the present invention, the network environment comprises a service center 130 and a number of communication devices 106A-106N connected together via a communication network 103 (i.e., also referred to herein as a "network 103"). One skilled in the art will recognize that the network 103 typically contains the infrastructure and facilities appropriate to connect a group of two or more communication devices 106A-106N (including, without limitation, a number of computer systems in communication with each other), along with the service center 130.

The network 103, service center 130, and communication devices 106A-106N may be configured in multiple network topologies including, but not limited to, star, bus, or ring configurations. Also, the network 103, service center 130, and communication devices 106A-106N may be broadly categorized as belonging to a particular architecture including, but not limited to, peer-to-peer or client/server architectures. The network 103 may additionally be classified by the geographical location of the service center 130 and the communication devices 106A-106N and the types thereof. For example, if the network 103 connects a number of computer systems or servers located in relatively close proximity to each other, such as within a building, the network 103 is referred to as a local-area network (LAN). If the computer systems are located farther apart, the network 103 is generally referred to as a wide-area network (WAN), such as the Internet. If the computer systems are located within a limited geographical area, such as a university campus or military establishment, the network 103 is referred to as a campus-area network (CAN). Similarly, if the computer systems are connected together within a city or town, the network 103 is referred to as a metropolitan-area network (MAN). Finally, if the computer systems are connected together within a user's home, the network 103 is referred to as a home-area network (HAN).

The number of communication devices 106A-106N within the network environment 100 may vary depending on the requirements or configuration of the service center 130. In one embodiment of the present invention, the number of communication devices 106A-106N corresponds to the number of visitors (also referred to herein as "users") utilizing the service center 130 via the network 103.

The service center 130 and each communication device 106A-106N, through use of a network interface and other appropriate hardware and software components, connect to the network 103 for bi-directional communication of signals and data therewith and, therefore, connect communicatively to each other for the bi-directional communication of signals and data therewith.

The network environment 100 further comprises a monitoring device 150 in communication with the service center 130 through a second communication network 109 (also referred to herein as "network 109"). The second network 109 functions and is generally configured similarly to network 103. One skilled in the art will recognize that network 103 and network 109 may be the same communication network, or may be separate communication networks, each having a different configuration. For example, and not limitation, network 103 may be configured as a WAN that permits communication devices 106A-106N to communicate with service center 130, while network 109 may be configured as a LAN that only permits authorized access by monitoring device 150.

In an embodiment of the present invention, the service center 130 includes the subject system 133 accessible by the communication devices 106A-106N. Additionally, the monitoring device 150 comprises the activity analysis system 153. Accordingly, the monitoring device 150 and the service center 130 are in communication with each other to facilitate the operation of the activity analysis system 153.

One skilled in the art will recognize that elements of the network environment 100, discussed above, may be connected through any appropriate communication channels that allow for bi-directional communication of signals and/or data. Such communication channels include, but are not limited to, analog, digital, wired and wireless communication channels. The communication channels may be copper wire, optical fiber, radio frequency (RF), infrared, satellite, and the like.

Figure 2:
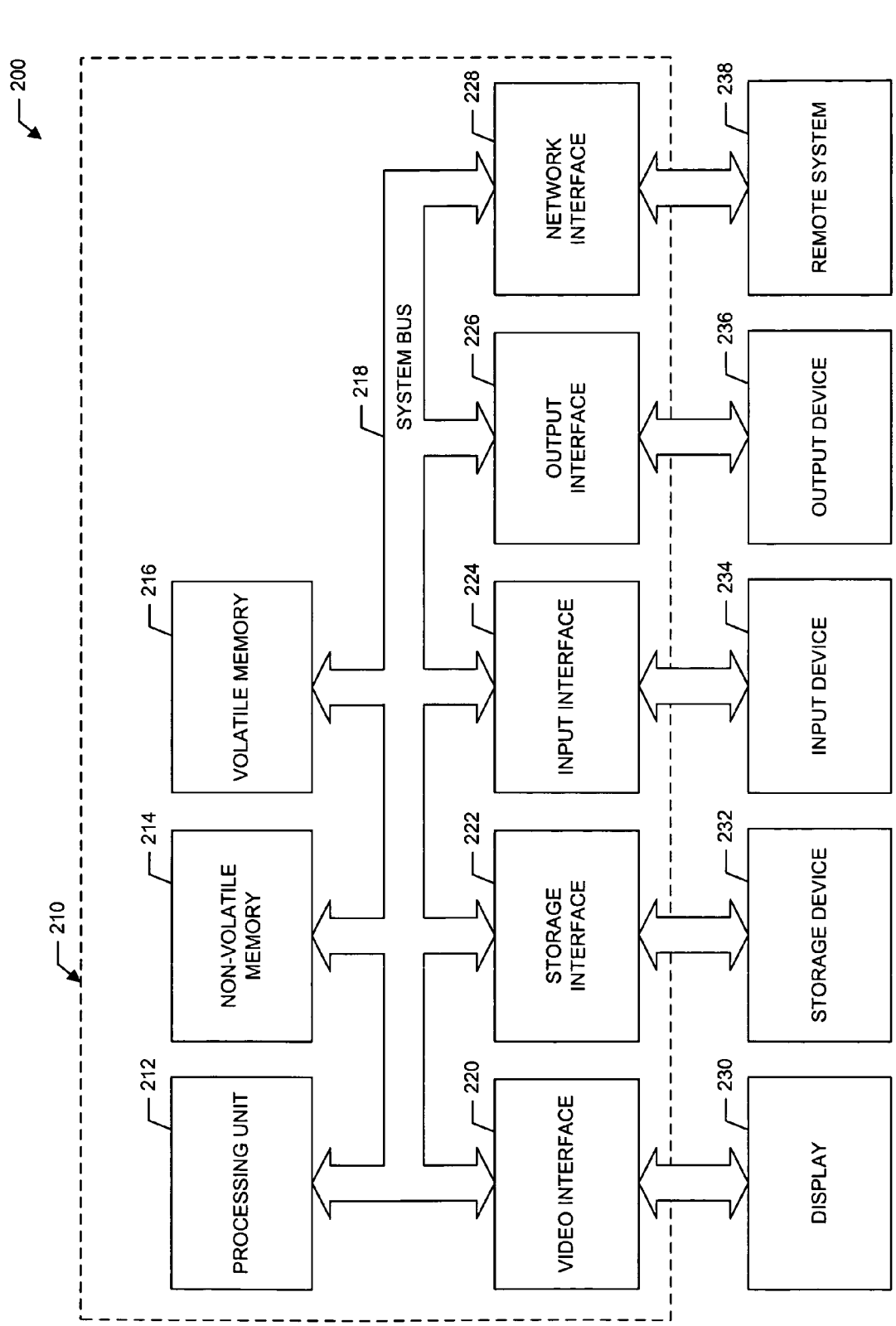
FIG. 2 displays a block diagram representation of a computing environment which may be utilized in accordance with some embodiments of the present invention.

FIG. 2 displays a block diagram representation of a computing environment 200 which may be utilized in accordance with some embodiments of the present invention. More particularly, the communication devices 106A-106N, service center 130, and monitoring device 150 may use the computing environment 200 described herein. The communication devices 106A-106N, service center 130, and monitoring device 150 of the network environment 100 may include, but are not limited to, personal computers, mainframe computers, servers, hand-held or laptop devices, multiprocessor systems, microprocessor-based systems, set-top boxes, programmable consumer electronics, network PCs, minicomputers, telephony devices, distributed computing environments that include any of the above systems or devices, and the like. It should be understood, however, that the features and aspects of the activity analysis system 153 may be implemented by or into a variety of systems and system configurations and any examples provided within this description are for illustrative purposes only.

FIG. 2 and the following discussion provide a general overview of a platform onto which an embodiment of the present invention, or portions thereof, may be integrated, implemented and/or executed. Although reference may be made to instructions within a software program being executed by a processing unit, those skilled in the art will understand that at least some of the functions performed by the software may also be implemented by using hardware components, state machines, or a combination of any of these techniques. In addition, a software program which may implement an embodiment of the present invention may also run as a stand-alone program or as a software module, routine, or function call, operating in conjunction with an operating system, another program, system call, interrupt routine, library routine, or the like. The term program module is used herein to refer to software programs, routines, functions, macros, data, data structures, or any set of machine readable instructions or object code, or software instructions that may be compiled into such, and executed by a processing unit 212.

Turning now to the figure, computing device 210 may comprise various components including, but not limited to, a processing unit 212, a non-volatile memory 214, a volatile memory 216, and a system bus 218. The non-volatile memory 214 may include a variety of memory types including, but not limited to, read only memory (ROM), electronically erasable read only memory (EEROM), electronically erasable and programmable read only memory (EEPROM), electronically programmable read only memory (EPROM), electronically alterable read only memory (EAROM), FLASH memory, bubble memory, battery backed random access memory (RAM), compact disc read only memory (CDROM), digital versatile disc (DVD), or other optical disk storage, magnetic cassettes, magnetic tape, magneto-optical storage devices, magnetic disk storage or other magnetic storage devices, or any other medium which may be used to store the desired information. The non-volatile memory 214 may provide storage for power-on and reset routines (bootstrap routines) that are invoked upon applying power or resetting the computing device 210. In some configurations the non-volatile memory 214 may provide the basic input/output system (BIOS) routines that are utilized to perform the transfer of information between elements within the various components of the computing device 210.

The volatile memory 216 may include a variety of memory types and devices including, but not limited to, random access memory (RAM), dynamic random access memory (DRAM), synchronous dynamic random access memory (SDRAM), double data rate synchronous dynamic random access memory (DDR-SDRAM), bubble memory, registers, or the like. The volatile memory 216 may provide temporary storage for routines, modules, functions, macros, data, etc. that are being or may be executed by, or are being accessed or modified by, the processing unit 212.

Alternatively, the non-volatile memory 214 and/or the volatile memory 216 may be a remote storage facility accessible through a distributed network system. Additionally, the non-volatile memory 214 and/or the volatile memory 216 may be a memory system comprising a multi-stage system of primary and secondary memory devices, as described above. The primary memory device and secondary memory device may operate as a cache for each other or the second memory device may serve as a backup to the primary memory device. In yet another embodiment, the non-volatile memory 214 and/or the volatile memory 216 may comprise a memory device configured as a simple database file or as a searchable, relational database using a query language, such as SQL.

The computing device 210 may access one or more external display devices 230 such as a CRT monitor, LCD panel, LED panel, electro-luminescent panel, or other display device, for the purpose of providing information or computing results to a user. In some embodiments, the external display device 230 may actually be incorporated into the product itself. For example, the computing device 210 may be a mobile device having a display device 230. The processing unit 212 may interface to each display device 230 through a video interface 220 coupled to the processing unit 210 over the system bus 218.

In operation, the computing device 210 sends output information to the display 230 and to one or more output devices 236 such as a speaker, modem, printer, plotter, facsimile machine, RF or infrared transmitter, computer or any other of a variety of devices that may be controlled by the computing device 210. The processing unit 212 may interface to each output device 236 through an output interface 226 coupled to the processing unit 212 over the system bus 218. The computing device 210 may receive input or commands from one or more input devices 234 such as, but not limited to, a keyboard, pointing device, mouse, modem, RF or infrared receiver, microphone, joystick, track ball, light pen, game pad, scanner, camera, computer or the like. The processing unit 212 may interface to each input device 234 through an input interface 224 coupled to the processing unit 212 over the system bus 218.

It will be appreciated that program modules implementing various embodiments of the present invention may be stored in the non-volatile memory 214, the volatile memory 216, or in a remote memory storage device accessible through the output interface 226 and the input interface 224. The program modules may include an operating system, application programs, other program modules, and program data. The processing unit 212 may access various portions of the program modules in response to the various instructions contained therein, as well as under the direction of events occurring or being received over the input interface 224.

The computing device 210 may provide data to and receive data from one or more other storage devices 232, which may provide volatile or non-volatile memory for storage and which may be accessed by computing device 210. The processing unit 212 may interface to each storage device 232 through a storage interface 222 over the system bus 218.

The interfaces 220, 222, 224, 226, and 228 may include one or more of a variety of interfaces, including but not limited to, cable modems, DSL, T1, T3, optical carrier (e.g., OC-3), V-series modems, an RS-232 serial port interface or other serial port interface, a parallel port interface, a universal serial bus (USB), a general purpose interface bus (GPIB), an optical interface such as infrared or IrDA, an RF or wireless interface such as Bluetooth, and the like.

Figure 3:
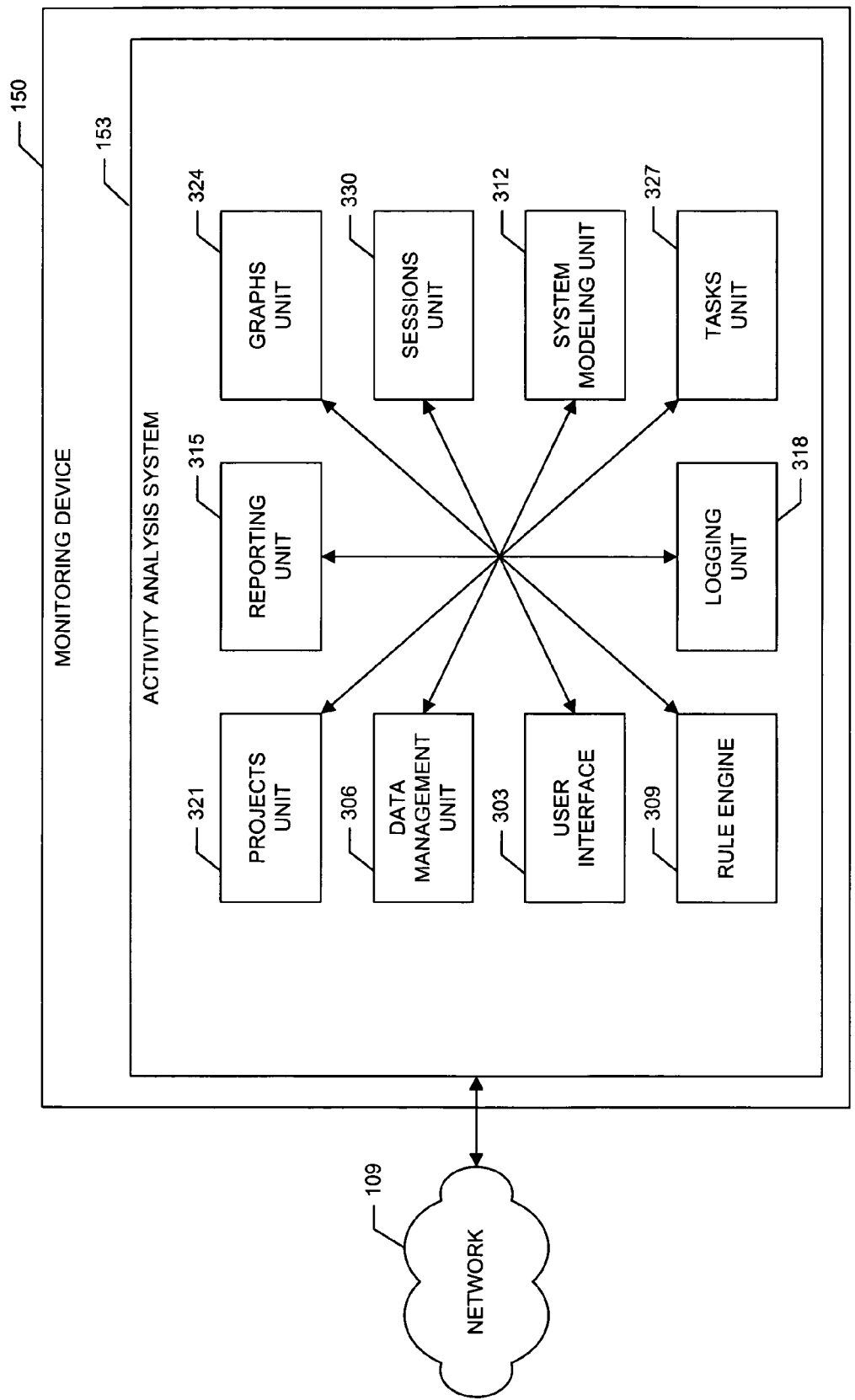
FIG. 3 displays a block diagram representation of an activity analysis system in accordance with some embodiments of the present invention.

FIG. 3 displays a block diagram representation of an activity analysis system 153 of the monitoring device 150 in accordance with some embodiments of the present invention. The activity analysis system 153 provides functionality though multiple components for monitoring and analyzing user activity of the subject system 133, so that reports and recommendations can be generated to improve the desired operation of the subject system 133. The activity analysis system 153 may comprise a system modeling unit 312, a logging unit 318, a projects unit 321, a graphs unit 324, a sessions unit 330, and a reporting unit 315, collectively referred to herein as components of the activity analysis system 153. Further, the activity analysis system 153 may comprise a tasks unit 327 and a rule engine 309 to be utilized by the reporting unit 315. As illustrated in FIG. 3, each component of the activity analysis system 153 is in communication with each other component of the activity analysis system 153 and, thereby, facilitates collective operation of the components within the activity analysis system 153.

The data storage unit 1109 may include a memory device capable of storing and retrieving data including, but not limited to, volatile memory 216 and/or non-volatile memory 214. The data storage unit 1109 is adapted to store data received by the subject system 133 or generated by various components of the activity analysis system 153. Accordingly, one skilled in the art will recognize that references to other storage devices or repositories within this description may be referring indirectly to the data storage unit 1109, but not necessarily.

The system modeling unit 312 is adapted to model the subject system 133 into one or more state machines. Generally, every interactive system, such as the subject system 133, can be decomposed into a user interface component 139 and a logic component 136. The user interface 139 is that part of the subject system 133 through which the user provides inputs and receives outputs. The application logic 136 is the part of the subject system 133 configured to perform the services of the subject system 133 and that interacts with the data layer, all in response to user input via the user interface 139. Typically, the system modeling unit 312 refers to the user interface 139 of the subject system 133 as the presentation model and the application logic 136 and data of the subject system 133 as the application model.

Both the presentation model and the application model can be represented by the system modeling unit 312 as a sequence of states and transitions between those states (also referred to herein as a "state machine 403"). As defined by the system modeling unit 312, state machines for the presentation model may be made up of states for each unit of interaction (e.g., page, screen, display, recorded audio message, etc.) provided by the user interface 139, with transitions indicating possible changes to another unit of interaction based on user input and the context or state of the subject system 133. For example, and not limitation, the subject system 133 may be an e-commerce web site that sells toys. A presentation model state machine for the e-toys web application can be created with a state for each page displayed in a web browser. State transitions correspond to the hyper-links between pages that the user can follow. As another example, the subject system 133 may be an automated teller machine (ATM) banking system. The user interface 139 of the ATM banking system is the set of screen displays the user can experience on the terminal, with transitions from one screen to another representing possible sequences of screen display based on the user input. In yet another example, the subject system 133 may be an IVR application. In an IVR application, the states can be different menus or prompts read to the caller and transitions are the possible actions a user can take by pressing a button on their telephone or by speaking a predetermined command.

The system modeling unit 312 creates state machines for the application model that include states that the application logic 136 of the subject system 133 attains during the process of providing services to the user. Additionally, the application model includes sources of data relevant to the application logic 136. Revisiting the e-toys web site example, one application model may correspond to a shopping cart service. The shopping cart state machine generated by the system modeling unit 312 has states for "view cart," "add items to cart," "checkout," and "confirm order." The external data driving the cart includes information about which customers of the subject system 133 purchased particular products. For the ATM example, the application model includes states such as "balance inquiry," "withdrawal," and "deposit." Further, in the IVR system, an application model is used to track the user input spoken by users and keep data regarding a speech recognition engine.

The system modeling unit 312 recognizes the relationship between the presentation model state machine(s) and the application model state machine(s) for the subject system 133. This relationship depends on the subject system 133 and the way in which the application models are defined in the activity analysis system 153. There often exists a set/sub-set relationship, where a state in the application model corresponds to one or more states in the presentation model. Using the e-toys web site example, the "checkout" application model state corresponds to the specific checkout pages in the web site user interface 139 that allow the user to checkout.

Further, the system modeling unit 312 can combine several state machines, both presentation models and application models, as a single model within the activity analysis system 153. For example, a subject system 133 utilizing a web self-service application can be modeled as a presentation model and a subject system 133 utilizing an IVR application that provides additional customer service for a company can be modeled as another presentation model. By identifying the users using the web self-service application, by login or cookie, and by identifying users using the IVR system by a similar login or caller ID, then the behavior of the user across both state machines can be analyzed within the activity analysis system 153.

As a subject system 133 evolves, the state machines for the presentation model and application model, created by the system modeling unit 312, must change over time to model the changes in the subject system 133. Accordingly, the system modeling unit 312 captures changes to the state machines by recording a state machine snapshot that corresponds to how a particular state machine exists at a given time. When a change is made to a system, the corresponding presentation model or application model is changed within the system modeling unit 312 by creating a new state machine snapshot. If the change to the state machine is substantial, the system modeling unit 312 can model the presentation model and application model using an entirely new state machine rather than a snapshot of an existing state machine.

Each state machine snapshot generated by the system modeling unit 312 is generally referred to as a model graph. The model graph contains a model node for each state in the state machine that exists at a particular point in time and is typically identified or named by a uniform resource identifier (URI). Additionally, the model graph contains edges for each state transition, from the source model node to the destination model node.

All application models do not necessarily need their own structural representation and can rely on the corresponding presentation model structure. In these cases, the system modeling unit 312 does not create state machine snapshots during the application modeling phase. For example, and not limitation, the subject system 133 can include an IVR system utilizing speech recognition. The application logic 136 for speech input can be modeled as an application model by the system modeling unit 312. But, the structure of the recognition logic matches the structure of the IVR presentation model exactly, because there is potentially a speech input recognized for each state in the presentation model. When the speech recognition logs are analyzed by the activity analysis system 153, the speech recognition logs refer to states in the presentation model directly. Accordingly, the system modeling unit 312 has no need for a separate structural model within this IVR application model. The system modeling unit 312, therefore, does not generate state machine snapshots or model graphs for the speech application model of the subject system 133.

The logging unit 318 is adapted to parse and record interaction with the subject system 133 as a sequence of events. As described more fully below, the logging unit 318 may include an event log source (also referred to herein as a "log source") for recording all the events (e.g., user interaction) within the subject system 133. The stream of events recorded by the logging unit 318 is generally called a log, wherein each recorded event corresponds to a log entry. In an embodiment of the present invention, the logging unit 318 identifies each log entry with the user who triggered the event within the subject system 133. Additionally, the each log entry is also identified by the logging unit 318 with a timestamp of the time at which the event occurred.

The log entries recorded by the logging unit 318 can correspond directly to states and transitions in the model generated by the state modeling unit 312, the aforementioned state machines, but such correspondence is not required for the activity analysis system 153 to adequately analyze the behavior of the subject systems 133. If the events do not correspond directly, the events recorded by the logging unit 318 can be mapped with the state machines modeled by the system modeling unit 312. In addition, the logging unit 318 can also record context information of the subject system 133 that is useful for later analysis.

In the e-toys web site example referred to above, the logging unit 318 can process event logs of user activity representing user accesses to the web site. The information logged by the logging unit 318 can be used by activity analysis system 153 to determine how each user executed the web site's presentation model state machine. The logging unit 318 can also record information about user interaction with a virtual shopping cart (e.g., items that were put in the cart by a user at a particular time for future purchase). The information logged by the logging unit 318, in conjunction with the user access information already recorded, can be used by the activity analysis system 153 to determine which state in the shopping cart application model each user is in at any given time and to provide context information. In the ATM banking system example, the logging unit 318 can log the sequence of user inputs for each account access. The activity analysis system 153 can use the logged information to determine how each user executed the presentation model state machine for the ATM. The logging unit 318 also logs the activity for each account, which the activity analysis system 153 can interpret as application model state machine state transitions, when the input log and the account activity log recorded by the logging unit 318 is also considered.

The projects unit 321 is adapted to allow the activity analysis system 153 to identify the state machines and log sources to be analyzed. Reports generated by the reporting unit 315 include user behavior within the subject system 133 during a particular time period. As described above, the system modeling unit 312 creates state machine snapshots for the subject system's 133 state machines during the particular time period, and collects and processes event log entries that record the behavior of users interacting with the subject system 133 during the particular time period. Accordingly, the projects unit 321 defines a project that identifies the state machines and log sources to be analyzed by the activity analysis system 153. The project implicitly includes all snapshots captured over time for the state machines. A project also acts as an organizing container, like a filing cabinet, for other data related to the project such as task definitions, report templates, and reports.

Generally, the projects unit 321 creates projects that include at least one presentation model state machine and its log source. The projects unit 321 will create a project including more than one presentation model, if the activity analysis system 153 is instructed to track user interaction across multiple presentation models of multiple sub-systems. For example, one presentation model might represent the self-service web site while another represents the IVR application in a call center. Once the set of presentation models for a project has been chosen by the projects unit 321, the projects unit 321 can selectively add application models, for which the presentation models act as a user interface 139, to the project if the activity analysis system 153 is instructed to include application logic in the analysis. Only application models for which there is a corresponding presentation model already in the project can be analyzed in a given project.

A project is a logical unit and, therefore, it is possible for more than one project to include the same state machines. Such a case might arise when the activity analysis system 153 is instructed to create a "working" project with experimental reports for analysis and a "customer presentation" project with final reports to present to a customer.

The graphs unit 324 is adapted to create various graphs to be utilized by the reporting unit 315. When the reporting unit 315 is instructed to report on a project (discussed more fully below) for a given time period, the graphs unit 324 constructs a presentation graph from the model graphs of the presentation model state machines. The presentation graph represents in a single structure the project's presentation model state machines during that time, creating a composite structure across multiple presentation models if there is more than one presentation model in the project. Each presentation node in the graph generated by the graphs unit 324 represents a single discrete user interface 139 display experienced by the user.

If the time period spans more than one state machine snapshot for a presentation model in the project, then the graphs unit 324 constructs the nodes in the graph from multiple state machine snapshots. If there is more than one presentation model state machine in the project, then the graphs unit 324 can utilize the nodes within state machine snapshots for multiple presentation model state machines. Thus, a node generated by the graphs unit 324 and the corresponding links have a discrete lifetime for which they are valid in the graph. By generating a presentation graph that spans different state machines, the graphs unit 324 allows the activity analysis system 153 to follow a user through different subject system 133 user interfaces 139, such as starting at a web self-service system and then moving over to an automated IVR system.

The graphs unit 324 generates an application graph for each application model state machine in the project that has a model graph. Accordingly, each application graph corresponds to one and only one application model. This is different from the presentation graph, which includes all presentation model state machines in the project. The graphs unit 324 includes application nodes within the application graph from all of the state machine snapshots of the particular application model during the specified time period. If no model graph exists for the application model, then the presentation graph is used during subsequent analysis of that application.

The sessions unit 330 is adapted to permit the construction of a model of user behavior as a sequence of states in the presentation graph and application graphs that the user traversed over a predetermined period of time. After the graphs unit 324 creates the presentation and application graphs for the project, the sessions unit 330 retrieves from the project the set of log sources corresponding to the presentation model state machines. The sessions unit 330 traverses the log entries from the time period being analyzed and constructs sessions for each uniquely identifiable usage of the system by a unique user. Each session created by the sessions unit 330 contains session entries representing the sequence of states in the presentation graph that the user traversed over time. The sessions unit 330 characterizes the session entry with a timestamp and a time duration. A session ends when no presentation-related log entries occur for the unique user for some pre-configured amount of time (e.g., 30 minutes). Thus, for a unique user there can be multiple sessions in the time period, but never two at the same time.

Each session created by the sessions unit 330 corresponds to data relevant to that particular interaction with the presentation model. Such corresponding, relevant data is referred to as the session context. The sessions unit 330 associates one session context with the entire session, whereby there is a separate session context for each session entry. The session context is domain specific. For example, in the web domain the session context includes the visitor internet protocol (IP) address, the web browser version (user agent), a cookie, and other web related data. In the IVR domain, each session context includes the caller's (e.g., user's) phone number.

In parallel to the session construction, the sessions unit 330 retrieves log entries from any application model log sources in the project and builds an application session for each application model in the project. An application session includes application session entries that correspond to the sequence of states in the application graph that the user traversed over time. If no application graph exists for the application model then the sessions unit 330 may not create the application session entries, or the sessions unit 330 may create the application sessions entries with respect to the presentation graph.

The application session and application session entries typically have attributes particular to the application and user, which are kept in session contexts. For the e-toy application example, the application session context data could include information as to what items were put in the cart, how much they cost, and how many items were finally purchased by the user. Each application session entry's context might include the number of items in the user's cart for that particular entry in the application session, and whether or not an item was added or removed. In the IVR domain, the application session entry's context keeps the utterance information, the input spoken by the caller, for each application session entry.

Thus, the sessions unit 330 associates one or more application sessions with each session, and associates an application session entry for each application session with each session entry. Further, the sessions unit 330 associates an individual session context with the sessions, application sessions, session entries, and application session entries. An application session entry can be associated with more than one session entry. This is because a state in the application graph can correspond to multiple states in the presentation graph.

The sessions unit 330 utilizes a session filter to accept or reject a session based on session context, session entries, associated application sessions, and their application session entries. For example, the sessions unit 330 may use a session filter to examine the session duration, time of day, and number of nodes visited by a particular user. The sessions unit 330 generally uses session filters when the reporting unit 315 creates a report to determine which sessions to include in the report.

The reporting unit 315 is adapted to generate a variety of reports and recommendations for the subject system 133 based on the behavior modeled by the sessions unit 330 and the graphs provided by the graphs unit 324. The results of an analysis of the activity analysis system 153 for a given project over some period of time may be captured in a report. The input parameters or settings for a report may be defined by the reporting unit 315 in a report template. A report, therefore, is created by the reporting unit 315 by running a report template for a particular period of time or date range.

A report template of the reporting unit 315, and any reports created using the report template, may include three types of components: topics, views, and filters. Report topics identify subject matter to be included in the report by the reporting unit 315, such as user traffic, user tasks, recommendations, or a specific application such as a shopping cart or on-line banking. Report views specify for each topic the informational displays that the reporting unit 315 will use to present the report results. Each topic when implemented by the reporting unit 315 is defined to include a specific set of views. When a report template is defined by the reporting unit 315, a particular view can be chosen to display the generated report. Report filter components specify how to filter the set of sessions included in the report. Also, report filter components use session filters to determine if the session should be included or not within the report. A session filter accepts a session and examines the session context, session entries, or any associated application sessions or entries as needed to determine if the session is accepted or not.

The reporting unit 315 includes an extensible framework for adding report components. There is a core "library" of components that can be used by the reporting unit 315 in a given deployment. Generally, there are three core report topics in the report component library: traffic, task, and recommendations. Each of these topics has several views. For example, and not limitation, the traffic topic includes an interactive traffic visualization, tabular traffic data, and data for specific pages in the presentation model.

The core library utilized by the reporting unit 315 can be extended by programming and adding new report components using the extensible report framework, such as an object-oriented framework implemented in the JAVA programming language. The core framework is sub-classed per domain to which the activity analysis system 153 is applied (e.g., web, IVR, and other domains). If the activity analysis system 153 is to be applied to a new domain, then the core framework is sub-classed.

The data management unit 306 is adapted to receive, provide, and process data utilized by the components of the activity analysis system 153. Additionally, the data management unit 306 can schedule events within the activity analysis system (e.g., schedule the creation of reports) and configure data necessary for the other components of the activity analysis system 153. The data management unit 306 often functions as the interface to the data storage unit 1109, whereby all data provided to or retrieved from the data storage unit 1109 is handled or processed by the data management unit 306.

The tasks unit 327 is adapted to permit specific or expected user behavior of the subject system 133 to be examined by the activity analysis system 153. More particularly, the tasks unit 327 can create a specific user behavior in the form of a task, whereby the reporting unit 315 may later generate a report on the performance of that task by actual users of the subject system 133. Generally, the tasks unit 327 expresses tasks as a sequence of states in a state machine, be it a presentation model state machine or an application model state machine. The task generated by the tasks unit 327 includes a sequence of steps, which can contain one or more states from the state machine. A step within the task is referred to as a task step. The tasks unit 327 defines a task template using a presentation graph or an application model graph from a project. The task template includes task step templates, such that there is one task step template for each task step. The tasks unit 327 can modify the task template as the state machines in the project evolve, with each task step template including an indication of the time period for which it is valid. In the e-toys web site example, an already existing task template may define the home page as step one and any of the pages in a main menu as step two. If a page is added to the web site main menu, then step two of the task step template is edited to add the new page, beginning with the time that it was added to the state machine snapshot.

The reporting unit 315 can define a report template to include a task analysis as referred to by the task template generated by the tasks unit 327. When the reporting unit 315 creates a report from a report template that includes the task analysis, the actual task to search for within the sessions 803 is instantiated based on the task template specified in the report template. In the task report template definition, the tasks unit 327 can be configured with several different options that control how the task identification in sessions will be performed. For example, the direct task completion option specifies that each stage in the task should be completed contiguously, without interruption, in a session for the task to be deemed completed. The default method of completion identification allows session entries other than those that match the task to be interspersed in the session between those session entries matching the task.

The tasks unit 327 uses a task match location option to specify the allowed location and number of matches in a session, as listed in Table 1.

Additionally, the tasks unit 327 can provide task match filters to filter possible task matches in the session depending on session context. A task match filter is associated with a task. Evaluation of the filter requires a session and a location within the session of a potential match of the task. During evaluation, the tasks unit 327 utilizes the task match filter to examine the session context for the session and its session entries, as well as any associated application sessions and application session entries at the candidate location, to determine whether the match should be accepted or not. Exactly what information is examined and the required values are particular to each task match filter implementation. The tasks unit 327 may also utilize a task stage match filter, which works much like the task match filter, except it is associated with a particular stage in the task. For the e-toys web site example, a task might be defined by the tasks unit 327 as those web pages required for completing the purchase of a product. A task stage match filter could be used in a report to only record completions for users that had two products in their cart upon visiting the checkout page.

The tasks unit 327 can create a task over both presentation graphs and application graphs. Tasks based on a presentation graph are used to analyze how users traversed the presentation model state machines. Application-based tasks express expected user behavior through the application model state machine. The task analysis of how the users performed the task proceeds by examining the sessions and application sessions and comparing them with the task definition.

The rule engine 309 assists the reporting unit 315 in generating recommendations for changes to the structure of the presentation graph 721 and/or application graph 718 of the subject system 133 to better facilitate observed user behavior. The rule engine 309 contains several levels of logic, and classes that represent the different abstractions. Table 2 includes, but is not limited to, multiple levels of logic and classes implemented within the rule engine 309.

TABLE 2

| Logic/Class | Description |
| --- | --- |
| Anomaly Generation | During this phase, rules that are designed to find specific anomalies are executed by the rule engine on the sessions and other session |

TABLE 1

| Type of Match | Explanation |
| --- | --- |
| Match All | Match all occurrences of the task in the session, including overlaps. Start a subsequent match attempt from the page after the previous match's first step match. |
| Match All Not Overlapping | Match all occurrences of the task in the session, excluding overlaps. Start a subsequent match attempt after the end of the longest sub-task that matches at the previous match's start. At a minimum this is the end of the previous match. |
| Match Only After Completion | Similar to Match All Not Overlapping with the added constraint that a further match is only performed if the previous match completed the task. |
| Match First | Match only the first attempt at performing the task in the session. |
| Match Nth | Match the nth attempt at performing the task in the session. |
| Match Head | Match a task only if it occurs at the beginning of the session, i.e. the user enters the system and immediately starts the task. There can be only one match per session. |
| Match Tail | Match a task only if it occurs at the end of the session, i.e. the user performs the task and immediately leaves the system. There can be only one match per session. |
| Match Both | A task must match both head and tail simultaneously, i.e. start at the beginning and end at the end. |

TABLE 2-continued

| Logic/Class | Description |
| --- | --- |
|  | data. Each anomaly is represented by an anomaly class. |
| Finding Generation | Finding generation clusters and further analyzes the anomalies to generate a findings for particular pairs and sets of nodes in the presentation and application graphs. |
| Recommendation Generation | The recommendations regarding changes to the graph structure are created by the rule engine where appropriate. Generic "needs investigation" recommendations are created for findings when no other recommendation can be made. |
| Recommendation Filtering | During recommendation filtering, related recommendations are combined, conflicting recommendations are removed, and weak recommendations are discarded by the rule engine. |

The rule engine 309 generates many different types of recommendations, each of which sub-classes the generic recommendation abstract class. An exemplary list of the recommendations include, but are not limited to, add a link between two pages, promote a link, remove a link between two pages, demote a link, add a menu to connect a set of pages together, add "see also" links to connect a set of pages together, add "next" link to connect a set of pages together, consider removing a page that users spend little or time with, change a location of a link that users find hard to locate, change a color of a link that user find it hard to see, change a location of a link for a particular web browser, change the color of a link for a particular web browser, consider reducing the amount of information in the page, and remove or reduce the resolution of images in the page.

The user interface 303 is adapted to receive and provide data between a user and the activity analysis system 153. Users of the activity analysis system 153 are not generally the same users that interact with the subject system 133. Contrarily, the users of the activity analysis system 153 are generally those individuals that maintain and modify the subject system 133. The user interface 303 permits a user to access components of the activity analysis system for creating a project, modeling the subject system 133, creating particular tasks to monitor, and generating reports that include an analysis of user activity on the subject system 133 and recommendations to improve the subject system 133. One skilled in the art will recognize that the user interface 303 can be designed in a variety of configurations within the scope of the present invention. For example, and not limitation, the user interface 303 may include several interactive and or web documents which permit interaction between a user and the activity analysis system 153.

Figure 4:
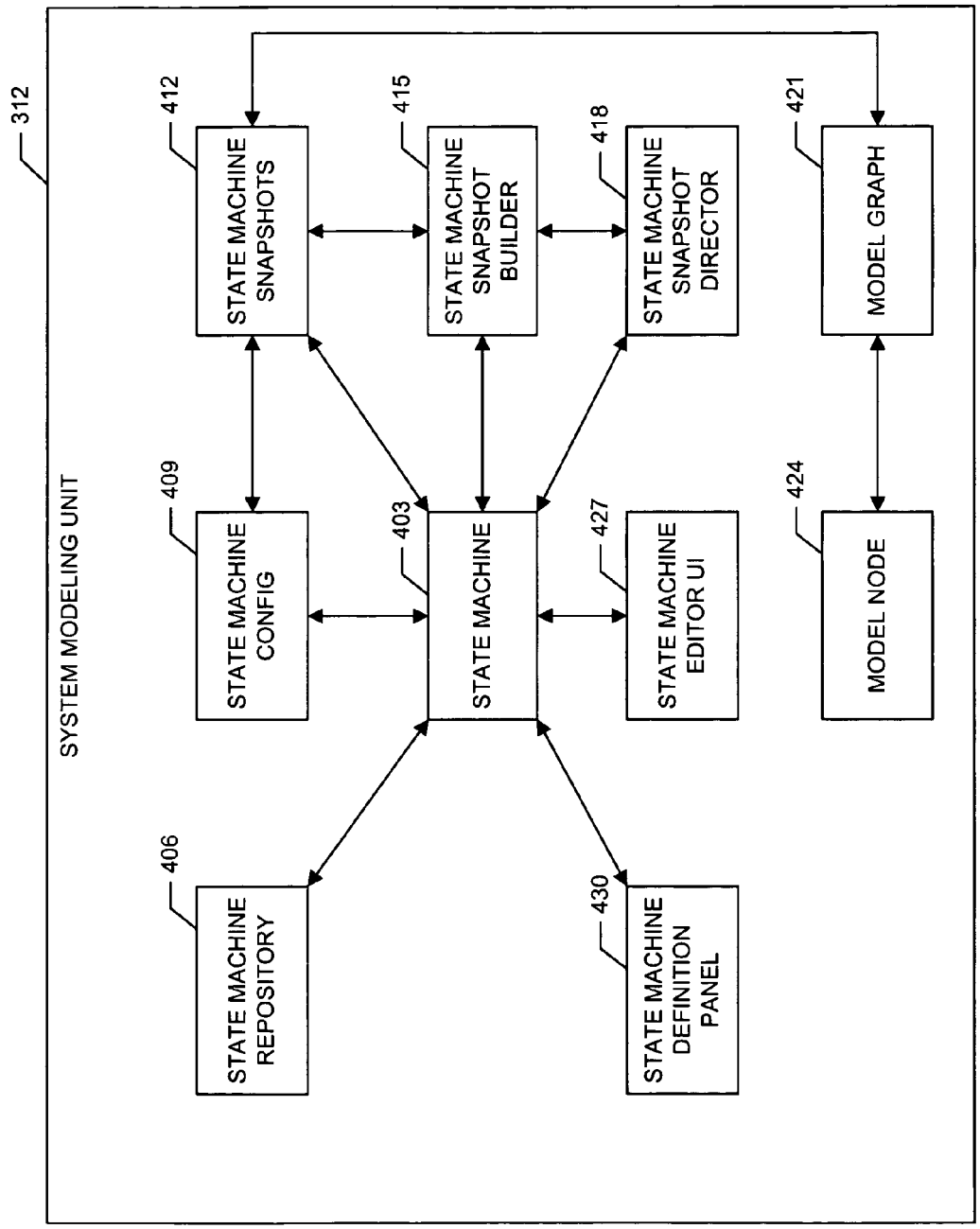
FIG. 4 displays a block diagram representation of a system modeling unit of the activity analysis system in accordance with some embodiments of the present invention.

FIG. 4 displays a block diagram representation of a system modeling unit 312 of the activity analysis system 153 in accordance with some embodiments of the present invention. As described above, the system modeling unit 312 is adapted to model the subject system 133 into one or more state machines. Accordingly, the system modeling unit 312 comprises state machine 403, state machine repository 406, state machine config 409, state machine snapshots 412, state machine snapshot builder 415, state machine snapshot director 418, model graph 421, model node 424, state machine editor user interface 427, and state machine definition panel 430, or may comprise multiple instances thereof.

The state machine 403 represents the state machine concept of the activity analysis system 153, used to model the possible states of a subject system 133 pertaining and in response to user interaction. Derived from the state machine 403 are the presentation model and the application model interfaces (not shown), which correspond to the presentation model state machine and the application model state machine used to model the user interface 139 of a subject system 133 and the application logic 136 of the subject system 133, respectively. A particular presentation model is associated with zero or more application models, for which it provides a user interface 139.

Typically, a state machine 403 is characterized by a user-defined name, a URI identifying the source of the structure of the state machine 403, and a description of the configuration used in analyzing the state machine 403. The user-defined name can be a name that is displayed to identify the state machine 403 to a user of the activity analysis system 153. The URI identifies the source where the activity analysis system 153 can ascertain the specific structure of the subject system 133 as part of creating state machine snapshots 412. In the case of a web-based system, the URI is typically the URL of the web site. Alternatively, the URI can be used to name the subject system 133, as referenced in the subject system logs.

The configuration description is a user-provided description of how the state machine 403 is configured to model its subject system 133. The configuration description is used to differentiate different state machines 403 created for the same subject system 133, where each state machine 403 contains a different configuration to analyze a different aspect of the subject system 133. Internally within the activity analysis system 153, a unique ID is assigned to each state machine 403 when it is stored in the state machine repository 406. The state machine repository 406 may include a memory device capable of storing and retrieving data including, but not limited to, volatile memory 216 and/or non-volatile memory 214.

Corresponding to a state machine 403 are state machine snapshots 412. A state machine snapshot 412 records the specific states that are part of the associated state machine 403 for a particular range of time. This valid date range is defined by a start and end time; the date ranges of the state machine snapshots 412 do not overlap. A state machine snapshot 412 has a model graph 421 to physically represent the nodes and state transitions between them.

Configuration of the state machine 403 being analyzed by the activity analysis system 153 is recorded in a state machine config 409, which can be set by the user of the activity analysis system 153 using the state machine editor user interface 427. The configuration affects how the state machine snapshot 412 is built from the subject system 133. Each concrete state machine 403 has its own configuration parameters, relevant to the domain of the subject system 133. Each state machine snapshot 412 is associated with one state machine config 409.

A state machine snapshot 412 is built by a state machine snapshot builder 415 under the direction of the state machine snapshot director 418, following a predetermined design pattern. The state machine snapshot builder 415 for a particular state machine 403 can be obtained from the state machine 403. The state machine snapshot builder 415 examines the structural information available via the state machine 403 URI or through a graph creation command file and creates a model graph 421 according to the configuration in the current state machine config 409. It is up to the concrete implementation of the state machine 403 and the state machine snapshot builder 415 as to how the model graph 421 is constructed. In the web domain, the URI identifies a web site and a web crawler can be used to create the site structure. Alternatively, a command file is provided in the state machine editor user interface 427, wherein the state machine snapshot builder 415 parses the command file to create a model graph 421 representation of the subject system's 133 structure.

The components related to a state machine 403, including the state machine 403, state machine config 409, and state machine snapshot 412, are stored in a state machine repository 406. The state machine repository 406 allows the implementing objects to be persistent across executions of the activity analysis system 153. The state machine repository 406 also allows state machines 403 and state machine snapshots 412 to be obtained using a generic filtering mechanism, where each filter implementation can filter on different attributes of the state machine 403 or state machine snapshot 412 such as the name, URI, or date range.

When unique model nodes 424 are identified and created for a given state machine 403 they are assigned persistent IDs and catalogued in the state machine repository 406. This allows the same ID and model node 424 to be used in future snapshots of the state machine 403, if a duplicate model node 424 is encountered. Subsequent analysis by the activity analysis system 153 can then determine when a particular model node 424 is the same or different over time.

Associated with and retrievable from a state machine 403 is a state machine definition panel 430, which is the abstract class that allows a user of the activity analysis system 153 to specify the attributes of a state machine 403 in the user interface 303 thru various user interface 303 widgets. The state machine definition panel 430 may include a JPanel represented within the JAVA programming language. Concrete extending classes utilize Swing components to allow manipulation and definition of the state machine 403 and its associated state machine snapshots 412 and state machine configs 409, and their configuration.

The state machine 403 is the central object in the framework, with which many related objects in other sub-systems are associated. When a new concrete state machine 403 implementation is derived from the framework, these other entities that work with that state machine 403 implementation should also be implemented to realize the interfaces and extend the abstract classes of the framework. These associated objects can include one or more log sources 503, a presentation graph builder 727 or application graph builder 739, a session builder 821 or application session builder 824, and report components 915.

Figure 5:
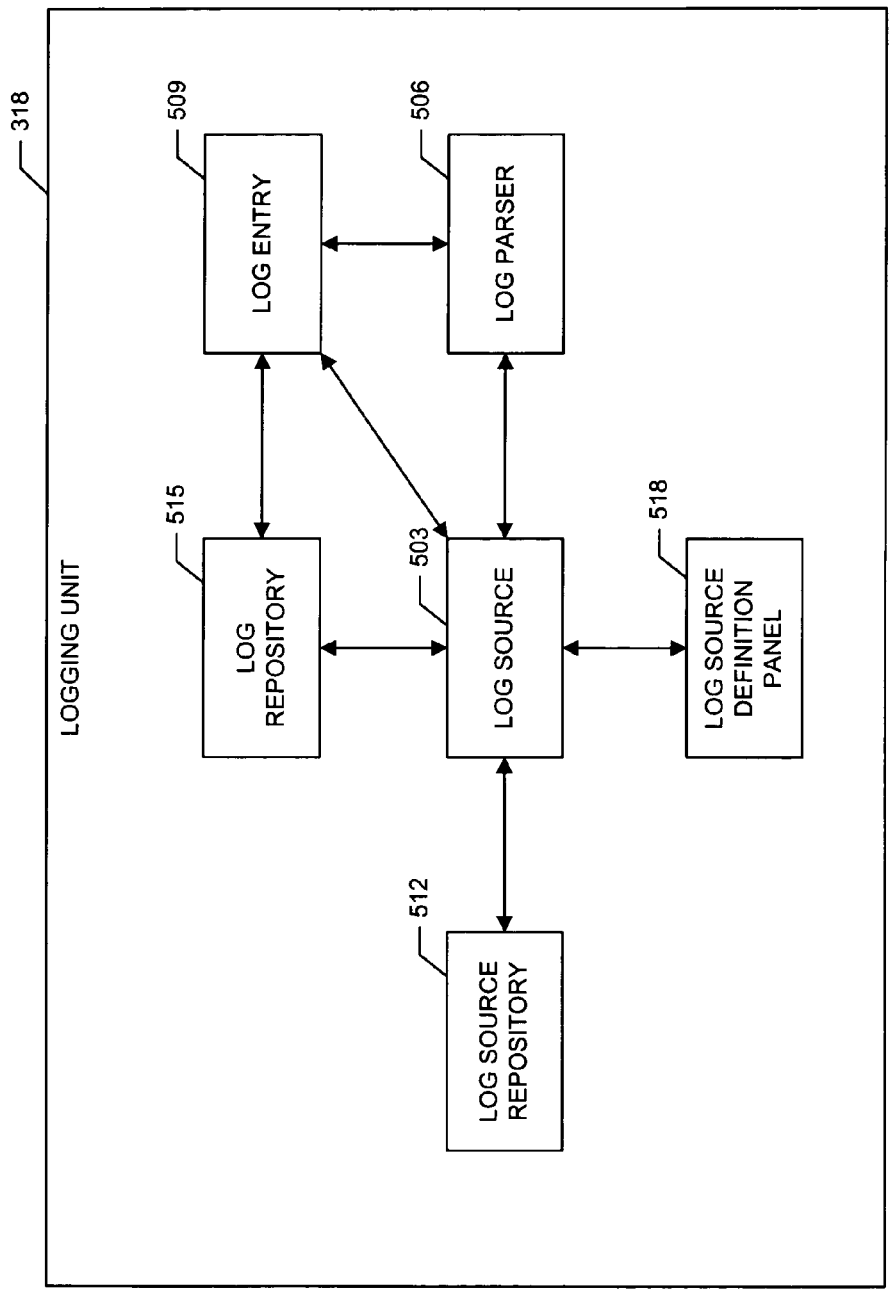
FIG. 5 displays a block diagram representation of a logging unit of the activity analysis system in accordance with some embodiments of the present invention.

FIG. 5 displays a block diagram representation of a logging unit 318 of the activity analysis system 153 in accordance with some embodiments of the present invention. The logging unit 318 is adapted to process and record interaction with the subject system 133 as a sequence of events. Accordingly, the logging unit 318 comprises a log source 503, a log parser 506, a log entry 509, a log source repository 512, a log repository 515, and a log source definition panel 518.

The log source 503 represents the log source concept of the activity analysis system 153, used to model the sources of event logs in a subject system 133. A log source 503 is characterized by a user-defined name and a URI. The user-defined name is a name that is displayed to identify the log source to the user of the activity application system 153. The URI uniquely identifies the log source 503 in event log files. In the case of a web-based system, this is typically the URL of the web server, which is represented as a log source 503.

The event log of a log source 503 is read by the relevant log parser 506 and converted into a time-ordered sequence of log entries 509, wherein each log source 503 has an associated sequence of log entries 509 built from event logs that have been added to the activity analysis system 153. Associated with a log source 503 is a log parser 506 that is configured to read the actual event log format from the subject system's 133 log source that the log source 503 models. The log source 503 has a predetermined method to instantiate log entries 509 corresponding to the log source's 503 concrete implementation, which the concrete log parser 506 uses to build new log entries 509 while parsing the log. According to the configuration of the event log sources 503, the activity analysis system 153 can automatically collect event logs as they are generated by the subject system 133. Optionally, event logs can be manually added to the activity analysis system 153 by a subject system 133 administrator or by an engineer of the activity analysis system 153.

The log sources 503 are stored in a log source repository 512 and within the log source 503 the log entries 509 are stored in a log repository 515. The log source repository 512 and the log repository 515 may include a memory device capable of storing and retrieving data including, but not limited to, volatile memory 216 and/or non-volatile memory 214. The log source repository 512 and the log repository 515 allow the objects to be persisted across executions of the activity analysis system 153. The log source repository 512 also provides a mechanism for merging log entries 509 from multiple log sources 503 during a specific date range into a time-ordered sequence for subsequent analysis.

Each log source 503 has a configuration manager 1115, which is a utility class for managing attribute value pairs of various types, storable in configuration files. The configuration manager 1115 keeps the values for the attributes applicable to the concrete log source 503 implementation.

Associated and retrievable from a log source 503 is a log source definition panel 518, which is the abstract class that allows a user of the activity analysis system 153 to specify the attributes of a log source 503 in through the user interface 303 using various user interface 303 widgets. Concrete extending classes utilize Swing components to allow manipulation and definition of the log source 503, its configuration, and addition/removal of log entries 509 from log files.

Figure 6:
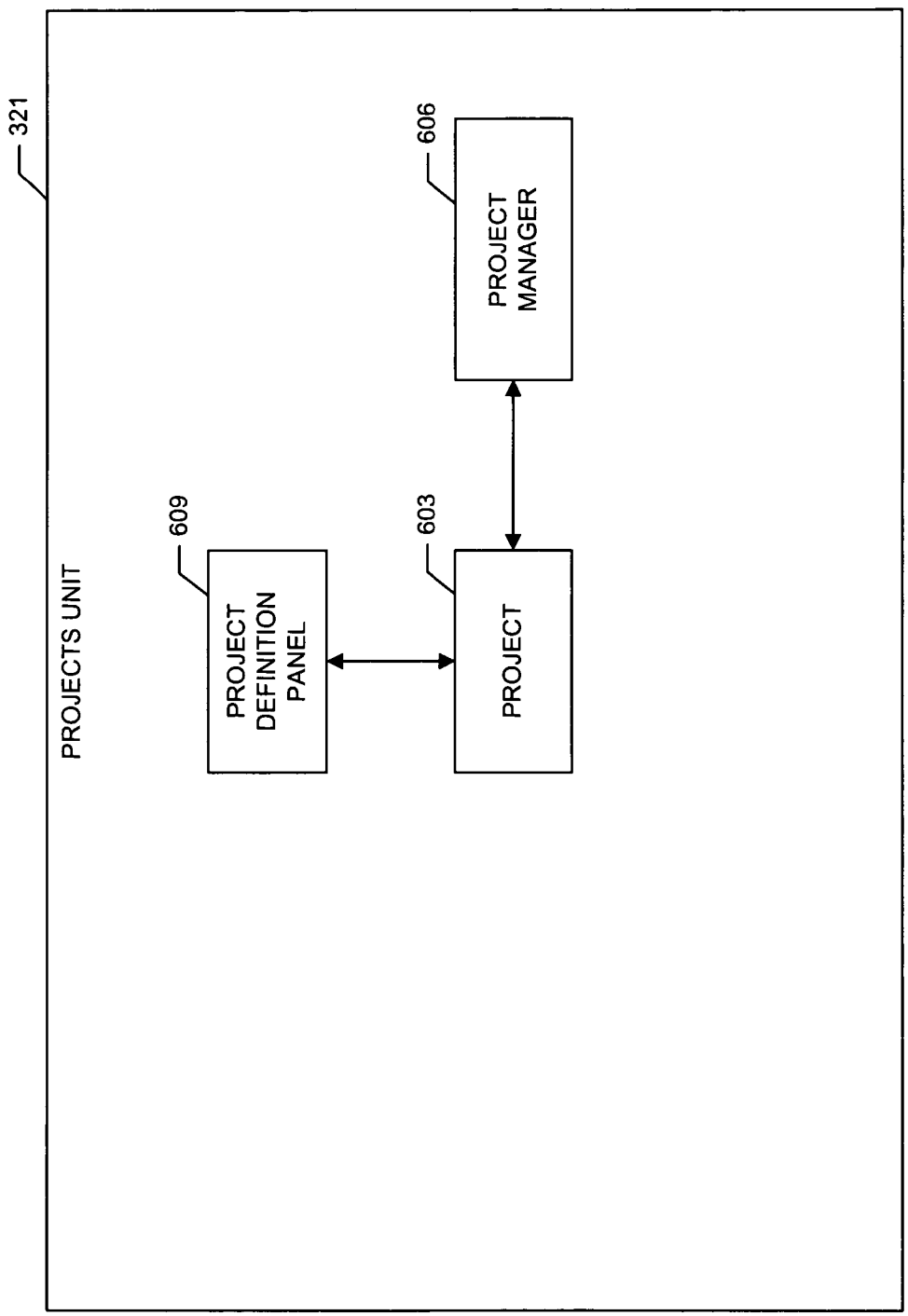
FIG. 6 displays a block diagram representation of a projects unit of the activity analysis system in accordance with some embodiments of the present invention.

FIG. 6 displays a block diagram representation of a projects unit 321 of the activity analysis system 153 in accordance with some embodiments of the present invention. The projects unit 321 is adapted to allow the activity analysis system 153 to identify the state machines 403 and log sources 503 to be analyzed. The projects unit 321 comprises a project 603, a project manager 606, and a project definition panel 609.

The project 603 acts as a scoping definition and container for an analysis by the activity analysis system 153. The project 603 has associated with it a set of presentation models 715 and application models 718 to be analyzed. Presentation models 715 are added to a project 603 first, then application models 718 associated with each presentation model 715 can be added based on what is to be analyzed by the activity analysis system 153. A user of the activity analysis system 153 can specify which presentation models 715 and application models 718 to analyze through the project definition panel 609.

Since there can be more than one log source 503 associated with a state machine 403, the project definition panel 609 allows the user to define which log sources 503, of those available, are to be included in the analysis. The project 603 also contains a set of report templates 906, reports 903, task templates 1009, and tasks 1003 that have been created as part of the analysis.

Each project 603 has a configuration manager 1115, which is a utility for managing attribute value pairs of various types, storable in configuration files of the data storage unit 1109. The configuration manager 1115 is used by components of the user interface 303 to record the state of the user interface 303 displaying the project 603.

Projects 603 are managed and stored by a project manager 606. The project manager 606 allows the project 603 implementation to be persistent across application executions by the activity analysis system 153. When projects 603 are added and removed, the project manager 606 notifies other components of the activity analysis system 153 to add or remove information related to the project 603. For example, if a project 603, then the project manager 606 notifies the batch controller 1112, which removes any schedules relating to the project 603 from the data storage unit 1109.

Associated with and retrievable from a project 603 is a project definition panel 609, which allows a user of the activity analysis system 153 to specify the attributes of a project 603 via the user interface 303 using various user interface widgets. Generally, the project definition panel 609 is a JPanel of the JAVA programming language, utilizing Swing components to allow manipulation and definition of the project 603.

Figure 7:
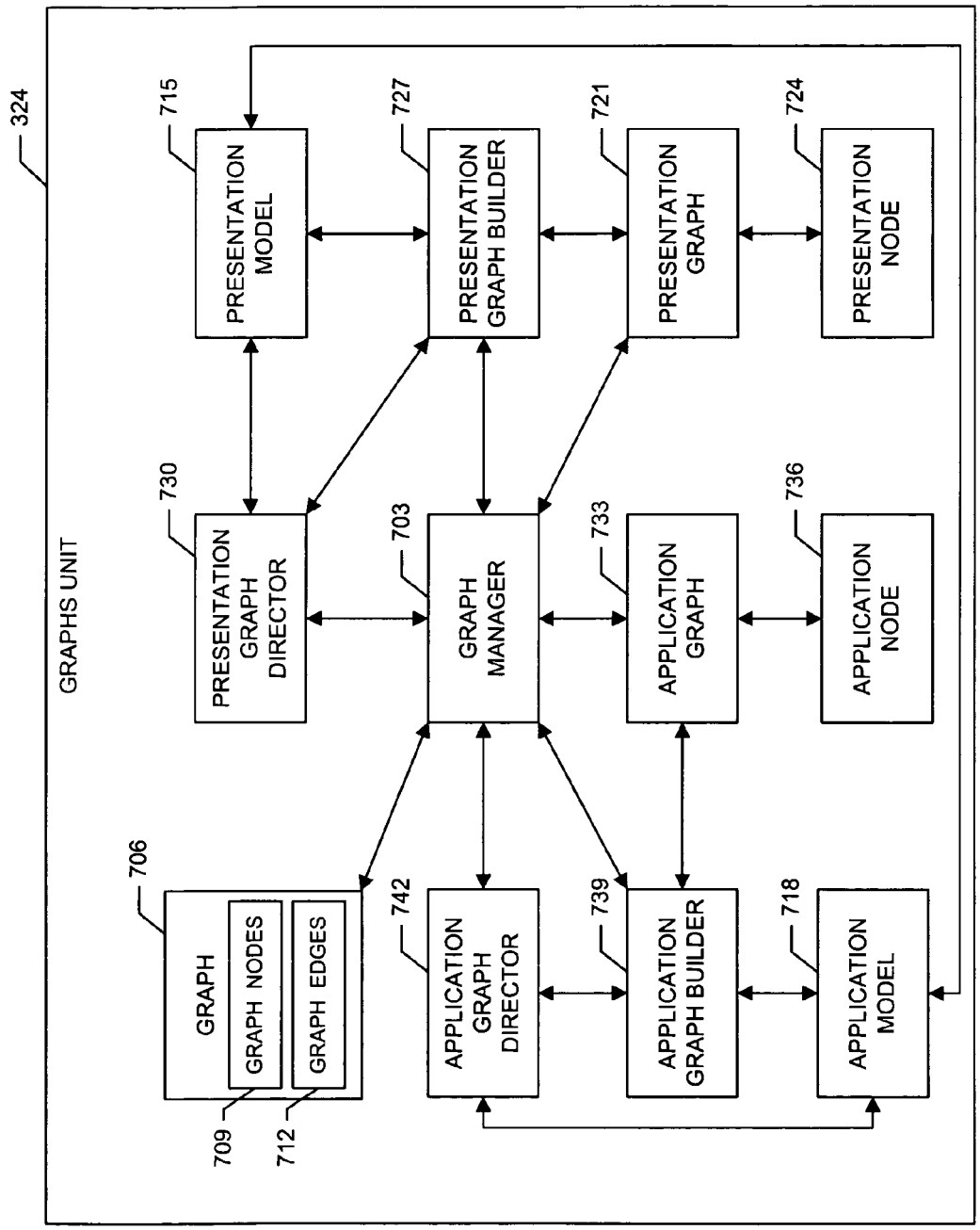
FIG. 7 displays a block diagram representation of a graphs unit of the activity analysis system in accordance with some embodiments of the present invention.

FIG. 7 displays a block diagram representation of a graphs unit 324 of the activity analysis system 153 in accordance with some embodiments of the present invention. Although the model graph 421 and model node 424 are part of the system modeling unit 312, the model graph 421 and model 424 communicates with the graphs unit 324 for implementing a graph 706. The graphs unit 324 provides the core graph data structure used to model the subject system 133. The graphs unit 324 comprises a graph manager 703, a graph 706, a presentation model 715, an application model 718, a presentation graph 721, a presentation node 724, a presentation graph builder 727, a presentation graph director 730, an application graph 733, an application node 736, an application graph builder 739, and an application graph director 742.

A general graph 706 is a directed graph-based data structure, including graph nodes 709 and directed graph edges 712. Each graph node 709 has a (possibly empty) collection of parent and child graph nodes 709, reachable via parent and child graph edges 712. A graph edge 712 has a source graph node 709 and a destination graph node 709, and can also be bi-directional. A graph 706 has one or more root nodes, and provides a notion of levels to which each graph node 709 is assigned. The level of a graph node 709 is its minimum link distance from a root node.

A model graph 421 extends a graph 706 and is made up of model nodes 424 that extend graph node 709. The model node 424 is a graph node 709 that is named by a URI. As discussed previously, a model graph 421 is associated with a state machine snapshot 412 and built by a state machine snapshot builder 415.

A presentation graph 721 extends graph 706 and is made up of presentation nodes 724 that extend graph node 709. A presentation graph 721 is built from a time-sequence of model graphs 421, such as the model graphs 421 from a presentation model's 715 state machine snapshots 412. Additionally, a presentation graph 721 can be a composite of multiple presentation models 715, for which there are multiple state machine snapshots 412. A presentation node 724 can directly correspond to a model node 424, or it can be a composite of model nodes 424. Thus, the presentation graph 721 adds an ability to compose a set of model nodes 424 into a single presentation node 724. A presentation graph 721 is built by a presentation graph builder 727.

An application graph 733 extends graph 706 and is made up of application nodes 736 that extend graph node 709. An application graph 733 is built from one or more model graphs 421 that are part of a single application model's 718 state machine snapshots 412. An application node 736 directly corresponds to a model node 424 in the state machine snapshot 412. An application graph 733 is built by an application graph builder 739.

The graph manager 703 acts as an active manager of graphs, while servicing requests to create a presentation graph 721 for a set of presentation models 715 over a given date range and requests to create an application graph 733 for an application model 718 over a given date range. The graph manager 703 also stores and provides access to created graphs.

New presentation graphs 721 are created as part of the analysis of a project 603. When a presentation graph 721 is needed for the set of presentation models 715 in the project 603, the graph manager 703 requests that each presentation model 715 create an associated presentation graph builder 727. The presentation graph builder 727 is capable of building a presentation graph 721 implementation that corresponds to the concrete presentation model 715 implementation. Next, the graph manager 703 creates a presentation graph director 730, which uses the presentation graph builders 727, following a predetermined design pattern, to build the corresponding presentation graphs 721 and associated presentation nodes 724. Each presentation graph builder 727 depends on the presentation model's 715 state machine snapshot's 412 model graph 421 to build a presentation graph 721.

The resulting presentation graph 721 is associated with the presentation model's 715 state machine snapshots 412 over the date range for which it is built. The presentation graph's 721 presentation nodes 724 contain references to the associated model nodes 424 from which each was built. Once the separate presentation graphs 721 are built by the presentation graph builders 727, the presentation graph director 730 merges the presentation graphs 721 for the presentation models 715 into a single presentation graph 721. The resulting presentation graph 721 can have multiple root nodes.

Similarly, when an application graph 733 should be created for each application model 718 in the project 603, the graph manager 703 requests that the application model 718 create an associated application graph builder 739. The application graph builder 739 is adapted to build an application graph 733 implementation that corresponds to the concrete application model 718 implementation. Next, the graph manager 703 creates an application graph director 742, which uses the application graph builder 739, following a predetermined design pattern, to build the corresponding application graph 733 and associated application nodes 736. Each application graph builder 739 depends on the application model's 718 state machine snapshot's 412 model graph 421 to build an application graph 733.

The resulting application graph 733 is associated with the application model's 718 state machine snapshots 412 over the date range for which it is built. The application graph's 733 application nodes 736 contain references to the associated model nodes 424 from which each was built.

After creating a graph 706, the graph manager 703 caches and persists the graph 706 in an internal repository (such as the data storage unit 1109, recording the graph's 706 attributes and valid date range. The valid date range for the graph 706 can be larger than the requested date range, because it is based on the date range of the state machine snapshots 412 used to build the graph 706.

When unique presentation nodes 724 and application nodes 736 are identified, the presentation nodes 724 and the application nodes 736 are assigned IDs that are catalogued in the graph manager 703. This way when future graphs 706 of the state machine 403 are created, the same ID is used if a duplicate node is encountered. This permits a subsequent analysis to determine when a particular node is the same or different over time, thereby permitting the creation of composite graphs in which graph nodes 709 and graph edges 712 have lifetimes.

Figure 8:
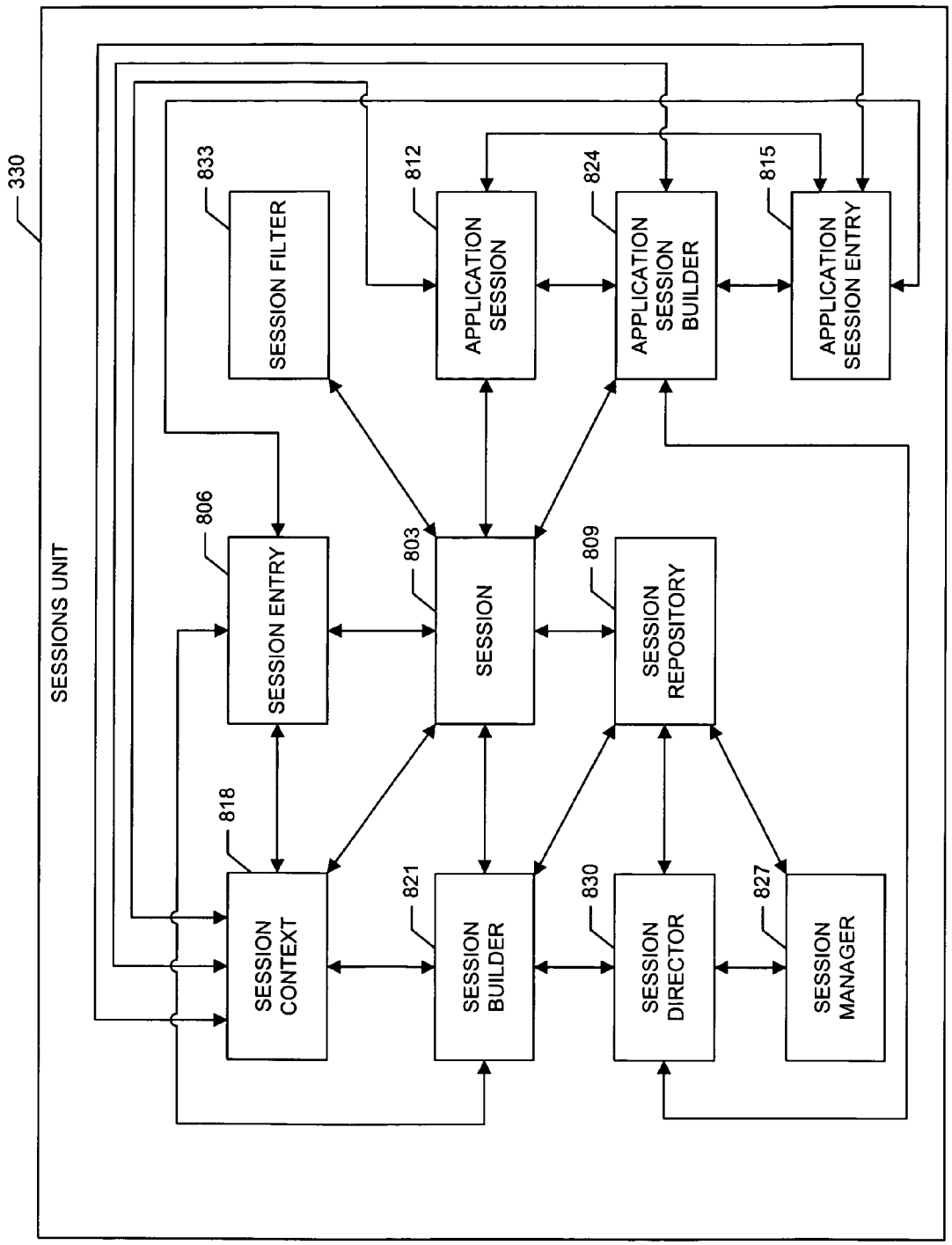
FIG. 8 displays a block diagram representation of a sessions unit of the activity analysis system in accordance with some embodiments of the present invention.

FIG. 8 displays a block diagram representation of a sessions unit 330 of the activity analysis system 153 in accordance with some embodiments of the present invention. The sessions unit 330 is adapted to permit the construction of a model of user behavior as a sequence of states in the presentation graph 721 that the user traversed over a predetermined period of time. The sessions unit 330 comprises a session 803, a session entry 806, a session repository 809, an application session 812, an application session entry 815, session context 818, a session builder 821, an application session builder 824, a session manager 827, a session director 830, and a session filter 833.

A session 803 is used to model user interaction with the user interface 139 of a subject system 133 during a particular period of usage by a particular user. A session 803 is associated with a presentation graph 721 for which it was built. The session 803 is an ordered collection of session entries 806, each of which is associated with a presentation node 724 that a user visited in the modeled subject system 133. An attribute of each session entry 806 is a timestamp of the time that the user "arrived" at the presentation node 724. The duration on a particular node can be calculated by subtracting the next session entry's 806 timestamp from the previous session entry's 806 timestamp.

Generally, the session 803 includes attributes, such as an ID (assigned by the session repository 809), a session key, and a user key. The session key is a unique string obtained from the log entry 509, such that no more than one session 803 for a given session key exists at any moment in time. Some examples of session keys include, but are not limited to, host IP addresses, web browser cookies, caller ID (phone numbers), or account numbers. The user key is a string identifying the user and is also retrievable from the log entry 509. The user key may or may not be the same as the session key. The same user may be associated with multiple sessions 803 within the subject system 133 at the same time.

Correspondingly, an application session 812 represents the corresponding application session concept of the activity analysis system 153, used to model user interaction with the application model 718 of a subject system 133 during a particular session 803 of usage by a particular user. An application session 812 is associated with the application graph 733 from which it was built, if one exists. The application session 812 is an ordered collection of application session entries 815, each of which is associated with an application node 736 that a user visited in the modeled subject system 133, if an application graph 733 exists. Attributes of each application session entry 815 include the timestamp the user arrived at the particular application node 736 and the duration of time the user spent at or in that application node 736.

Corresponding to each session 803, session entry 806, application session 812, and application session entry 815 is data relevant to that particular interaction. The base type of this data is called the session context 818. The session context 818 is specialized in each specific domain. The concrete session builders 821 and application session builders 824 are adapted to create the concrete session contexts 818.

As described conceptually, each application session 812 is associated with a single session 803. There can be, however, more than one application session 812 associated with a session 803. More specifically, one application session 812 corresponds to each application model 718 associated with the presentation model(s) 715, upon which the session 803 is based. Each application session entry 815 is associated with one or more session entries 806 in the associated session 803.

All concrete realizations of application models 718 do not necessarily need their own structural representation and, therefore, can rely on the corresponding presentation model 715 structure. In this case, there is no application graph 733. The purpose of the application session 812 is to include state or other information about the application model 718 without communicating any structure.

The session manager 827 manages the sessions 803 and services the requests to create sessions 803 for a presentation graph 721 and one or more application graphs 733 over a given date range. The application graphs 733 are already associated with the presentation graph 721 because sessions 803 are created in the context of a project 603, which only includes application models 718 associated with the project's 603 presentation models 715. The session manager 827 stores created sessions in session repositories 809. The session repository 809 may include a memory device capable of storing and retrieving data including, but not limited to, volatile memory 216 and/or non-volatile memory 214.

When a new set of sessions 803 are to be created, the session manager 827 requests that each presentation model 715 state machine 403 in the project 603 create a session builder 821 for its associated session 803 implementation. Additionally, the session manager 827 requests that each application model 718 state machine 403 for the project 603 create an application session builder 824 for its associated application session 812 implementation. The session manager 827 might already have a session repository 809 for the presentation models 715, application models 718, and date range. If the session manager 827 already has a session repository 809, the sessions 803 might need to added to the session repository 809. If the session manager 827 does not already have a session repository 809, then an empty session repository 809 is created.

The set of state machines 403 (presentation models 715 and application models 718), for which the sessions 803 will be associated, is then queried for the log sources 503 associated with each state machine 403. The log repository 515 is then accessed to retrieve the log entries 509 for those log sources 503, over the requested date range. Finally, the session manager 827 creates a session director 830, providing the session director 830 with the presentation graph 721, application graphs 733, session repository 909, list of log entries 509, session builders 821, and application session builders 824.

The session director 830, session builders 821, and application session builder 824 create the sessions 803 following a predetermined design pattern. The session 803, application session 812, session entry 806, and application session entry 815 all have associated session context 818 that captures the state of the session 803 associated to the concrete session 803 being built. The resulting sessions 803 are cached and persisted in the session repository 809. Some of the sessions 803 might not be complete with respect to future log data, so those session 803 are noted as partial sessions.

Various aspects of how the activity analysis system 153 identifies a session 803 can be configured, such as the session key, user key, and the session timeout. The default configuration is kept in the general configuration manager 1115, while custom configuration for different log sources 503 is kept in the configuration manager 1115 owned by each log source 503. The configuration managers 1115 read data files from the data storage unit 1109 in which they are executing.

The session builders 821 access this information to affect how the sessions 803 and application sessions 812 are built.

The configuration of the activity analysis system 153 allows different fields in the log source's 503 log entry 509 to be defined as the session key field and user key field. For example, in the web domain the session key might be the value in the HOST field, the COOKIE field, the IDENT field, or any set of fields in some combination, from the web domain log entry 509. In the IVR domain's log entry 509, the session key might be the CALLER_ID field, the IDENT field, or another field.

Log entries 509 with the same session key value are candidates to be session entries 806 in the same session 803, assuming their separation in time is less than the session timeout. The session timeout is the minimum gap in time between the same session key being logged by the logging unit 318 that is recorded as the start of a new session 803. Typically, the session timeout is on the order of 30 minutes or other appropriate period of time.

When performing cross-domain analysis, it is possible that the user or session key values consist of the same values (e.g., an account number). If the values are different, however, each log source 503 configuration manager 1115 identifies a data file that maps key values for that log source 503 to a global key value (unique across all the log sources 503 and domains). This allows the session 803 to be constructed through a presentation graph 721 that spans state machines 403 with different log sources 503 in different domains. The session key and user key values are then the same for the same user of the subject system 133, thereby allowing subsequent application of the reporting unit's 315 reporting functionality across the multiple domains. Additionally, it is sometimes desirable to make the session timeout infinite in order to track task performance across the domains that occur at intervals greater than a predetermined period of time.

During session 803 construction across a date range that spans multiple state machine snapshots 412 for a given state machine 403, it may be necessary to access graphs 706 for time intervals corresponding to individual state machine snapshots' 412 valid date ranges. Thus, during the creation of sessions 803 spanning state machine snapshots 412, additional graphs 706 may be created so that sessions 803 are built properly.

A session filter 833 (abstract base class) defines the general capability to filter a session 803 based on session context 818, session entry 833, associated application sessions 812, and corresponding application session entries 815. For example, a session filter 833 may examine the session duration, time of day, and number of states visited by a particular user of the subject system 133. The session filter 833 accepts and evaluates a candidate session 803 and then returns a Boolean value indicating whether the candidate session 803 passed the session filter 833. The session filter 833 base class supports the logical combination of different session filters 833, using AND, OR, and NOT operations, to make a single session filter 833 that can be evaluated logically. Session filters 833 are used by the reporting unit 315 when creating a report to determine which sessions 803 should be included in the report.

Figure 9:
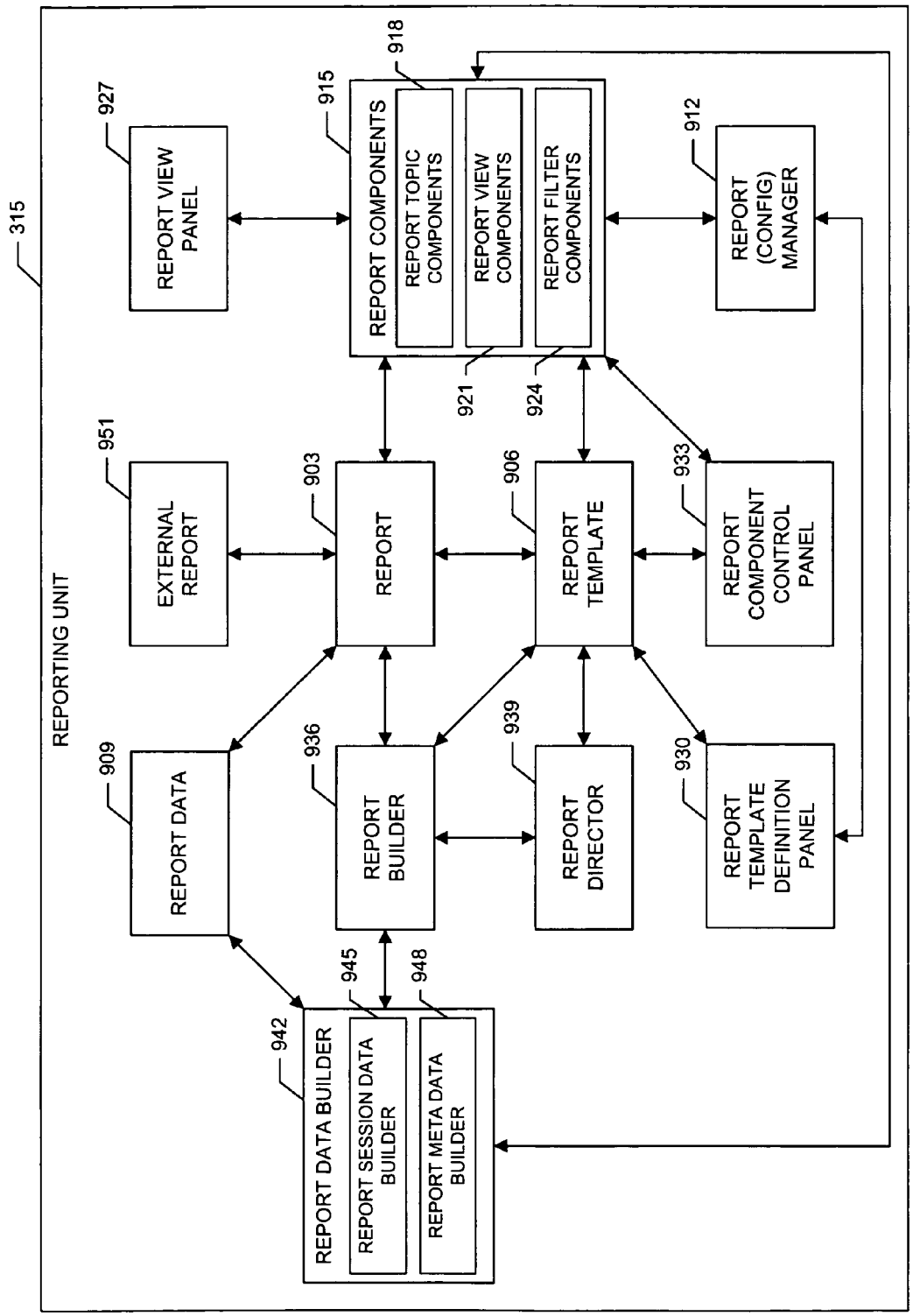
FIG. 9 displays a block diagram representation of a reporting unit of the activity analysis system in accordance with some embodiments of the present invention.

FIG. 9 displays a block diagram representation of a reporting unit 315 of the activity analysis system 153 in accordance with some embodiments of the present invention. The reporting unit 315 is adapted to generate a variety of reports and recommendations for the subject system 133 based on the behavior created in the sessions unit 330. The reporting unit 315 comprises a report 903, a report template 906, report data 909, a report manager 912, report components 915, a report view panel 927, a report template definition panel 930, a report component control panel 933, a report builder 936, a report director 939, and a report data builder 942.

A report 903 contains the results of an analysis of user activity. Reports 903 are generally created in the context of a project 603, discussed more fully below, and, thus, the project 603 has a set of reports 903 that can be accessed. A user of the activity analysis system 153 defines the settings and contents that direct the reporting analysis by creating a report template 906. A report template 906 includes attributes such as its name, category, date range, and report components. Each report 903 constitutes a set of relevant report data 909 that is built based on the views included in the report template 906.

The category is a hierarchical folder-like structure of categories and sub-categories, named by a string separated by a forward slash and useful for retrieving relevant and related reports 906 once they are created. The category is used to organize logical reports 903 created by a user of the activity analysis system 153, or for categorizing reports 903 created for a client and accessed via the web (ASP), such as the user interface 303. The category has nothing to do with the project 603 to which the report template 906 belongs. Instead, the category is a separate logical hierarchy kept by the report manager 912 and stored in the data storage unit 1109.

The date range options are used to establish the start and end date of a report 903 when it is created from its report template 906. Additionally, time of day options and days of week options are translated into session filter 833 sub-classes (e.g., session time of day filter and session day of week filter) that are used to limit the sessions 803 included in the report 903. A report 903 is created with respect to a date, which in the case of a batch report would be the time at which the batch is creating the report, but in the case of a "post-mortem" report could be any specific date in the past for which log data exists. The date range options are interpreted as disclosed in Table 3.

TABLE 3

| Date Range Option | Additional Parameters | Meaning |
| --- | --- | --- |
| All Log Data | N/A | The report should span the entire date range for which log data is available from the log sources that are part of the containing project. |
| Last Hour | N/A | Report on the last full hour prior to the with respect to date. |
| Last Day | Time of Day | Report on the last full day prior to the with respect to date. Optionally only include a particular time of day range. |
| Last Week | Time of Day Days of Week | Report on the last full week prior to the with respect to date. Optionally only include a particular time of day on particular days of the week. |
| Last Month | Time of Day Days of Week | Report on the last full month prior to the with respect to date. Optionally only include a particular time of day on particular days of the week. |
| Current Hour | N/A | Report on the current hour of and up until the with respect to date. |

TABLE 3-continued

| Date Range Option | Additional Parameters | Meaning |
| --- | --- | --- |
| Current Day | Time of Day | Report on the current day of and up until the with respect to date. Optionally only include a particular time of day range. |
| Current Week | Time of Day Days of Week | Report on the current week of and up until the with respect to date. Optionally only include a particular time of day on particular days of the week. |
| Current Month | Time of Day Days of Week | Report on the current month of and up until the with respect to date. Optionally only include a particular time of day on particular days of the week. |
| Custom | From Date & Time To Date & Time | Report on the specified "from date" through the "to date." |

A schedule is kept by the batch controller 1112 to schedule report generation. The schedule includes options such as those described in Table 4.

TABLE 4

| Schedule Option | Additional Parameters | Meaning |
| --- | --- | --- |
| Once | Time | Generate a report from the template once at the specified time. |
| Hourly | Time of Day Every N Hours Days of Week | Generate a report from the template every hour. Time of day is used to specify a limited range of time during the day to generate the hourly report. Every N hours allows the hourly report to be generated every 2, 3, or 4 or n hours. Days of the week specifies on which days of the week the hourly report should be generated. |
| Daily | Every N Days Days of Week | Generate a report from the template every day. Every N days allows the report to be generated every other, two, etc. days. Days of the week specifies for which days of the week the daily report should be generated. |
| Weekly | N/A | Generate a report from the template every week. |
| Monthly | N/A | Generate a report from the template every month. |

The report template 906 includes a definition of the report components 915 the user of the activity analysis system 153 wishes to include in reports 903 created using the report template 906. The report components 915 comprise report topic components 918, report view components 921, and report filter components 924. Report components 915 are identified by a unique name. Report components 915 also include a display name, description, and help text to be used by the user interface 303 of the activity analysis system 153.

Report topic components 918 are subject areas of analysis that are provided within the activity analysis system 153, as in the topic of a report. The core report topics are traffic, task, and recommendations. Each report topic component 918 is associated with one or more report view components 921. A report topic component 918 can be queried for a list of the names of its report view components 921 in the report template 906, in the order the names and view components 921 should be presented to the user in the user interface 303. Each report topic component 918 also has a corresponding keyword used for the purposes of searching and viewing identification.

A report view component 921 is a display of particular analysis results. Each report view component 921 requires a particular set of report data 909 to be built to construct the display. A report view component 921 is generally identified by a URI for purposes of access and identification inside the various report user interfaces 303. Each report view component 921 can have an associated report view panel 927 that is an interactive view within the user interface 303 that displays the results for a particular report 903 whose report template 906 includes the report view component 921. The report view panel 927 can be displayed in a standalone desktop application or in an applet on a web page. Additionally, each report view component 921 can create an XML representation of its analysis results, and can provide the URI of one or more extensible style language (XSL) files that are used to transform the XML into HTML for presentation as part of the user interface 303. If a report view component 921 does not provide a report view panel 927, the corresponding XML document will be used in the user interface 303 by default. If the report view component 921 does provide a report view panel 927 then that panel will be used in the interactive user interface 303.

Report filter components 924 provide a mechanism to filter the sessions 803 included in the report 903. A report filter component 924 can be requested for its associated session filter 833 for a given report 903. The session filter 833 evaluates a session 803 and indicates whether or not the particular session 803 passes the session filter 833. Filtering can be done on any aspect of the session 803 including, but not limited to, date, time, duration, length, particular entries, and tasks.

The report manager 912 keeps a list of the available report components 915 that the user of the activity analysis system 153 can add to a report template 906 while defining a new template using the user interface 303. This list is configurable at deployment time of the activity analysis system 153. The report template definition panel 930 may be represented in the JAVA programming language and may utilize Swing components to allow the user to define attributes of the report template 906. The report template definition panel 930 queries the report manager 912 for the available report components 915, requesting each for its report component control panel 933 which are included in the user interface 303.

Each report component 915 can have a report component control panel 933 that is used within the user interface 303 to configure the report component 915. The report component control panel may also be represented in the JAVA programming language and utilize Swing components to allow manipulation and definition of the report template 906. Each report component 915 has different configurable parameters. For example, a report filter component 924 has parameters that affect how the filtering of the sessions 803 is done (e.g., the maximum duration of a session 803 to accept). A report view component 921 has settings that define what is displayed in its interactive view (if it has a report view panel 927) and its XML/XSL-based HTML view. The attributes and methods for defining these settings are part of the concrete implementing sub-classes of the framework.

When a report 903 is to be generated, a report builder 936 is created and given the project 603 and report template 906 with respect to a particular date range. A report director 939 is created and given the report builder 936. The process of constructing the report 903 then follows a predetermined design pattern. The report director 939 initializes the report builder 936 to build the report 903 and then requests that the report builder 936 build the graphs, build the sessions, create and submit the report data builders 942, build the session-related report data 909, and then build the report meta data.

During initialization, the report builder 936 requests that the project 603 create a new report 903 instance and set the date range of the report 903 based on a supplied date. To create the graphs, the report builder 936 uses the presentation model state machines 403 in the project 603 and the report 903 date range to request a presentation graph 721 from the graph manager 703. Next, the report builder 936 requests an application graph 733 for each application model 718 in the project 603. For the session building, the report builder requests that the session manager 827 create sessions 803 for the presentation models 715 and for the application models 718 in the project 603 that correspond to the report data range. The report builder 936 then asks the report template 906 for a session filter 833 that is built from all of the report filter components 924 that are part of the report template 906, and then applies that session filter 833 to the sessions 803, resulting in a set of sessions 803 for which the report data 909 will be created.

There are two sub-types of report data builders 942, that are referred to herein as report session data builder 945 and report meta data builder 948. A report session data builder 945 builds its data given a set of sessions 803 and/or application sessions 812. A report meta data builder 948 builds its data given other report data 909 (typically generated by a report session data builder 945, but it is possible for one report meta data builder 948 to build data based on the output of another report meta data builder 948). To create and submit the report data builders 942, the report builder 936 requests each report view component 921 for the report data builders 942 it requires as input in order to generate the report data needed to provide the view's information to the user. Each submitted report data builder 942 in turn is requested to create other report data builders 942 on which it depends for input data.

To create the report session-related data, the report builder 936 iterates through the filtered session set and passes the sessions 803 to the report session data builders 945 whose input data dependency is satisfied. The iteration repeats until all input data dependencies of the report session data builders 945 have been satisfied and each report session data builder 945 has been able to create its report data 909. To create the report meta-data, the report builder 936 iteratively asks each report meta data builder 948, whose input data dependency is met, to build its data. The report data 909 is then added to the report 903, identified with a unique data ID string that indicates the type of data and the parameters that were used to build it.

The reporting unit 315 can also produce an "external" report 951 that is displayable in a web browser external to the activity analysis system 153, using the external report 951 class. The external report 951 includes a header with a table of contents menu, a summary page, and a page for each report view component 921 included in the report template 906 for the report 903. Each report view component 921 is requested in turn to create its XML Document, and then requested to provide an external XSL file that is used with extensible style language transformation (XSLT) to transform the XML into HTML. The table of contents menu includes a link to the page for each view, named using the display name of the related report view component 921, as well as links to anchor points within the page provided by the report view component 921. The collection of web report files is stored in a directory chosen by the user, wherein the directory defaults to the project directory. The applet code should be available when the web report is displayed in a web browser.

In each domain for which the activity analysis system 153 is extended, the many report component 915 and report data 909 are specialized to add custom state or behavior relevant for the domain.

Figure 10:
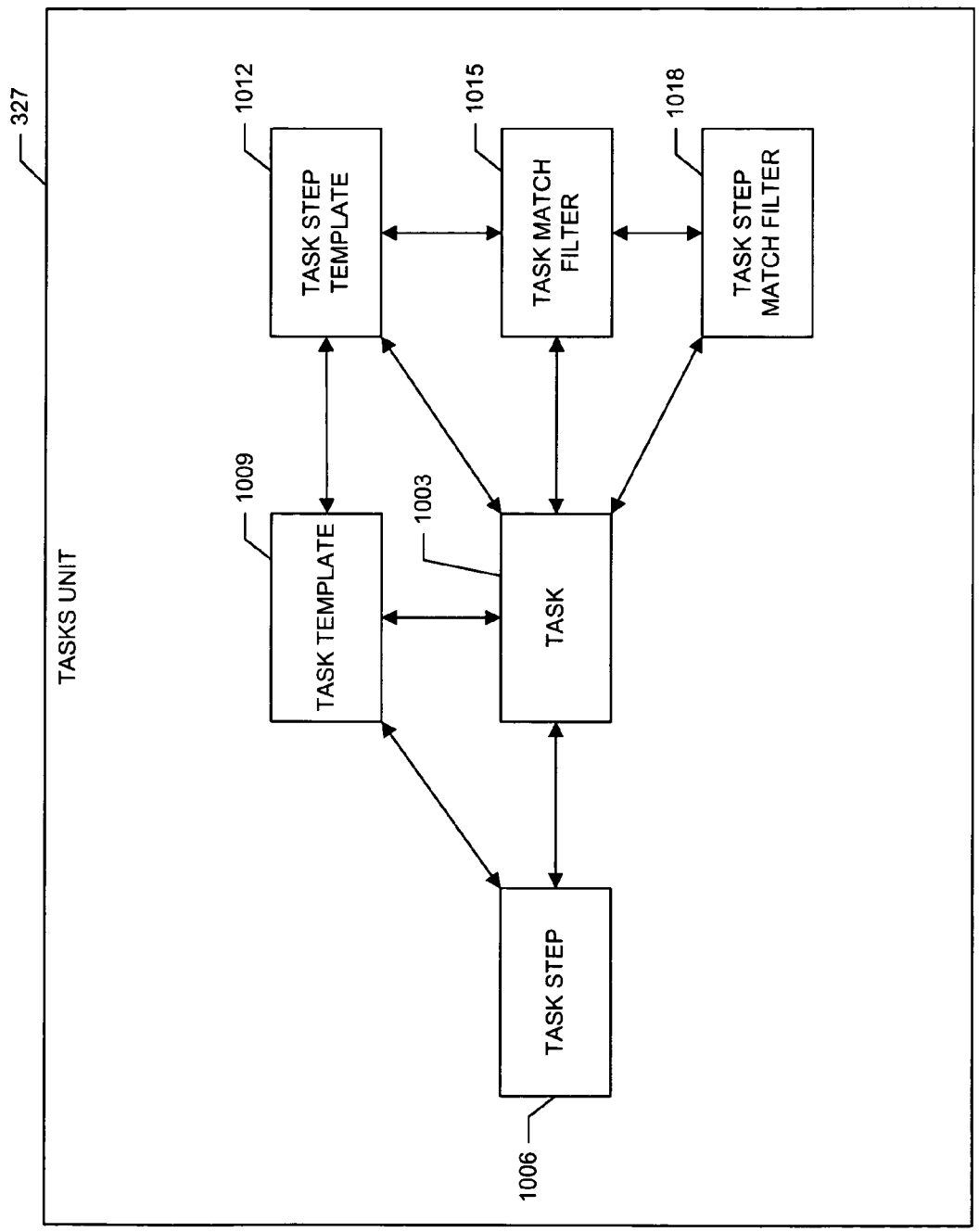
FIG. 10 displays a block diagram representation of a tasks unit of the activity analysis system in accordance with some embodiments of the present invention.

FIG. 10 displays a block diagram representation of a tasks unit 327 of the activity analysis system 153 in accordance with some embodiments of the present invention. The tasks unit 327 is adapted to permit specific and expected user behavior of the subject system 133 to be examined by the activity analysis system 153. The tasks unit 327 comprises a task 1003, task step 1006, a task template 1009, a task step template 1012, a task match filter 1015, and a task step match filter 1018.

The task 1003 is a sequence of states in a state machine 403 that a user might visit within the subject system 133. A task 1003 has an ordered sequence of task steps 1006. Each task step 1006 contains a set of graph nodes 709. Thus, the task 1003 is defined with respect to a graph 706, such as a presentation graph 721 or an application graph 733. A task 1003 is an instantiation of the task template 1009 that defines the task 1003. The task template 1009 is made up of task step templates 1012, which refer to a set of one or more graph nodes 709. When the task template 1009 is stored persistently, the unique identifiers of the graph nodes 709 in the stages are also stored. This allows a task 1003 to be "instantiated" for a particular time period, with different graphs 706 created from different state machine snapshots 412 of one or more state machines 403.

A task template 1009 is stored as part of a project 603, but the task template 1009 can be copied from one project 603 to another project 603, as long as the two projects 603 have the same state machines 403. Each project 603 has a list of task template 1009 names, and can load a task 1003 given the task template 1009 name and a graph 706. If the task 1003 can be instantiated for that graph 706, then the appropriate task 1003 is returned.

The task 1003 has a number of attributes that define how the task 1003 is used in analysis. The first is a Boolean flag to indicate whether direct completion is required. If the Boolean flag indicates that a task 1003 should be completed directly, then each stage in the task 1003 is completed contiguously, without interruption, within a session 803 before the task 1003 is deemed completed. The default method of task 1003 completion is identified as indirect completion, which allows session entries 806, other than those that match the task 1003, to be interspersed within the session 803 between those session entries 806 that match the task 1003. As illustrated in Table 1 above, a further option of the task 1003 specifies the allowed location and number of matches in a session 803.

Task match filter 1015 is an abstract base class that provides for filtering of possible task 1003 matches in a session 803 depending on session context 818. A task match filter 1015 is associated with a task 1003. Evaluation of the task match filter 1015 requires a session 803 and a location in the session 803 of a potential match of the task 1003. During evaluation the task match filter 1015 examines the session context 818 of the session 803 and its session entries 806, as well as any associated application sessions 812 and application session entries 815 at the candidate location, to decide if the match should be filtered or not. The configuration of a task topic 1754 allows any number of task match filters 1015 to be added to the report 903. A task step match filter 1018 is an abstract base class that is associated with a task step 1006. Evaluation of the task step match filter 1018 requires a session 803 and a location in the session 803 of a potential match of the task 1003. Both task match filter 1015 and task step match filter 1018 return a Boolean value given a session 803 and a location in the session 803 of a potential match, wherein Each filter 1015, 1018 returns true, if the location and session pass the applicable filter (e.g., the task match filter 1015 and task step match filter 1018).

Figure 11:
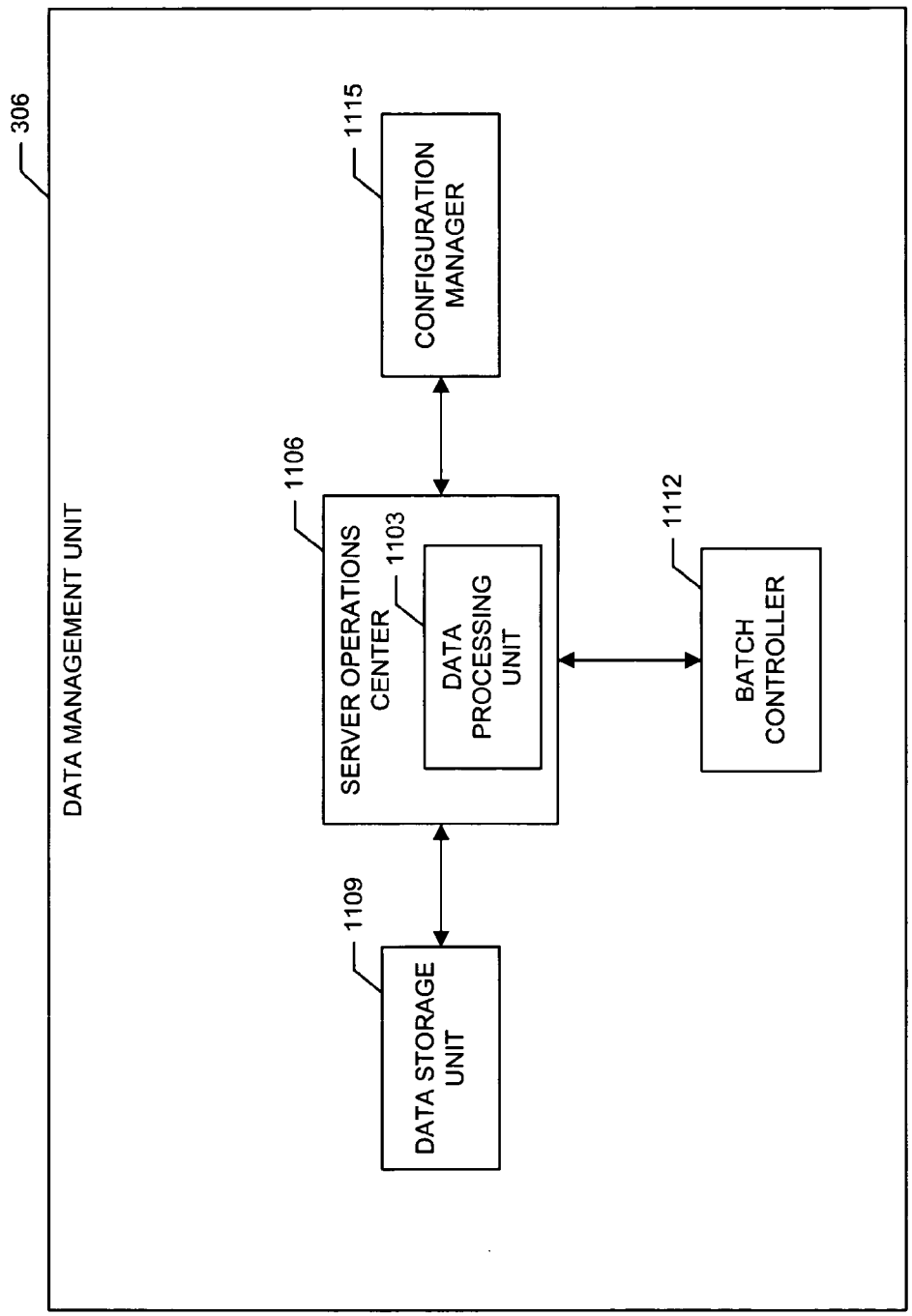
FIG. 11 displays a block diagram representation of a data management unit of the activity analysis system in accordance with some embodiments of the present invention.

FIG. 11 displays a block diagram representation of a data management unit 306 of the activity analysis system 153 in accordance with some embodiments of the present invention. As described above, the data management unit 306 is adapted to receive, provide, and process data utilized by the other components of the activity analysis system 153. Further, the data management unit 306 can apply schedule events and configure data, as necessary. The data management unit 306 comprises a server operations center 1106 including a data processing unit 1103, a data storage unit 1109, a batch controller 1112, and a configuration manager 1115.

The server operations center 1106 assists the reporting unit 315 in generating reports that have been scheduled for creation by the batch controller 1112. Generally, the server operations center 1106 includes a scalable cluster of machines or computing systems that perform the report computation in a parallel manner. The server operations center 1106 also assists the logging unit 318 in managing the stream of new log data being received from the subject system 133.

The data processing unit 1103 of the server operations center 1106 provides functionality and capabilities for processing various types of data and interfaces with the data storage unit 1109, as required by the server operations center 1106. Accordingly, the data processing unit 306 receives data from the data storage unit 1109 to provide to other components of the activity analysis system 153. Conversely, the data processing unit 306 receives data from the other components of the activity analysis system 153 to provide to the data storage unit 1109 for storage. Other components of the activity analysis system 153 can utilize the data processing unit 306 of the server operations center 1106 for executing various tasks upon applicable data. The data processing unit 306, therefore, provides processing capabilities when required by the other components.

The batch controller 1112 keeps a schedule of jobs related to modeling and report generation that need to be performed based on triggers. Triggers can be time-based or change-based in the subject system 133 being observed, or based on the addition of log data for a subject system 133. The batch controller 1112 uses a modeler 3403 and multiple instances of report generators 3406 to perform the jobs. As discussed above with reference to Table 3, the batch controller 1112 keeps the schedule for report generation, which includes various options. More specifically, the batch controller 1112 allows the activity analysis system 153 to be operated in batch mode, without an interactive graphical user interface 303. The batch controller 1112 provides a main routine with a command-line interface that allows the computational functionalities of the activity analysis system 153 to be executed automatically, including creating a state machine snapshot 412 and creating a report 903.

The configuration manager 1115 provides assistance to the state machine config 409 of the system modeling unit 312 and the log source 503 of the logging unit 318. For both the state machine config 409 and the log source 503, the configuration manager 1115 manages attribute value pairs of various types, storable in configuration files. The configuration manager 1115 keeps the values for the attributes applicable to the concrete state machine config 409 implementation and concrete log source 503 implementation, respectfully.

Figure 12:
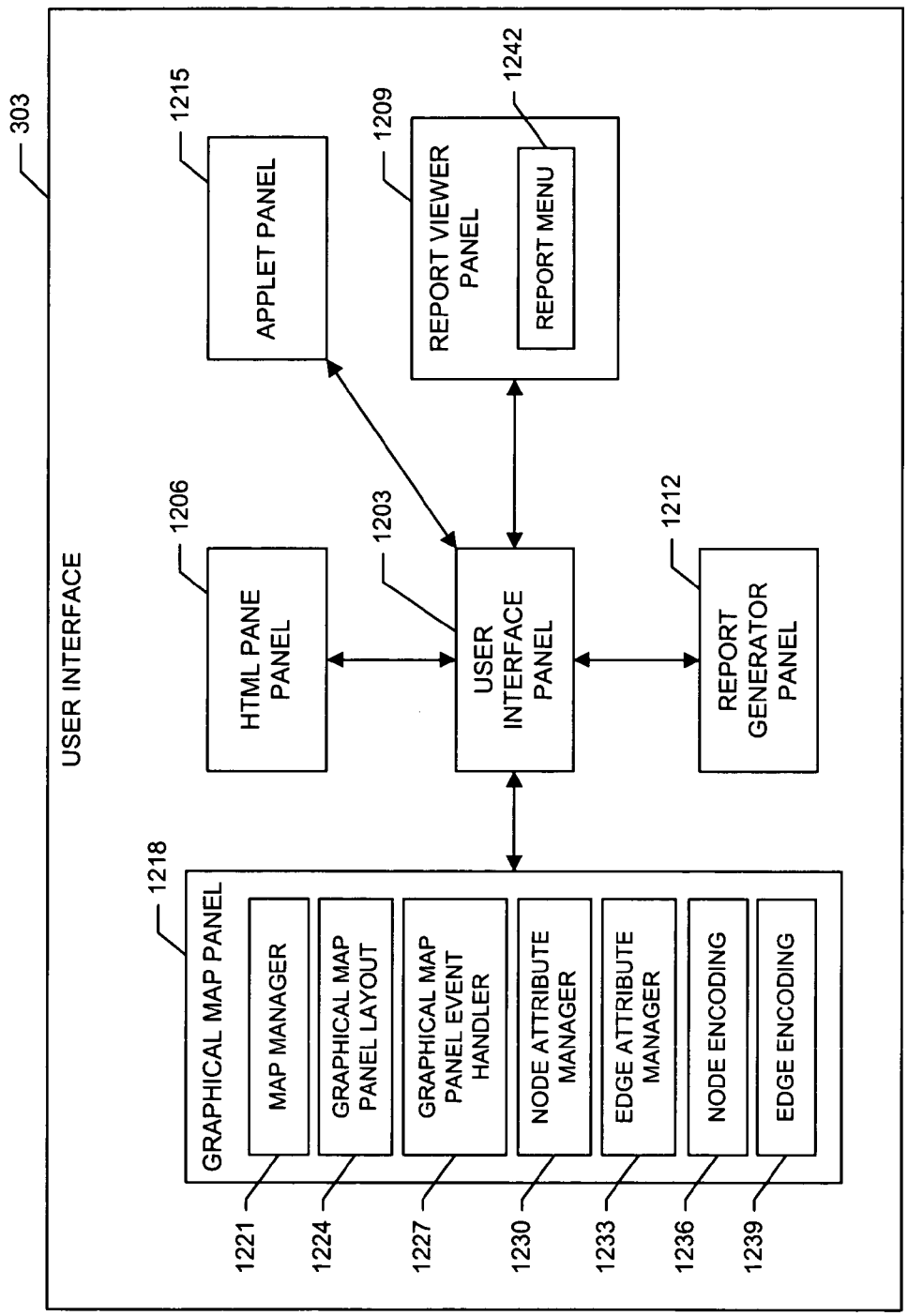
FIG. 12 displays a block diagram representation of a user interface of the activity analysis system in accordance with some embodiments of the present invention.

FIG. 12 displays a block diagram representation of a user interface 303 of the activity analysis system 153 in accordance with some embodiments of the present invention. The user interface 303 is adapted to receive and provide data between a user and the activity analysis system 153. The user interface 303 comprises a user interface panel 1203, an html pane panel 1206, a report viewer panel 1209 (including a report menu 1242), a report generator panel 1212, an applet panel 1215, and a graphical map panel 1218. The graphical map panel 1218 comprises a map manager 1221, a graphical map panel layout 1224, a graphical map panel event handler 1227, a node attribute manager 1230, an edge attribute manager 1233, node encoding 1236, and edge encoding 1239.

The user interface panel 1203 is the top-level container in the user interface 303 configuration. Generally, the user interface panel 1203 uses a web-browser like paradigm of showing a display identified by a URI, the current "viewing URI." The user interface panel 1203 provides a history mechanism and commands such as "back," "forward," and "home." The user interface panel 1203 provides access to the associated menu bar, tool bar, and assists the concrete implementing user interface 303. Additionally, the user interface panel 1203 has general user interface utility APIs, such as capturing a screen image and formatting the page for printing. Further, the user interface panel 1203 retains global information such as the current project 603 and report 903 being displayed, and the graph node 709 and recommendation that is "in focus," as selected by the user.

Internally, the user interface panel 1203 operates in two modes depending on the type of viewing URI provided. First, the user interface panel 1203 uses an html pane panel 1206 capable of rendering HTML and XML content to handle any provided HTML or XML. When an XML document is provided to the html pane panel 1206 for display, the filename of an associated XSL style sheet is also given so that the XML document can be translated into HTML. Second, the user interface panel 1203 has a registry of "wrapped components" for view panels that register themselves with a specific URI. View panels provide an interface capable of basic interactive functionality, such as resetting the layout and scrolling to make a particular graphical element visible.

The user interface panel 1203 contains a single main body component that is changed based on the viewing URI. When a viewing URI is set in the user interface panel 1203, the URI registry is examined to see if the URI has been registered. If so, the registered view panel is set as the current body of the user interface panel 1203. If the URI is not in the registry, the URI is examined by the user interface panel 1203 to determine whether it is an indicator for an HTML or XSL resource. If so, the html pane panel 1206 is set as the body component and the URI is passed on to the html pane panel 1206 for display.

The report viewer panel 1209 extends the user interface panel 1203. The menu bar and tool bar of the report viewer panel 1209 allow interactive viewing of reports 903. Additionally, the report viewer panel 1209 has a report menu 1242 with buttons for selecting the current report topic component 918 of the report's 903 report template 906 to display. When a user of the activity analysis system 153 clicks on the button of the report menu 1242 for a particular topic, the first report view component 921 within the list of view names present in the report template 906 (e.g., the list of view names of the report topic component 918) is displayed.

The report generator panel 1212 extends the user interface panel 1203. The report generator panel's 1212 menu bar and tool bar extend the capabilities of the report view panel 927 to allow access to the user interface 303 for creation and definition of projects 603, report templates 906, and tasks 1003. Additionally, the menu bar and tool bar of the report generator panel 1212 provide tools for defining state machines 403 and log sources 503.

The applet panel 1215 is related to the user interface panel 1203 used when the user interface 303 is embedded in a web-browser via an applet. This configuration has no menu or tool bar, and allows a single registered view panel to display as the applet at a time.

The graphical map panel (GMP) 1218 is an interactive user interface panel 1203 that graphically displays a graph 706, including the corresponding graph nodes 709 and graph edges 712. The framework anchored by the graphical map panel 1218 is used extensively by the user interface 303 for any view that presents an aspect of a graph 706, including traffic report results or configuring a state machine 403.

The graphical map panel has a set of user interface components to render graph nodes 709, called graph node components, and to render graph edges 712, called graph edge components. A graph node component renders its associated graph node 709 using many different visual attributes such as the (x, y) position, width, height, shape, shadow size, border size, background color, foreground color, and border color. The rendering is done based on the type of the graph node 709 being viewed, and the graph node component's highlighting and visual state. A graph node component can be in three different highlighting states: primary, secondary, or none. Additionally, the graph node component includes three Boolean states: visible or not visible, selected or not selected, and reduced or not reduced.

A graph edge component has an associated source graph node component and a destination graph node component. The graph edge component can be bi-directional. A graph edge component renders a line between its associated graph node components using many different visual attributes such as color, thickness, and line style (dashed, dotted, arrows, etc.). The rendering is done based on the type of graph edge 712 being viewed, with respect to a variety of Boolean states: visible or not visible, reduced or not reduced, important or not important, highlighted or not highlighted, and selected or not selected.

Graph node components are laid out in the graphical map panel 1218 view according to the graphical map panel layout 1224 associated with the graphical map panel 1218, and are assigned a level. The graphical map panel event handler 1227 of the graphical map panel 1218 provides user input handling for selection and manipulation of the graph node components and graph edge components. Additionally, the graphical map panel 1218 has a pop-up menu of commands available for the entire view, as well as a pop-up menu of commands available for a graph node component.

A single graph node component is designated as "primary focus" and a set of graph node components are highlighted in "secondary focus." Additionally, a separate set of nodes can be selected by the user. There is a set of transient focus graph edge components that are added based on the focus graph node component, and a set of permanent and transient focus edges that are highlighted with respect to the primary and secondary focus nodes.

In addition to manipulating the visual states of the graph node components and graph edge components (based on focus and selection), the graphical map panel 1218 uses an encoding mechanism to convey information about the nodes and edges in the graph. A node attribute manager 1230 manages the visual attributes of the graph node components in the graphical map panel 1218. Two edge attribute managers 1233 manage the visual attributes of the permanent graph edge components and the transient focus graph edge components, respectively.

The node attribute manager 1230 keeps node encodings 1236 for visual attributes of the graph node component. For example, the node attribute manager 1230 may have one node encoding 1236 for the node size and another node encoding 1236 for node color attributes. Each attribute's node encoding 1236 can be set independently. The node attribute manager 1230 is given a set of graphical node components to which the selected node encodings 1236 are being applied. The node attribute manager 1230 is then used to retrieve the background color, foreground color, border color, shadow color, border size, and shadow size of the graph node components during the drawing process. The node encoding 1236 set for node size is used for the size related attributes, and the node encoding 1236 set for color is used for the color related attributes. Additionally, the node attribute manager 1230 provides an API to access information about the selected encoding such as the maximum and minimum values for background color and size, and to retrieve a panel to include in the map legend of the graphical map panel 1218.

Node encoding 1236 provides the default encoding for the visual attributes of a graph node component based on characteristics of its associated graph node 709, relative to other graph node components in the set of nodes being encoded. By default the nodes are shown as rectangular or circular filled boxes with a shadow and a text label, with different background and shadow settings depending on the highlighting and selection state. Node encoding 1236 can be extended to change the default encoding. For example, the page view node encoding extends stat node encoding which extends node encoding 1236 to set the color and size of the graph node components based on the relative number of page views recorded for each graph node 709 in the report being viewed. The node encoding 1236 provides a legend panel graphically indicating the encoding, min/max values for the various attributes being encoded over the entire set of nodes, and text describing the attribute values of the particular graph node component.

The edge attribute manager 1233 keeps edge encodings 1239 for visual attributes of the graph edge component. The edge attribute manager 1233 has a set of graphical edge components to which the selected edge encodings 1239 are being applied. The difference between the node attribute manager 1230 and the edge attribute manager 1233 is that the edge attribute manager 1233 actually generates the set of edges using the state of the target graphical map panel 1218. The edge attribute manager 1233 is then used during drawing of the graph edge components in the set to retrieve their color and stroke (width and style). Additionally, the edge attribute manager 1233 provides an API to access information about the selected encoding such as its maximum and minimum values for color and stroke, and to retrieve a panel to include in the map legend for the graphical map panel 1218.

Edge encoding 1239 provides the default encoding for visual attributes of a graph edge component based on characteristics of its associated graph edge 712 (and graph nodes 709), relative to other graph edge components in the set of edges being encoded. By default the edges are shown as directed arrows, with the color and stroke of the line according to the type of edge (e.g., normal, recommended to add, low link utilization, and dominant path). Edge encoding 1239 can be overridden to change the default encoding. For example, the traffic edge encoding extends edge encoding 1239 to set the color and stroke of the graph edge components based on the relative amount of users that traversed the edge between the nodes recorded in the report being viewed. The edge encoding 1239 provides a legend panel graphically indicating the encoding, min/max values for the various attributes being encoded over the entire set of edges, and text describing the attribute values of a particular graph edge component. See FIG. 20 for a display screenshot of a traffic viewer view panel of the traffic topic, illustrating traffic edge encoding, in accordance with some embodiment of the present invention.

Figure 13:
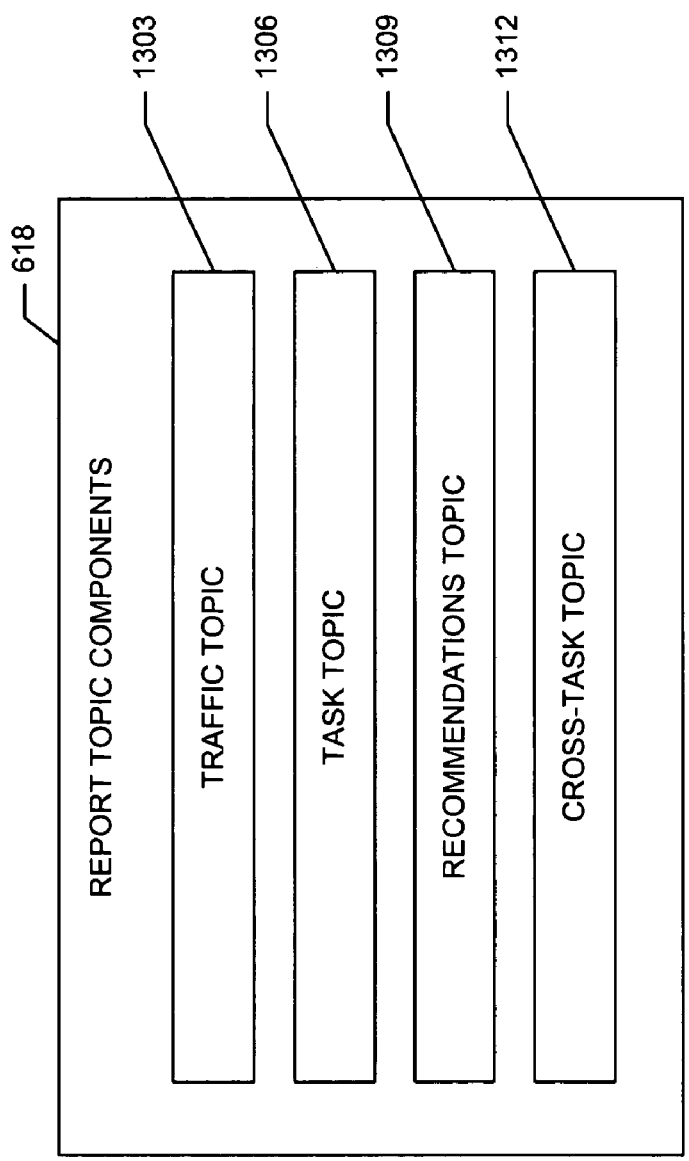
FIG. 13 displays a block diagram representation of report topic components of the reporting unit in accordance with some embodiments of the present invention.

FIG. 13 displays a block diagram representation of report topic components 918 of the reporting unit 315 in accordance with some embodiments of the present invention. Report topic components 918 are subject areas of analysis that are provided within the activity analysis system 153, as in the topic of a report. The core report topic components 918 include a traffic topic 1303, a task topic 1306, a recommendations topic 1309, and a cross-task topic 1312. Each report 903 relates to one presentation graph 721 and one or more application graphs 733, collectively referred to herein as the graphs 706 in the report 903. Each report 903 is created for a set of sessions 803 for the presentation graph 721, and corresponding application sessions 812 to the session 803 and application graphs 733.

In each domain of the subject system 133, core report topic components 918 are sub-classed as necessary to specialize the reports 903 in the particular domain. Additionally, new report components, relevant only to the domain, are implemented. A builder sub-class of core report session data builders 945 and core report meta data builders 948 for specialized core report data 909 is provided when needed to extract relevant information from the domain's state machines 403 and log sources 503.

The traffic topic 1303 provides functionality to a report 903, so that the report 903 can include analysis and recommendations concerning the traffic of the subject system 133. Traffic is generally defined as the number of users visiting or activating the subject system 133 over a period of time.

The task topic 1306 provides functionality to a report 903, so that the report 903 can include analysis and recommendations concerning a task 1003 within the subject system 133. As described above, a task 1003 represents a predefined, expected user behavior with reference to the subject system 133. More particularly, a task 1003 is defined as a sequence of steps or states (represented by state machines 403 of the subject system 133) within the subject system 133.

The recommendations topic 1309 provides functionality to a report 903, so that the report 903 can provide recommendations concerning the structure and logic of the subject system 133. Recommendations may cover a variety of aspects of the subject system 133, including restructuring of the user interface 139 and application logic 136 of the subject system 133, adding certain steps within the subject system 133, or deleting certain steps within the subject system 133.

The cross-task topic 1312 provides functionality to a report 903, so that the report 903 can provide analysis and recommendations concerning multiple tasks 1003 that could be represented in different domains of the subject system 133. The analysis of multiple tasks 1003 provides valuable report data 909 to be used by the activity analysis system 153 for evaluating which tasks 1003 may be preferable, or more effective, over other tasks 1003.

Figure 14:
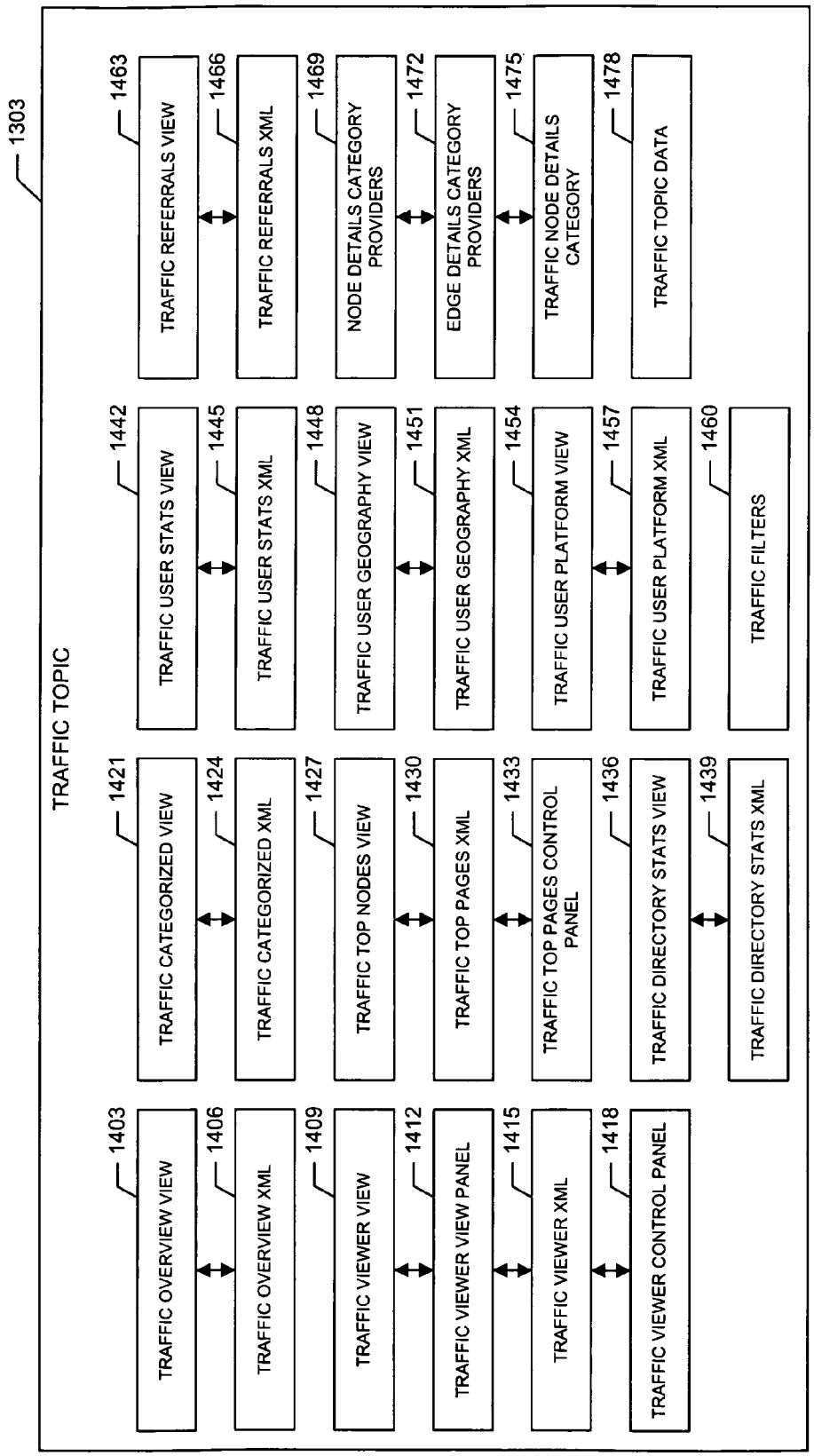
FIG. 14 displays a block diagram representation of a traffic topic of the report topic components in accordance with some embodiments of the present invention.

FIG. 14 displays a block diagram representation of a traffic topic 1303 of the report topic components 918 in accordance with some embodiments of the present invention. Generally, the traffic topic 1303 comprises a traffic overview view 1403, traffic overview XML 1406, a traffic viewer view 1409, a traffic viewer view panel 1412, traffic viewer XML 1415, a traffic viewer control panel 1418, a traffic categorized view 1421, traffic categorized XML 1424, a traffic top nodes view 1427, traffic top pages XML 1430, a traffic top pages control panel 1433, a traffic directory stats view 1436, traffic directory stats XML 1439, a traffic user stats view 1442, traffic user stats XML 1445, a traffic user geography view 1448, traffic user geography XML 1451, a traffic user platform view 1454, traffic user platform XML 1457, traffic filters 1460, a traffic referrals view 1463, traffic referrals XML 1466, node details category providers 1469, edge details category providers 1472, and a traffic node details category 1475.

The traffic reporting capabilities of the activity analysis system 153 expose the usage of a subject system 133 in terms of the graphs 706 that represent the state machines 403 and the sessions 803 that represent user interaction with the state machines 403. The traffic topic 1303 extends report topic components 918 and provides many different views that extend report view components 921. The views of the traffic topic 1303 present data stored in traffic data 1503, demographic data 1509, dominant path data 1521, referral data 1515, and user platform data 1527, all of which extend report data 909; as described in more detail below with reference to FIG. 15.

The traffic overview view 1403 provides a very high level overview of the traffic. The traffic overview view 1403 includes general statistics about the graphs 706 such as the number of nodes and edges, and general statistics about the sessions 803, such as the count, total entries, and average duration. Other than the general graph 706 statistics, most of the necessary information is found in traffic data 1503 and demographic data 1509 for the report 903. Thus, the traffic overview view 1403 also depends on a traffic data builder 1506 and a demographic data builder 1512 to construct the data for all of the sessions 803 in the report 903.

Associated with the traffic overview view 1403, the traffic overview XML 1406 is adapted to create the XML document version of the traffic overview view 1403 that can be transformed into HTML for display. The HTML page includes tabular statistics and charts showing the overall traffic timeline per week and/or day.

The traffic viewer view 1409 is an interactive graphical display of the traffic for the report 903. The traffic viewer view 1409 allows the user to examine in depth several types of report data 909, such as traffic data 1503, demographic data 1509, dominant path data 1521, and referral data 1515. The associated traffic viewer view panel 1412 extends report view panel 927 and contains a concrete realization of the graphical map panel 1218 framework on top, and a table of statistics for graph nodes 709 at the bottom. Screenshots of the traffic viewer view 1409 interactive graphical display, incorporating node information, node statistics, incoming traffic, and outgoing traffic, are illustrated in FIGS. 20-24.

The graphical map panel 1218 framework in the traffic viewer view panel 1412 is based around the traffic viewer graphical map panel 1218. Several and various node encoding 1236 sub-classes are used in this concrete realization of the graphical map panel 1218 framework. Table 5 illustrates several of the node encoding 1236 sub-classes utilized.

TABLE 5

| Node Encoding Sub-Class | Description |
| --- | --- |
| ClickawayNodeEncoding | A sub-class of the stat node encoding that colors and sizes the nodes according to the number of click-aways (last in session) it has in a report. |
| ClickawayPercentageNodeEncoding | A sub-class of the stat node encoding that colors and sizes the nodes according to the click-away percentage (click-aways/hits) it has in a report. |
| ClickinNodeEncoding | A sub-class of the stat node encoding that colors and sizes the nodes according to the number of click-ins (first in session) it has in a report. |
| PageViewNodeEncoding | A sub-class of the stat node encoding that colors and sizes the nodes according to the number of page views it has in a report. |
| StatNodeEncoding | An abstract sub-class of the node encoding that colors and sizes the nodes according to a numerical statistic. |
| ViewingTimeNodeEncoding | A sub-class of the stat node encoding that colors and sizes the nodes according to the average viewing time it has in a report. |
| ViewsAfterNodeEncoding | A sub-class of the stat node encoding that colors and sizes the nodes according to the average number of page views after the node in a session. |
| ViewsBeforeNodeEncoding | A sub-class of the StatNodeEncoding that colors and sizes the nodes according to average number of page views before the node in a session. |

Several and various edge encoding 1239 sub-classes are used in this concrete realization of the graphical map panel 1218 framework. Table 6 illustrates several of the edge encoding 1239 sub-classes utilized.

TABLE 6

| Edge Encoding Sub-Class | Description |
| --- | --- |
| DominantPathEdgeEncoding | A sub-class of the edge encoding that colors and strokes the edges or links between nodes according to the dominant paths of a certain number of steps into our out of a node. |
| FilteredRangeEdgeEncoding | A sub-class of the edge encoding that colors and strokes the edges or links between nodes according to a numerical statistic in a range that can be configured to show only a particular set of edges within the range according to min and max percentage bounds, i.e., the top 10%. |
| TrafficEdgeEncoding | A sub-class of FilteredRangeEdgeEncoding that colors and strokes the edges or links into or out of a node according to the amount of traffic traversing each edge. |

Figure 20:
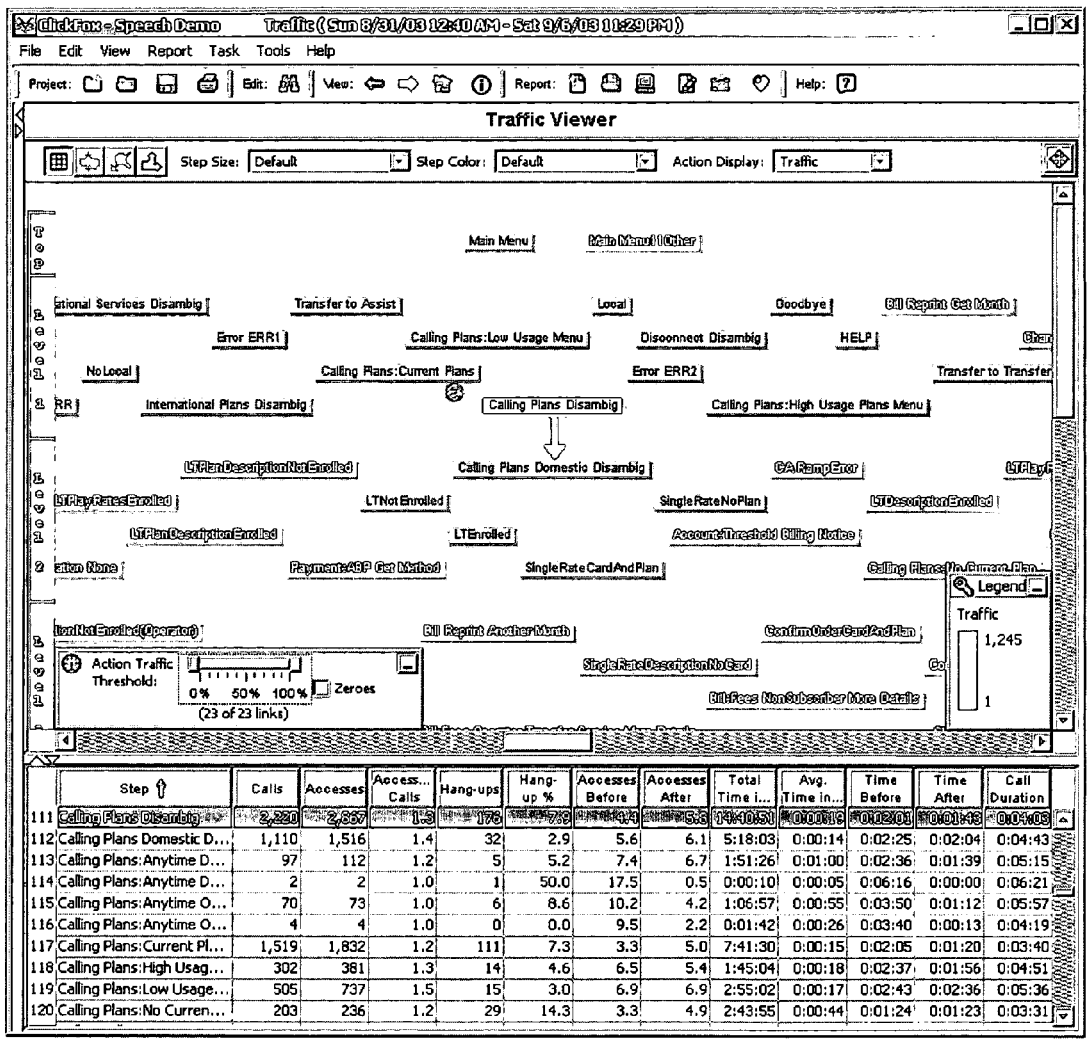
FIG. 20 displays a screenshot of a traffic viewer view panel of the traffic topic, illustrating traffic edge encoding, in accordance with some embodiments of the present invention.

See FIG. 20 for a display screenshot of a traffic viewer view panel of the traffic topic, illustrating traffic edge encoding, in accordance with some embodiment of the present invention. By clicking on a node or edge and choosing the details option in the pop-up menu in the graphical map panel 1218 view contained in the traffic viewer view panel 1412, the traffic viewer view 1409 allows access to node details and edge details. The node details and edge details displays are provided by node details category providers 1469 and edge details category providers 1472, respectively. Generally, the node and edge details are displayed on the bottom of the traffic viewer view panel 1412, in place of a node traffic table.

Further, the traffic viewer view panel 1412 is registered with the user interface panel 1203 for use when displaying a report 903 by the activity analysis system 153. See FIG. 21 for a screenshot of a traffic viewer view panel of the traffic topic, showing the traffic node details category illustrating node overview information, in accordance with some embodiments of the present invention.

Associated with the traffic viewer view 1409, the traffic viewer XML 151 is adapted to create the XML document version of the traffic viewer view 1409 that can be transformed into HTML for display. The traffic viewer control panel 1418 allows the user to configure whether the traffic viewer view 1409 is shown as an applet in the external web-based report, or if screen snapshots of selected information are included. The information can include screen snapshots of the incoming and outgoing traffic and/or dominant paths for particular nodes.

The traffic categorized view 1421 provides a breakdown of the traffic into categories by day of week, by hour of day, and by length of session 803 (entry count). The corresponding information is found in the traffic data 1503 for the report 903. Thus, the traffic categorized view 1421 also depends on a traffic data builder 1506 to construct the data for all of the sessions 803 in the report 903.

Associated with the traffic categorized view 1421, the traffic categorized XML 1424 is adapted to create the XML document version of the traffic categorized view 1421 that can be transformed into HTML for display. The HTML page includes tabular statistics, charts showing views, hits, and sessions 803 by day of week and by hour of day, and a chart of sessions 803 by length of session 803.

The traffic top nodes view 1427 provides a summary of the top and bottom nodes for each of various traffic statistics, which include, but are not limited to views, hits, click-ins, click-aways, click-away percentages, average views before, average views after, average viewing time, average time before, average time after. For example, top average viewing time includes the top predetermined number of nodes in terms of highest average viewing time. The relevant information is found in traffic data 1503 for the report 903. Thus, the traffic top nodes view 1427 also depends on a traffic data builder 1506 to construct the data for all of the sessions 803 in the report 903.

Associated with the traffic top nodes view 1427, the traffic top pages XML 1430 is adapted to create the XML document version of the traffic top nodes view 1427 that can be transformed into HTML for display. The HTML page includes tabular statistics and charts showing the results.

The traffic top pages control panel 1433 allows the user of the activity analysis system 153 to set the statistics that are included in the traffic top nodes view 1427, and the number of top and bottom pages to show for each statistic.

The traffic directory stats view 1436 provides a summary of traffic according to the URI hierarchy of each graph node 709, by directory. The traffic directory stats view 1436, thus, groups all graph nodes 709 according to the path in their URI. The relevant information is found in traffic data 1503 for the report 903. Thus, the traffic directory stats view 1436 also depends on a traffic data builder 1506 to construct the data for all of the sessions 803 in the report 903.

Associated with the traffic directory stats view 1436, the traffic directory stats XML 1439 is adapted to create the XML document version of the traffic directory stats view 1436 that can be transformed into HTML for display. The HTML page includes tabular statistics and charts showing views, hits, and sessions 803.

The traffic user stats view 1442 provides repeat and top user related traffic statistics. The traffic user stats view 1442 includes a breakdown of the repeat user count by number of sessions 803 and the top users by views, hits, and session count. The relevant information is found in the demographic data 1509 for the report 903. Thus, the traffic user stats view 1442 also depends on a demographic data builder 1512 to construct the data for all of the sessions 803 in the Report 903.

Associated with the traffic user stats view 1442, the traffic user stats XML 1445 is adapted to create the XML document version of the traffic user stats view 1442 that can be transformed into HTML for display. The HTML page includes tabular statistics and charts showing the results.

The traffic user geography view 1448 provides statistics regarding the geographical origin of the users. The traffic user geography view 1448 includes a breakdown of the top countries, regions (state & province), and metropolitan areas from which the users came to the subject system 133. The relevant information is found in the demographic data 1509 that is part of the traffic data 1503 for the report 903. Thus, the traffic user geography view 1448 also depends on a traffic data builder 1506 and a demographic data builder 1512 to construct the data for all of the sessions 803 in the Report 903.

Associated with the traffic user geography view 1448, the traffic user geography XML 1451 is adapted to create the XML document version of the traffic user geography view 1448 that can be transformed into HTML for display. The HTML page includes tabular statistics and charts showing the results.

The traffic user platform view 1454 provides statistics regarding the platform users used to access the subject system 133. The relevant information is highly domain dependent, so this class is abstract. For example, in the web domain the traffic user platform view 1454 includes a breakdown of the platform by web browser type (if applicable), operating system, and connection speed. This information is found in the sub-class of user platform data 1527 and the traffic data 1503 for the report 903. Thus, the traffic user platform view 1454 also depends on a user platform data builder 1530 and a traffic data builder 1506 to construct the data for all of the sessions 803 in the report 903.

Associated with the traffic user platform view 1454, the traffic user platform XML 1457 is adapted to create the XML document version of the traffic user platform view 1454 that can be transformed into HTML for display. The HTML page includes tabular statistics and charts showing the results.

The traffic referrals view 1463 provides session referral information statistics for the names of the top referring locations. The relevant information is found in the referral data 1515 for the report 903. Thus, the traffic referrals view 1463 also depends on a referral data builder 1518 to construct the data for all of the sessions 803 in the report 903.

Associated with the traffic referrals view 1463, the traffic referrals XML 1466 is adapted to create the XML document version of the traffic referrals view 1463 that can be transformed into HTML for display. The HTML page includes tabular statistics.

The traffic filters 1460 provide the traffic topic 1303 with the ability to filter traffic topic data 1478 based on the particular characteristics of the traffic data 1503, demographic data 1509, referral data 1515, dominant path data 1521, user platform data 1527, and other data as necessary. The traffic filters 1460 are described more fully bellow with reference to FIG. 16.

Figure 15:
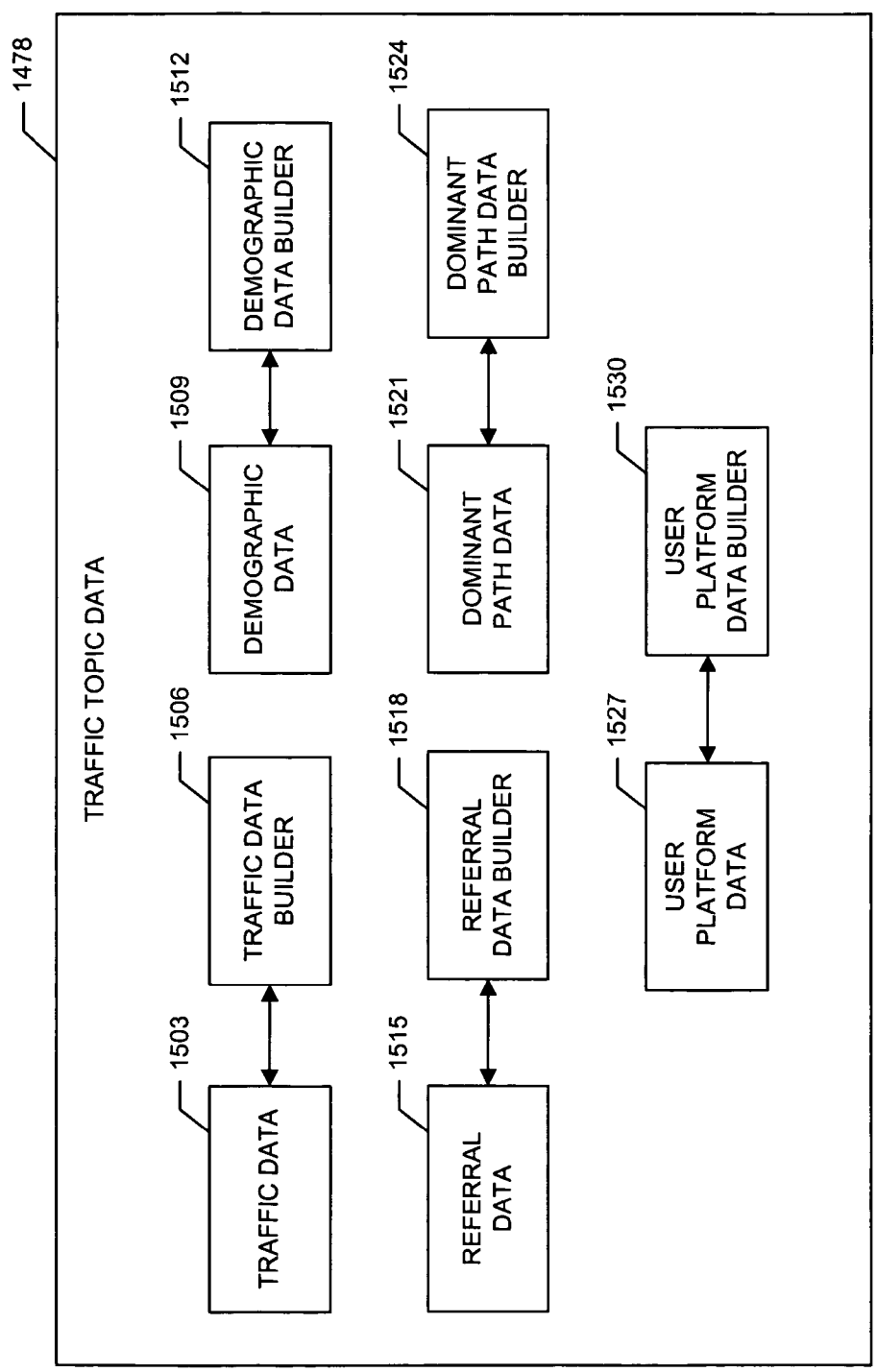
FIG. 15 displays a block diagram representation of traffic topic data of the traffic topic in accordance with some embodiments of the present invention.

FIG. 15 displays a block diagram representation of traffic topic data 1478 of the traffic topic 1303 in accordance with some embodiments of the present invention. The traffic topic data 1478 of the traffic topic 1303 comprises traffic data 1503, a traffic data builder 1506, demographic data 1509, a demographic data builder 1512, referral data 1515, a referral data builder 1518, dominant path data 1521, a dominant path data builder 1524, user platform data 1527, and a user platform data builder 1530.

The traffic data 1503 utilized by the traffic topic 1303 extends report data 909 and provides a plethora of traffic data for a graph 706 and the corresponding sessions 803. Some of the traffic data 1503 is node-based, such as views, hits, viewing time, and time before and after. Aggregate totals of the categories of traffic data 1503 are kept over all nodes. Node-relational statistics are kept for access counts from one node to another in a given step in the session 803. Accordingly, the number of incoming and outgoing hits for a node at each number of steps in a session 803 is recorded. The traffic data 1503 includes timeline data, which comprises views, hits, and visits by day in the time period, and is categorized by day of week and hour of day. The traffic data builder 1506 extends report session data builder 945, filling in the traffic data 1503 session 803 by session 803. The traffic data builder 1506 constructs the traffic data 1503 by utilizing the applicable graph 706 of the session 803.

The demographic data 1509 extends report data 909 and includes visit and view counts per user, repeat users, domain names, and geographic locations of users. The demographic data builder 1512 extends report session data builder 945 and fills in the demographic data 1509.

The dominant path data 1521 extends report data 909 and provides incoming and outgoing dominant paths for nodes according to a set of sessions 803. Each path is a sequence of graph nodes 709, along with a count of the number of occurrences. The dominant path data builder 1524 extends report session data builder 945 and fills in the dominant path data 1521. The dominant path data builder 1524 is provided with a list of graph nodes 709 (for which to build the dominant paths), the number of top paths for each node to record, and the length of the paths to compute and record.

If the list of graph nodes 709 is not specified, the dominant path data builder 1524 uses the traffic data 1503 to create a set of "focal" nodes as a union of the top predetermined number of nodes in various traffic statistics, including views, hits, click-ins, click-aways, click-away percentages, and average viewing time. The predetermined number of top nodes is configurable within the activity analysis system 153. The dominant path data builder 1524 then computes the dominant paths for these focal pages. If the predetermined number of top nodes is zero, then the dominant path data builder 1524 does not computer any dominant paths.

The referral data 1515 extends report data 909 and provides a breakdown of top referring locations by URI. The top referring locations are aggregated by hostname. The referral data builder 1518 extends the report session data builder 945 and fills in the referral data 1515. A separate configuration file provides a list of search query keywords whose presence in the URI identify that host as a search engine. For these the referral counts are aggregated by search keyword, and by search engine hostname.

The user platform data 1527 extends report data 909 and provides counts of web browsers and the operating system used by users to access the subject system 133. The user platform data builder 1530 extends report session data builder 945 and fills in the user platform data 1527. The user platform data builder 1530 uses information from the sessions 803 about the user agent to record these statistics.

Figure 29:
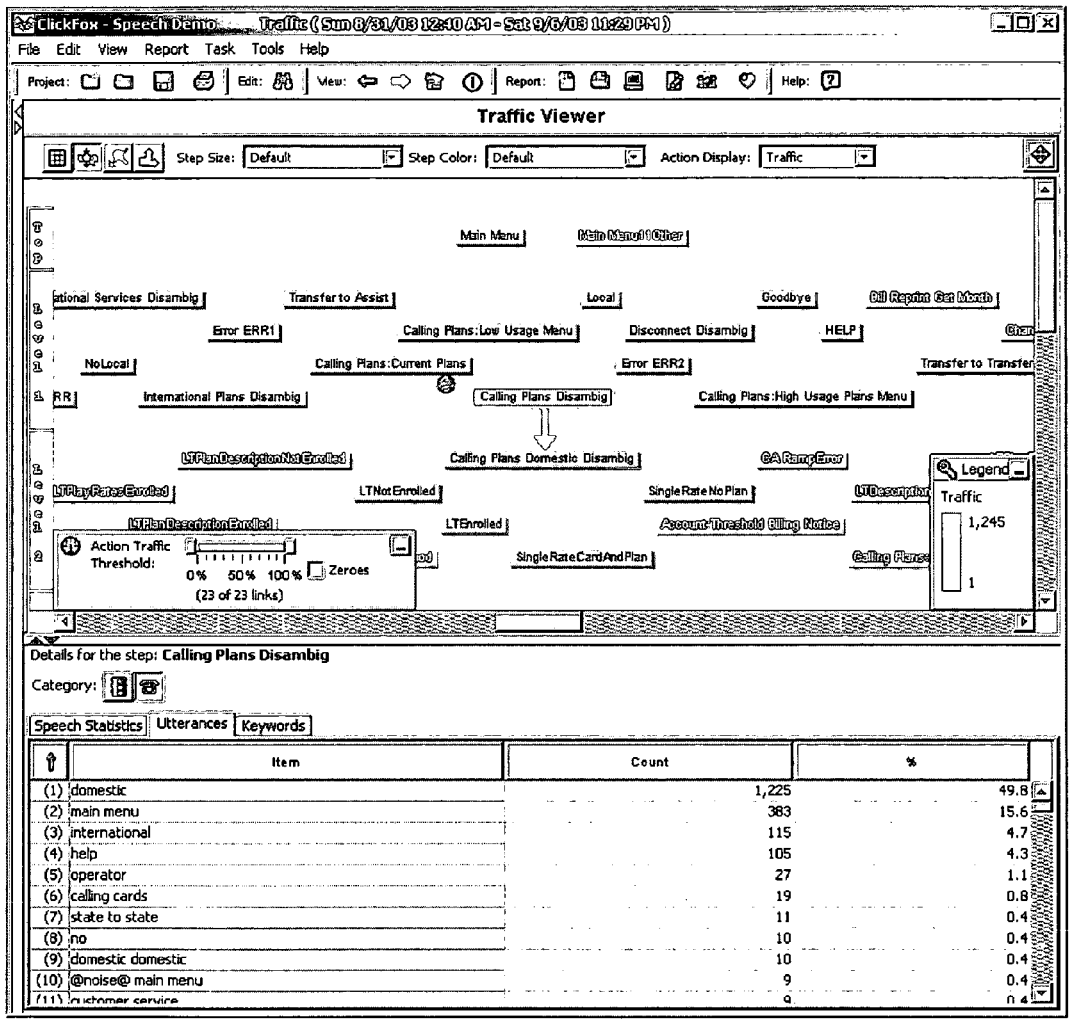
FIG. 29 displays a screenshot of an IVR traffic viewer view panel of the IVR traffic topic, showing the speech node details category, illustrating utterances, in accordance with some embodiments of the present invention.
Figure 30:
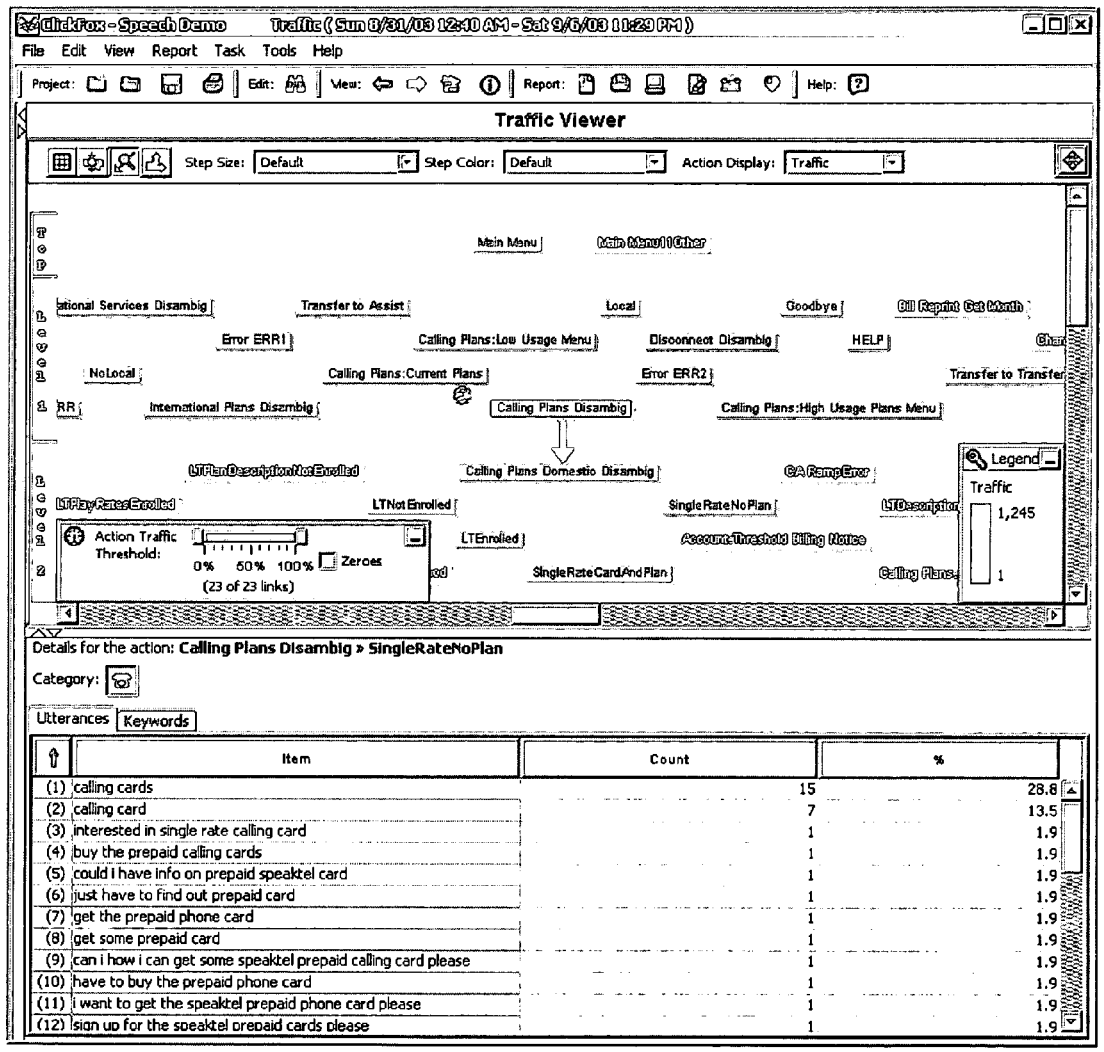
FIG. 30 displays a screenshot of an IVR traffic viewer view panel of the IVR traffic topic, showing the speech edge details category, illustrating utterances for an edge, in accordance with some embodiments of the present invention.
Figure 31:
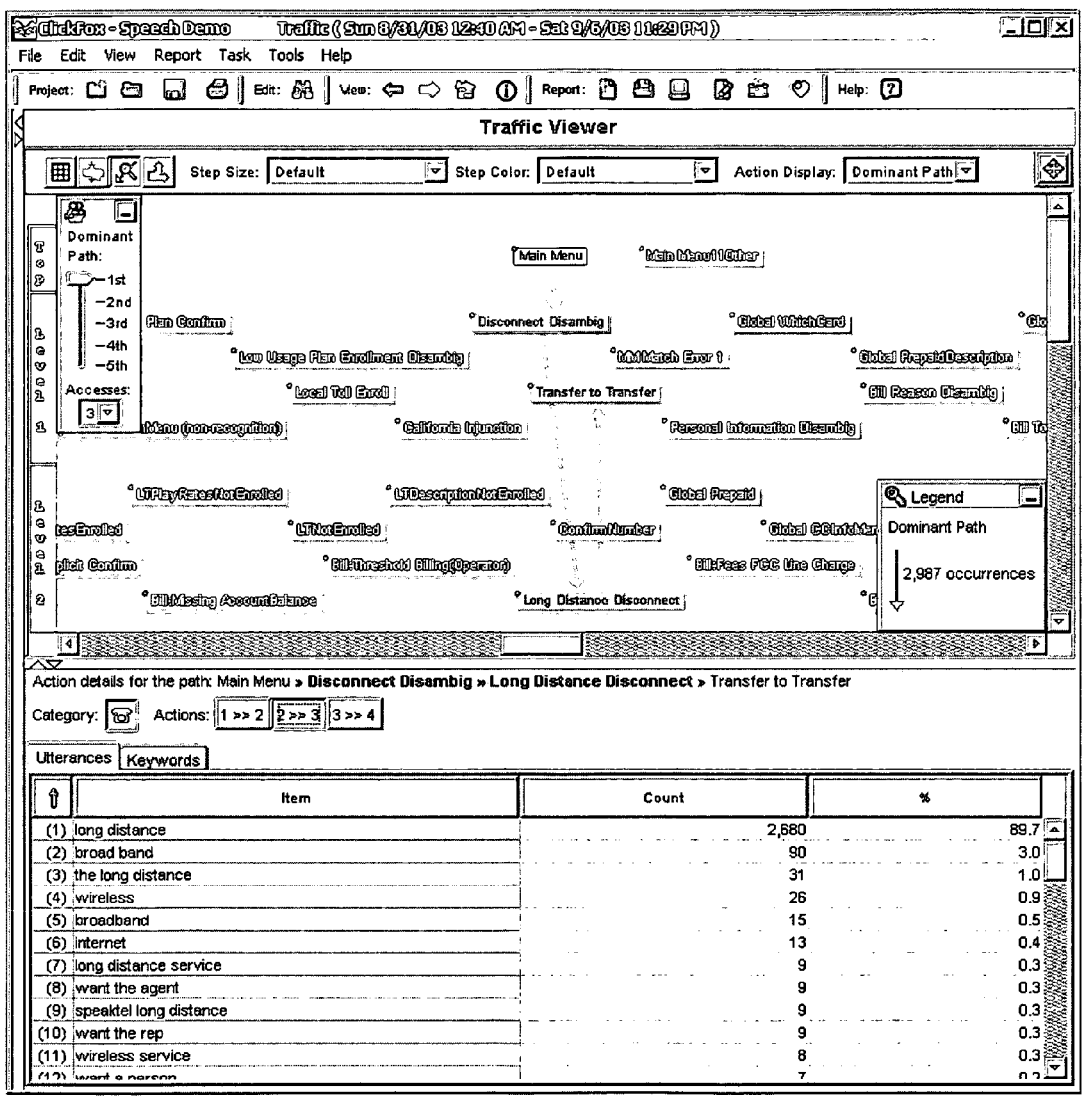
FIG. 31 displays a screenshot of an IVR traffic viewer view panel of the IVR traffic topic, showing the speech node details category illustrating utterances for a dominant path, in accordance with some embodiments of the present invention.

The node details category providers 1469 and edge details category providers 1472 are used by the traffic viewer view 1409 to populate node and edge details of a display. Node details category provider 1469 and edge details category provider 1573 are abstract classes that are extended in various domains and application models 718. The node details category providers 1469 and edge details category providers 1472 have APIs to access their name, icon image, a sub-category count, and sub-category names. There is a display creation API used by the traffic topic 1303 to ask the provider for a panel displaying a text area, chart and/or table with the concrete implementing class's details. The node details category provider 1469 has an API to create the node details panel for a specific node in the display, given a sub-category index and a graph node 709. A screenshot of the node details category 1469 is illustrated in FIGS. 21-24 and 29. Similarly, the edge details category provider 1472 has an API to create the edge details panel for a specific edge in the display, given a sub-category index and a source graph node 709 and a destination graph node 709, or a task 1003 representing a path and a step index. Screenshots of the edge details category 1472, including an edge and a dominant path, are illustrated in FIGS. 30 and 31. The traffic viewer view 1409 uses the latter API to allow a user of the activity analysis system 153 to select a dominant path in the display and see the edge details for each step of that path.

The traffic node details category 1475 extends node details category provider 1469 to provide four different sub-categories of information in the traffic topic's node details display. All of this data is retrieved from the traffic data 1503 built for the traffic viewer view 1409. Table 7 describes the four different sub-categories of information provided by the traffic node details category 1475. Screenshots of the traffic node details category display are shown in FIGS. 21-24, as specified in Table 7.

TABLE 7

Figure 21:
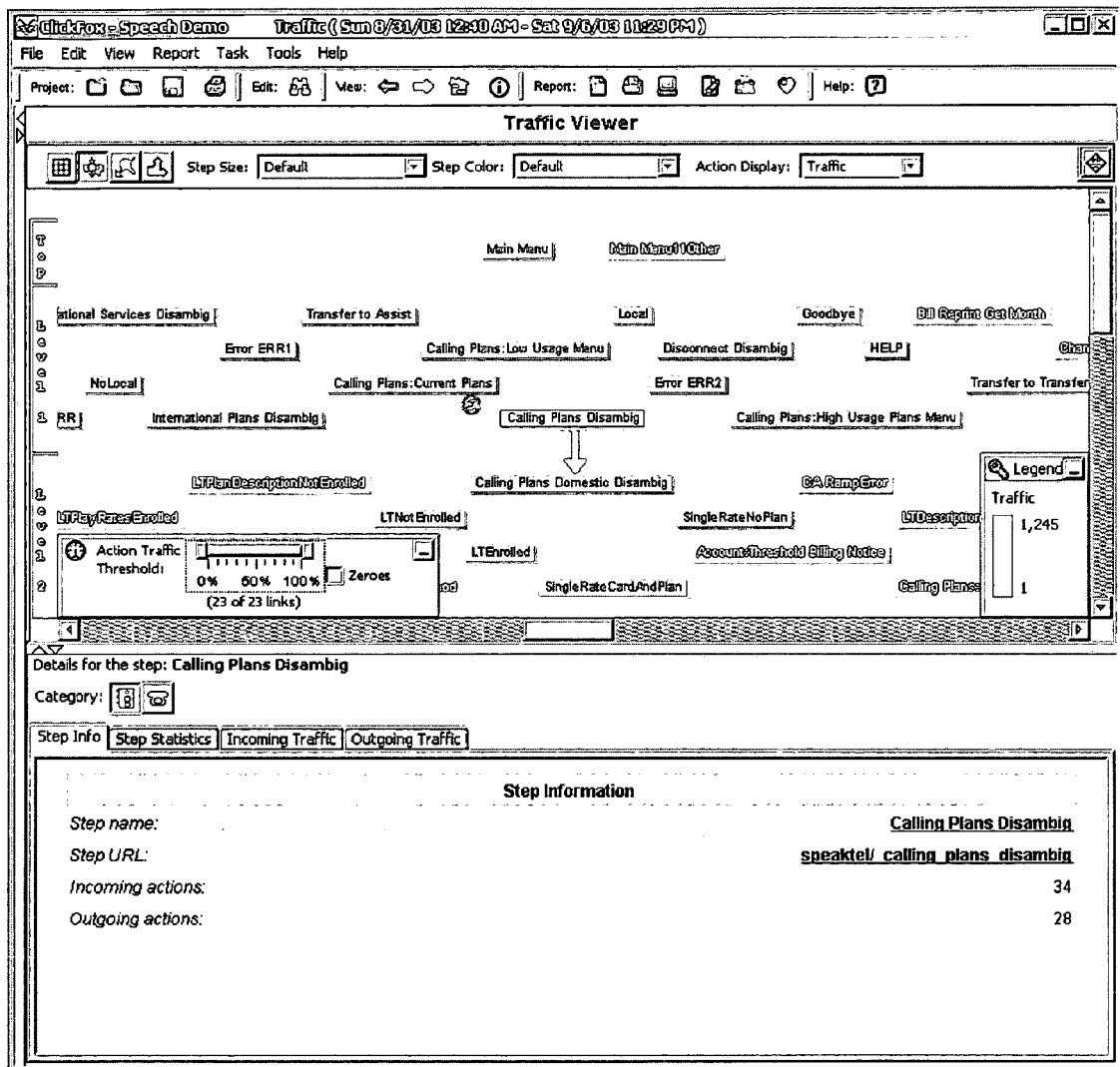
FIG. 21 displays a screenshot of a traffic viewer view panel of the traffic topic, showing the traffic node details category illustrating node overview information, in accordance with some embodiments of the present invention.
Figure 22:
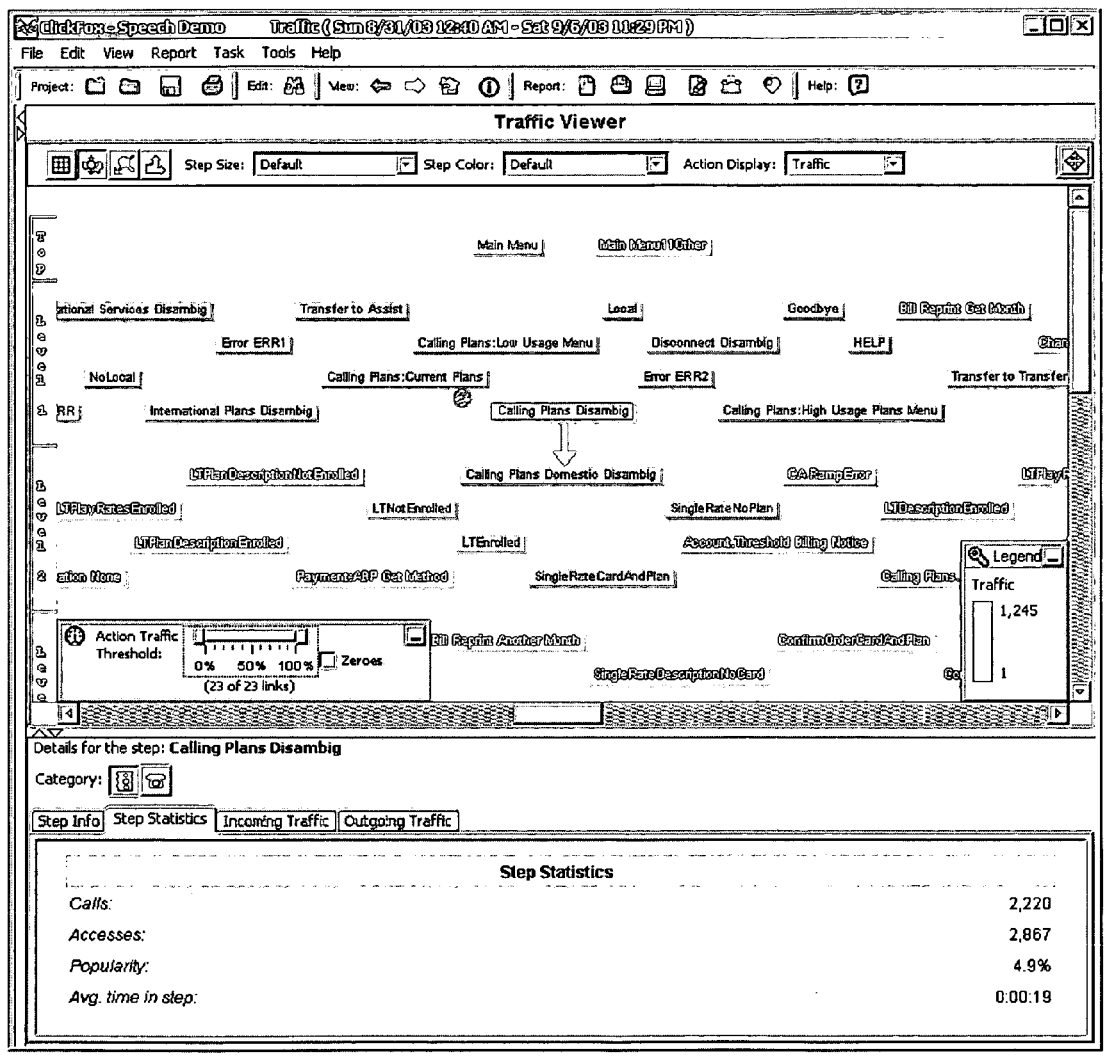
FIG. 22 displays a screenshot of a traffic viewer view panel of the traffic topic, showing the traffic node details category illustrating node traffic statistics, in accordance with some embodiments of the present invention.
Figure 23:
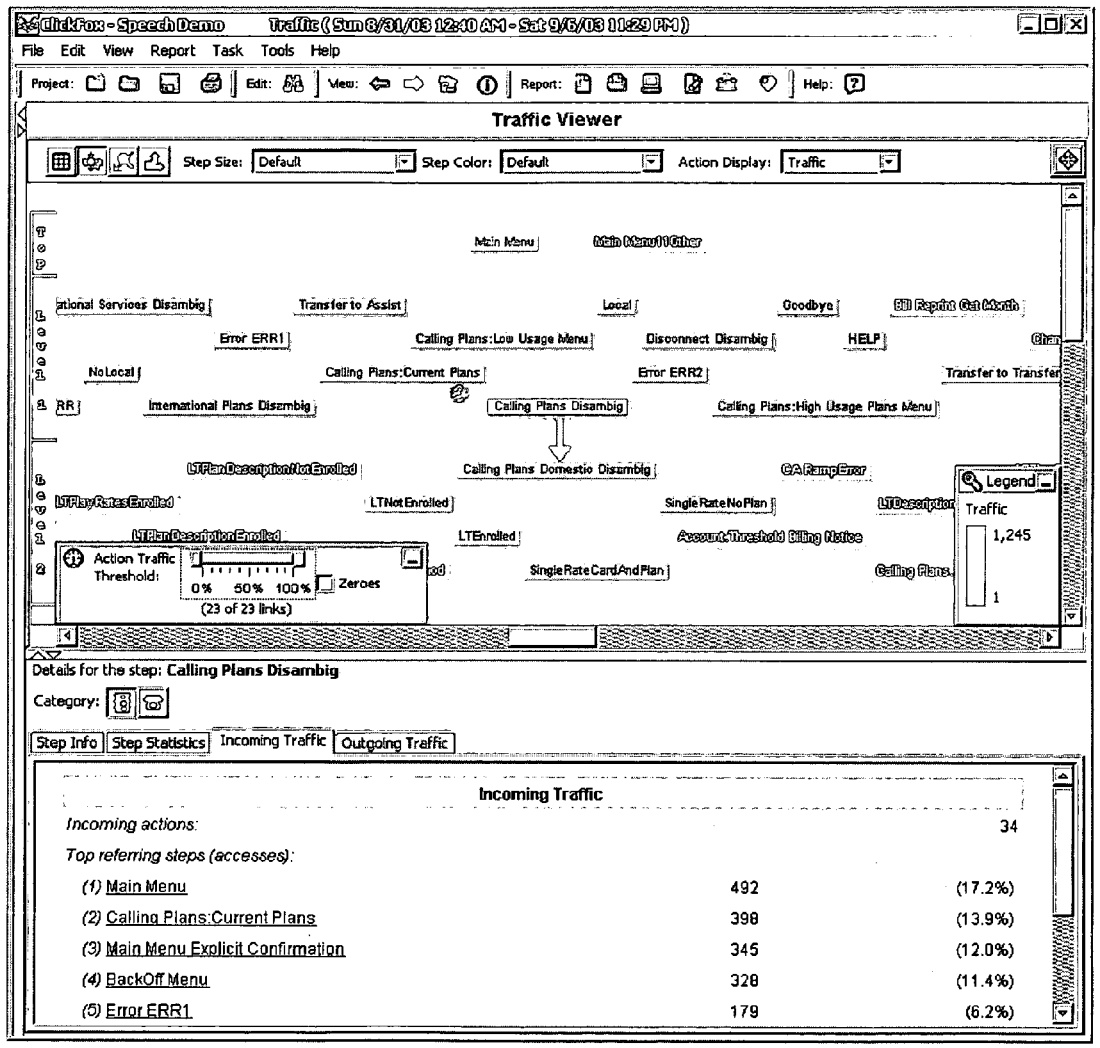
FIG. 23 displays a screenshot of a traffic viewer view panel of the traffic topic, showing the traffic node details category illustrating incoming traffic, in accordance with some embodiments of the present invention.
Figure 24:
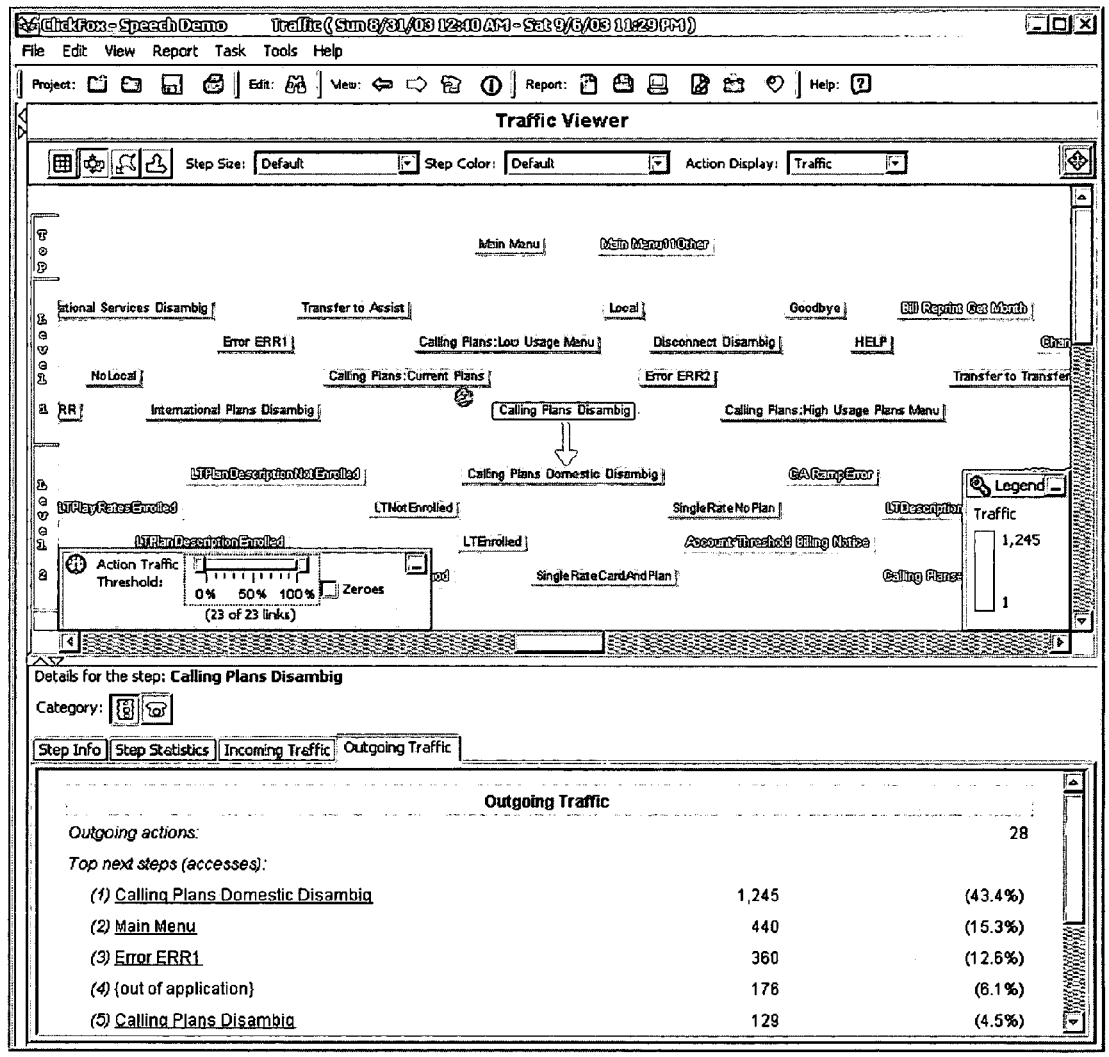
FIG. 24 displays a screenshot of a traffic viewer view panel of the traffic topic, showing the traffic node details category illustrating outgoing traffic, in accordance with some embodiments of the present invention.

| Sub-Category of Information | Description | Figure |
|---|---|---|
| Node info | Panel that shows the name, URI, level, number of incoming edges (parents), and number of outgoing edges (children). | FIG. 21 |
| Node stats | Panel that shows the views, hits, hits/views ratio, click-aways (last in session), click-away percentage, average viewing time, and other node-specific traffic stats. | FIG. 22 |
| Incoming traffic | Panel that shows the click-ins (first in session), and the traffic count over a predetermined number of top incoming edges. | FIG. 23 |
| Outgoing traffic | Panel that shows the click-aways (last in session), and the traffic count over a predetermined number of top outgoing edges. | FIG. 24 |

Figure 16:
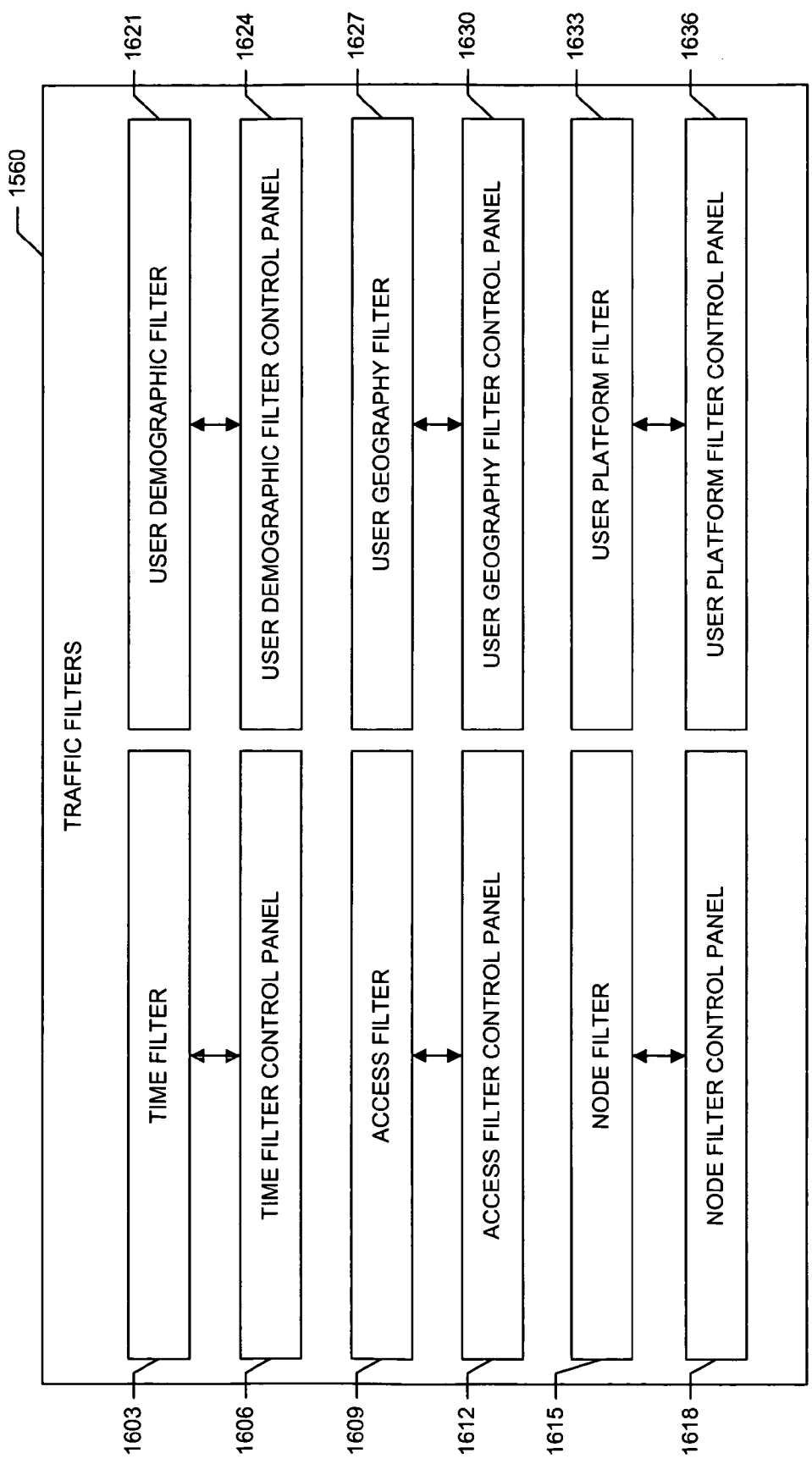
FIG. 16 displays a block diagram representation of traffic filters of the traffic topic in accordance with some embodiments of the present invention.

FIG. 16 displays a block diagram representation of traffic filters 1460 of the traffic topic 1303 in accordance with some embodiments of the present invention. The traffic filters 1460 comprise a time filter 1603, a time filter control panel 1606, an access filter 1609, an access filter control panel 1612, a node filter 1615, a node filter control panel 1618, a user demographic filter 1621, a user demographic filter control panel 1624, a user geography filter 1627, a user geography filter control panel 1630, a user platform filter 1633, and a user platform filter control panel 1636.

The time filter 1603 extends report filter component 924 and provides session 803 filtering based on time attributes, such as session 803 duration and node viewing time. For proper session 803 filtering, the time filter 1603 uses two sub-classes of session filters 833, such as session duration filter and session page view time filter. In order for an examined session 803 to pass the session filter 833 created by the time filter 1603, the session 803 should have: a duration within a specified minimum and maximum duration (session duration filter), at least one node with a viewing time greater than a minimum viewing time (session view time filter), and all nodes with viewing times less than a maximum viewing time (session view time filter). The time filter control panel 1606 extends the report component control panel 933 and allows the user of the activity analysis system 153 to set the aforementioned parameters of the time filter 1603.

The access filter 1609 extends the report filter component 924 and provides session 803 filtering based on referral location, click-in node, and click-away node. For session 803 filtering, the access filter 1609 uses three sub-classes of session filters 833, including session referral filter, session first page filter, and session last page filter. In order for an examined session 803 to pass the session filter 833 created by the access filter 1609, the session 803 should have: a referral URI in a set of accepted referral URIs (empty set passes all URIs) (session referral filter), a first or click-in node in a set of accepted click-in nodes (empty set passes all nodes) (session first node filter), and a last or click-away node in a set of accepted click-away nodes (empty set passes all nodes) (session last node filter). The access filter control panel 1612 extends report component control panel 933 and allows the user of the activity analysis system to set the aforementioned parameters of the access filter 1609.

The node filter 1615 extends report filter component 924 and provides session 803 filtering based on nodes included and not included in the session 803. For session 803 filtering, the node filter 1615 uses two sub-classes of session filters 833, including session length filter and session node filter. In order for an examined session 803 to pass the session filter 833 created by the node filter 1615, the session 903 should have: a session length of within a specified minimum and maximum number of nodes (session length filter); all of a specified set of included nodes, if a predetermined flag is true, or at least one of a specified set of included nodes (empty node set ignores this requirement), if the flag is false (session node filter); and no specified set of nodes to exclude, if a predetermined flag is true, or no at least one of a specified set of nodes to exclude (empty node set ignores this requirement), if the flag is false (session node filter). The node filter control panel 1618 extends report component control panel 933 and allows the user of the activity analysis system 153 to set the aforementioned parameters of the node filter 1615.

The user demographic filter 1621 extends the report filter component 924 and provides session 803 filtering based on user demographics. For session 803 filtering, the user demographic filter 1621 uses two sub-classes of session filters 833, including session count filter and session user key filter. In order for an examined session 803 to pass the session filter 833 created by the user demographic filter 1621, the session 803 should have: a user who has more than one session 803 in the report 903 (repeat user), if a flag to include repeat users is true (session count filter); a user who has one and only one session 803 in the report 903 (single visit user), if a flag to include single visit users is true (session count filter); a user identified by a user key (typically their IP address) in a set of accepted user keys (empty set passes all user keys) (session user key filter); and no users identified by a user key in a set of excluded user keys (session user key filter). The user demographic filter control panel 1624 extends the report component control panel 933 and allows the user of the activity analysis system 153 to set the aforementioned parameters of the user demographic filter 1621.

The user geography filter 1627 extends report filter component 924 and provides session 803 filtering based on user geographical location. For session 803 filtering, the user geography filter 1627 uses four sub-classes of session filters 833, including session country filter, session region filter, session metro area filter, and session zip code filter. In order for an examined session 803 to pass the session filter 833 created by the user geography filter 1627, the session 803 should have: a user who originated from a country in a set of accepted countries (empty set passes all locations) (session country filter), a user who originated from a geographical region (state or province) in a set of accepted regions (empty set passes all locations) (session region filter), a user who originated from a metropolitan area in a set of accepted metropolitan areas (empty set passes all locations) (session metro area filter), and a user who originated from a ZIP code in a set of accepted ZIP codes (empty set passes all locations) (session zip code filter). The user geography filter control panel 1630 extends the report component control panel 933 and allows the user of the activity analysis system 153 to set the aforementioned parameters of the user geography filter 1627.

The user platform filter 1633 extends the report filter component 924 and provides session 803 filtering based on the platform used by the user to access the subject system 133. This is domain dependent; there is no platform filtering done at this abstract level. The user platform filter control panel 1636 extends the report component control panel 933 and allows the user of the activity analysis system 153 to set the parameters of the user platform filter 1636.

Figure 17:
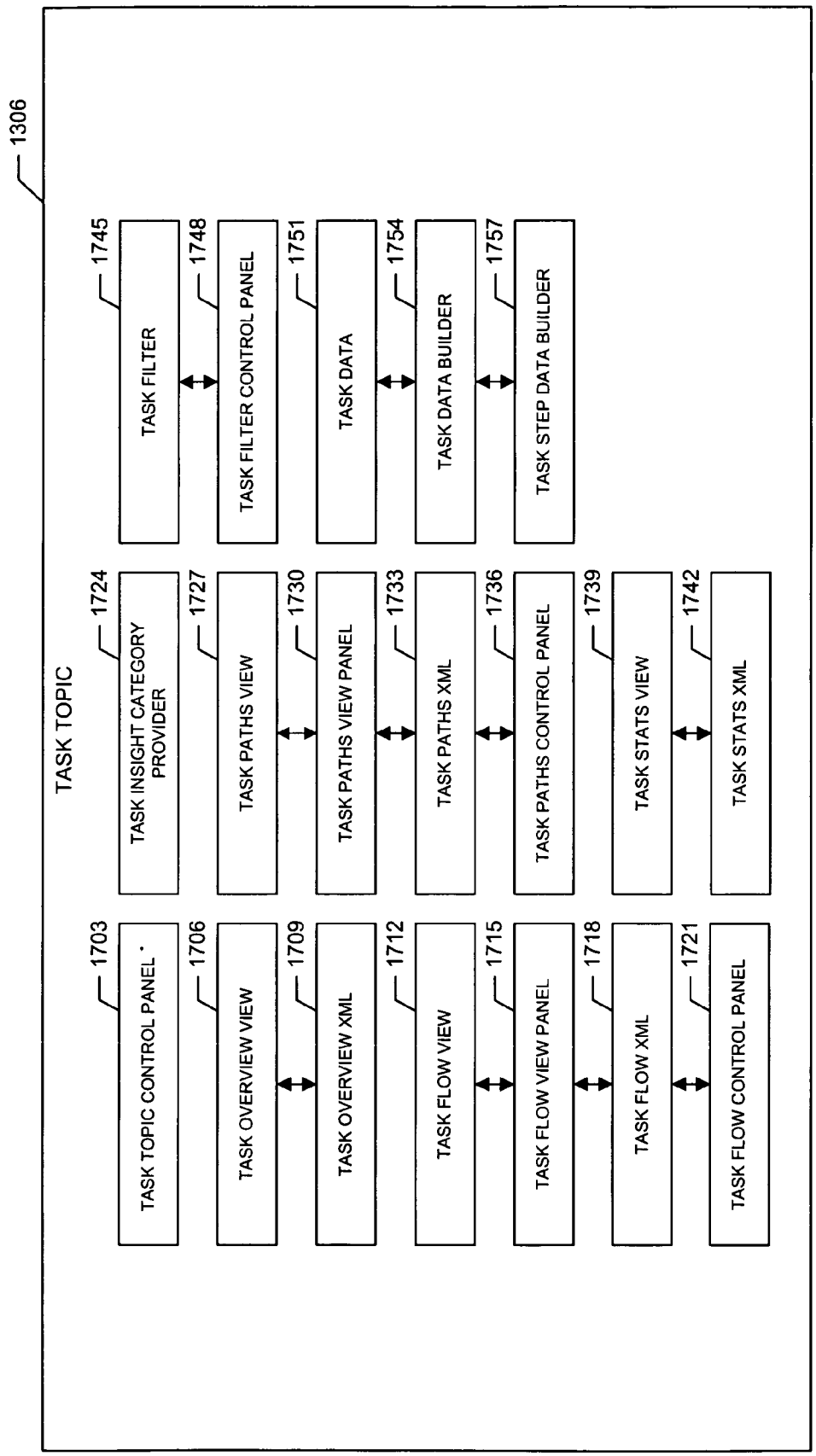
FIG. 17 displays a block diagram representation of a task topic of the report topic components in accordance with some embodiments of the present invention.

FIG. 17 displays a block diagram representation of a task topic 1306 of the report topic components 918 in accordance with some embodiments of the present invention. The task topic 1306 compares expected user behavior expressed at a task 1003 with observed usage of the subject system 133. The task topic 1306 extends the report topic component 918 and provides many different views that extend the report view component 921. The task topic 1306 comprises a task topic control panel 1703, a task overview view 1706, task overview XML 1709, a task flow view 1712, a task flow view panel 1715, task flow XML 1718, a task flow control panel 1721, a task insight category provider 1724, a task paths view 1727, a task paths view panel 1730, task paths XML 1733, a task paths control panel 1736, a task stats view 1739, task stats XML 1742, a task filter 1745, a task filter control panel 1748, task data 1751, a task data builder 1754, and a task step data builder 1757.

There exist several parameters to the task topic 1306 that control how the task analysis is performed. For example, a direct task analysis requires the stages in the task 1003 to be completed one after another without interruption, whereas the default indirect analysis allows other nodes to occur between task 1003 stages while completing the task. Further, the task match location determines the location(s) in the session 803 where the task 1003 can be deemed to occur. The task topic 1306 also can be configured with a set of task match filters 1015 and task step match filters 1018.

The task topic 1306 has an associated task topic control panel 1703 that extends the report component control panel 933. The task topic control panel 1703 allows the user of the activity analysis system 153 to set which task 1003 to analyze in the task topic 1306, from a list of tasks 1003 previously defined and available in the project 603. The task topic control panel 1703 also allows the user to set the previously mentioned parameters of the task analysis, and choose from a set of available task match filters 1015 and task step match filters 1018 to apply during task identification.

The task overview view 1706 provides a high level overview of the task analysis. The task overview view 1706 includes a graphical image of the task flow, the top dominant completed paths, selected statistics regarding task completion, and related tasks 1003. Such information is found in two subsets of task data 1751 for the report 903, one subset for all users that started the task 1003 and another subset for users that started but did not complete the task 1003. Thus, the task overview view 1706 depends on two versions of the task data builder 1754 to construct the task analysis data in the report 903. For summary data of the overall traffic data 1503 (used for comparing with task results), the task overview view 1706 depends on traffic data 1503 and the traffic data builder 1506.

Associated to the task overview view 1706, the task overview XML 1709 is adapted to create the XML document version of the view that can be transformed into HTML for display. The HTML page includes tabular statistics and an image showing the task flow results.

Figure 25:
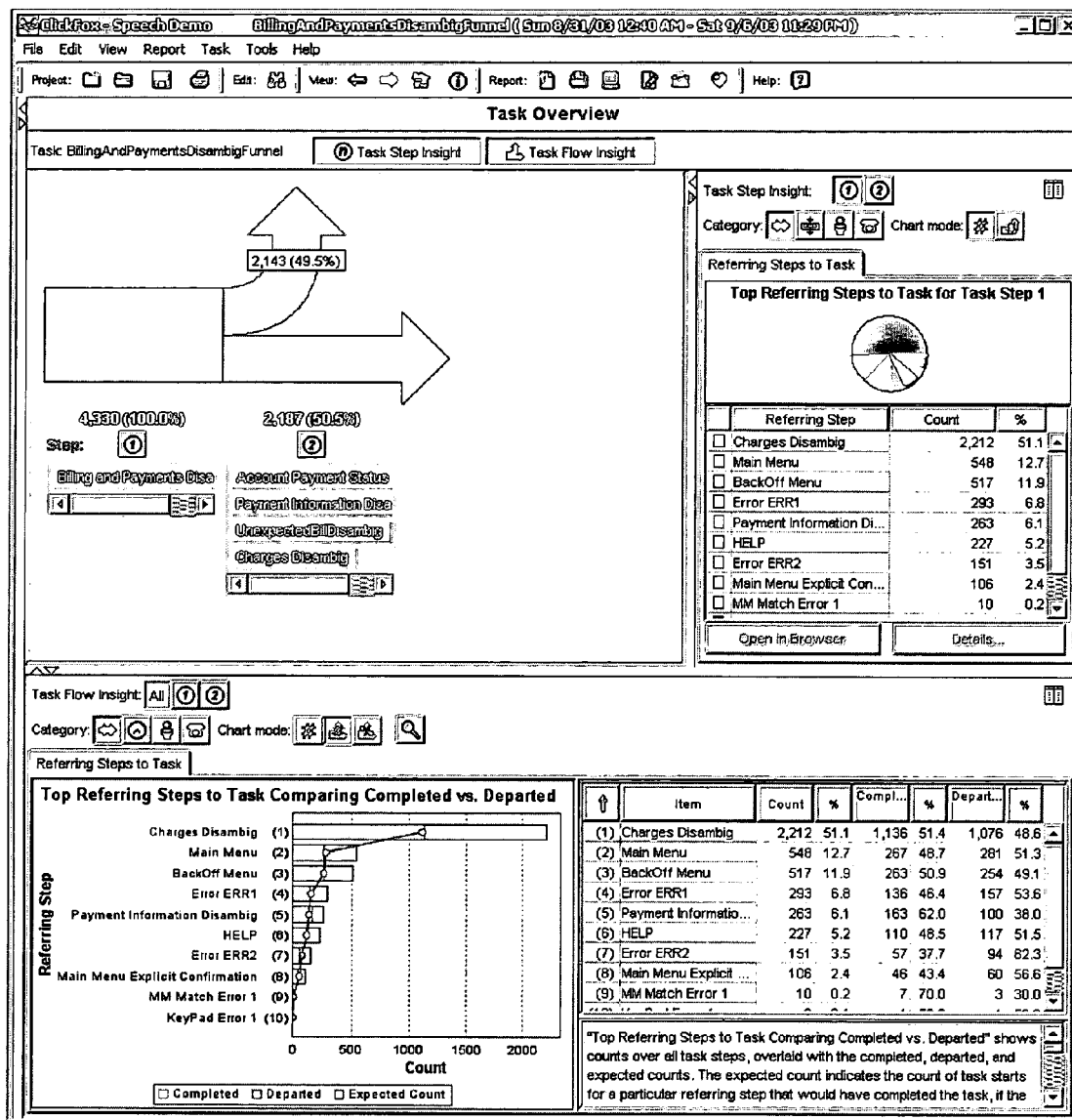
FIG. 25 displays a screenshot of a task flow view panel of the task topic, illustrating both task step insight and task flow insight, in accordance with some embodiments of the present invention.

The task flow view 1712 is an interactive graphical display of the flow of users through the task 1003, aggregated over the set of sessions 803 in the report 903. Associated with the task flow view 1712, the task flow view panel 1715 extends the report view panel 927 and contains a graphical representation of the task flow, and tabbed panels containing charts summarizing arrivals and departures to each of the task stages. The task flow view panel 1715 is registered with the user interface panel 1203 for use when displaying a report 903 within the activity analysis system 153. A screenshot of the task flow view panel 1715 of the task topic 1306 is illustrated in FIG. 25.

Associated with the task flow view 1712, the task flow XML 1718 is adapted to create the XML document version of the view that can be transformed into HTML for display. The task flow control panel 1721 allows the user of the activity analysis system 153 to configure whether the view is shown as an applet in the external web-based report, or if screen snapshots of selected information are included. The task flow control panel 1721 allows the user to select the task stages for which snapshots will be included.

The task flow view panel 1715 includes two task insight displays regarding how different user populations performed the task 1003, according to step and flow. The step insight shows charts and tables for different categories of data, indicating how many different entities or populations within the category completed each step. The flow insight shows for the entire task 1003, and for each step, the number of different entities or populations that continued to the next step versus those that departed. The task insight displays are provided by the task insight category providers 1724, which the task flow view panel 1715 retrieves from the concrete task data 1751 and from any application models 718 in the project 603 of the report 903 being displayed.

The task paths view 1727 is an interactive graphical display of the actual paths in which users traversed during completion of the task 1003 for the report 903. The associated task paths view panel 1730 extends the report view panel 927 and contains a graphical map panel 1218 framework specialized to show the task paths. This concrete realization of the graphical map panel 1218 framework is based around the task paths graphical map panel 1218. Used in this concrete realization are various edge encoding 1239 sub-classes, including task path edge encoding, which is a sub-class of edge encoding 1239 that shows the path through a set of nodes taken by a user while performing a task 1003. The task paths view panel 1730 is registered with the user interface panel 1203 for use when displaying a report 903 within the activity analysis system 153.

Associated with the task paths view 1727, the task paths XML 1733 is adapted to create the XML document version of the view that can be transformed into HTML for display. The task paths control panel 1736 allows the user to configure whether the view is shown as an applet in the external web-based report, or if screen snapshots of selected information are included. The task paths control panel 1736 allows the user to select the top predetermined number of paths for which screenshots will be included.

The task stats view 1739 provides detailed statistics regarding performance of the task 1003. Some of the statistics describe overall performance, while others summarize behavior for each task step. Such information is stored in the task data 1751 for the report 903, for all users that started the task 1003. Thus, the task stats view 1739 depends on the task data builder 1754 to construct the task analysis data in the report 903. For summary data of the overall traffic (which is compared to the task results), the task stats view 1739 depends on the traffic data 1503 and the traffic data builder 1506.

Associated with the task stats view 1739, the task stats XML 1742 is adapted to create the XML document version of the view that can be transformed into HTML for display. The HTML page includes tabular statistics.

The task filter 1745 extends the report filter component 924 and provides session 803 filtering based on performance of a task 1003. For session 803 filtering, the task filter 1745 uses a single sub-class of session filter 833, such as the task session filter. In order for an examined session 803 to pass the task session filter created by the task filter 1745, the session 803 should have all of a specified list of tasks 1003, if a flag for including all tasks 1003 is true, or at least one of a specified list of tasks 1003, if the flag for including all tasks is false. Additionally, for each task 1003 in the specified list, there is a direct/indirect flag, a task match location, and a (possibly empty) set of arrival and departure nodes-all of which should be satisfied by the occurrence of the task 1003 in the session 803. The task filter control panel 1748 extends the report component control panel 933 and allows the user of the activity analysis system 153 to set the aforementioned parameters of the task filter 1745.

The task data 1751 extends the report data 909 and provides several different types of data regarding the performance of a task 1003 in a set of sessions 803. Completion statistics for each stage identify the number of users that completed each stage and those that departed after each stage. Node lists for referral nodes from which users arrived and departure destinations are stored as task data 1751 for each stage. Path statistics record the actual paths users took to complete the task through various stages, including from which node they arrived and to which node they departed for each path. A timeline is kept for each stage in the task 1003, recording the day, hour of day, and day of week of the occurrences of the stage in the sessions 803.

Additionally, task step 1006 is kept by the task data 1751 for each stage in the task 1003. Task step 1006 is special type of report data 909 that can be built for the set of occurrences of each task stage, for the set of users that performed each stage of the task 1003. For example, demographic data 1509 is kept for each stage recording the identity, domain name, and geographic locations of each user that completed the stage.

The task data builder 1754 extends the report session data builder 945, filling in the task data 1751, session 803 by session 803. The task data builder 1754 accepts as a parameter the task 1003, set of sessions 803, and an optional session filter 833 with which to filter the set of sessions 803 prior to the task analysis. The task data builder 1754 provides an API to add jobs specifying exactly which pieces of data in the task data 1751 are desired to be computed and cached in the task data 1751. If task data 1751 is subsequently asked for a piece of data the task data 1751 does not comprise, the task data builder 1754 can compute the data at that time, but this requires traversing the sessions 803 again. Pre-caching the task data 1751 involves only one pass over the sessions 803 by the task data builder 1754 to build different pieces of data, but this can add to the report 903 creation time.

Each task data builder 1754 concrete sub-class creates a task step data builder 1757, particular to the domain. The task step data builder 1757 supplies relevant report session data builders 945 that build task step 1006 for the domain. Additionally, the task step data builder 1757 retrieves from each application model 718 in the project 603 its own relevant report session data builders 945 that it needs. The task step 1006 is typically used by the task insight category providers 1724 to present information about particular populations that performed a task 1003.

Figure 32:
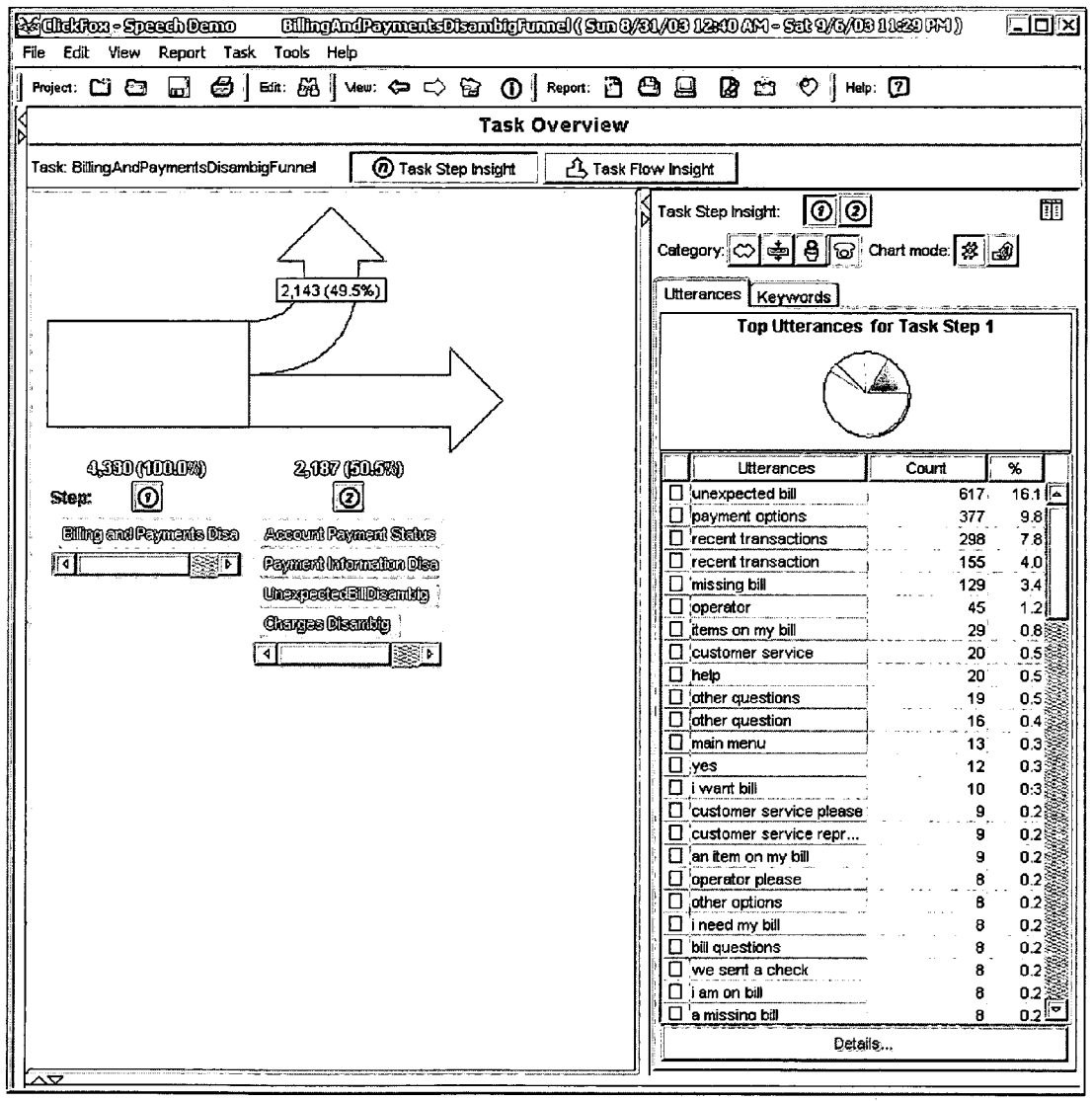
FIG. 32 displays a screenshot of an IVR task flow view panel of the task topic, showing task step insight illustrating a speech task insight category showing utterances for the task step, in accordance with some embodiments of the present invention.
Figure 33:
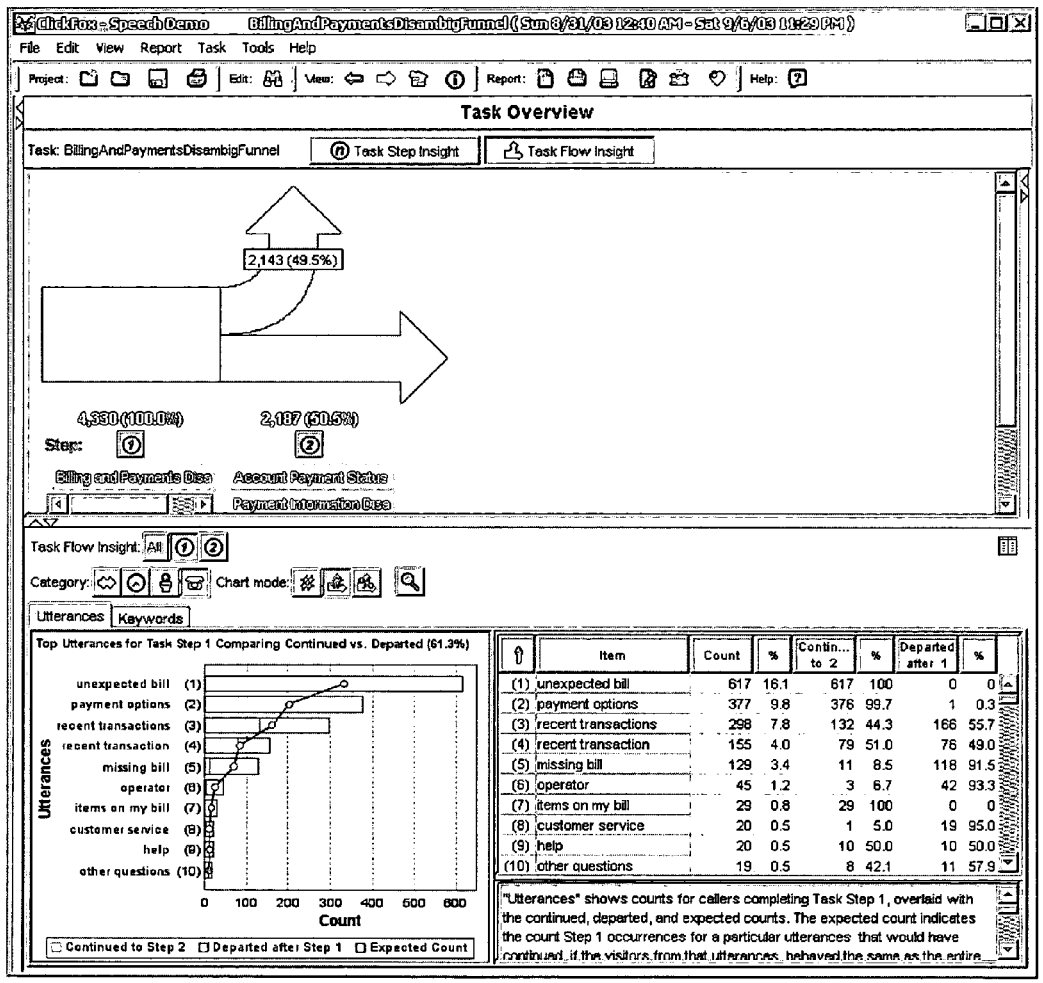
FIG. 33 displays a screenshot of an IVR task flow view panel of the task topic, showing task flow insight illustrating a speech task insight category showing utterances of the task step, in accordance with some embodiments of the present invention.

A task insight category provider 1724 is used in the task flow view 1712 to display charts and tables about how various populations of users performed each step in the task 1003, or general statistics about each step. Each task insight category provider 1724 can be asked for its name, icon image, number of charts available, and name of its charts. The main APIs of the task insight category provider 1724 provide a chart and table panel, composed of widgets (JAVA), for a particular chart, task step, task 1003, and report data 909 (which is typically task data 1751). Screenshots of the task insight category 1724, including a task step insight and a task flow insight, are illustrated in FIGS. 25, 32 and 33.

The main APIs of each task insight category provider 1724 generate five types of chart and table displays. The first is a pie graph and corresponding table of its task insight data for a particular task step. The second is a bar chart and corresponding table of its task insight data for the task overall, including a bar for each step in the task. The third is a bar chart and corresponding table of its task insight data for each step. Fourth is a bar chart and table for the task overall, indicating for each data category how many completed versus did not complete the task. Fifth is a bar chart and table for a particular task step, showing for each data category how many continued to the next step versus departed after the current step. Coloring of different portions of the bars is used to indicate the continued versus departed, or completed versus did not complete. For the aforementioned fourth case, the table includes not only columns with the count and percentage for each data category, but additional columns of count and percentage for continued and for departed. Correspondingly, the fifth case above includes additional columns of count and percentage for completed and for did not complete.

The core set of classes that extend task insight category provider 1724 are summarized in Table 8.

TABLE 8

| Class of task insight category provider | Description |
|---|---|
| TaskInsightTimeCategory | The time category shows occurrence counts of the particular step or entire task for each day in the report date range, for each week in the report date range, by hour of day, and by day of week. It also shows the average amount of time spent performing each step of the task and between each step of the task. This data is relevant to the population that completed the task through each task step. For example, the activity analysis system shows the average amount of time spent in step 2 of a 3-step task for users that completed only through step 1, through step 2, and all the way through the task. This allows insightful observation of how long particular steps took depending on how far the user got through the task. This provider uses timeline data that is built as one of the task step data inside the task data to retrieve this information, and also uses the task data directly. |
| TaskInsightReferralsCategory | The referrals category shows the how the task was performed for each referring node to the start of the task. In other words, for each node that feeds users into the start of the task, how many of those users completed each step. This provider uses referral data that is built as one of the task step data inside the task data to retrieve this information. |
| TaskInsightUsersCategory | The users category shows which users performed each step and completed the entire task most often. This provider uses demographic data that is built as one of the task step data inside the task data to retrieve this information. |
| TaskInsightGeographyCategory | The geography category shows how the task was performed for each geographic location of the users performing the task. It includes sub-categories for country, region, metro area, and ZIP code. This provider uses demographic data that is built as one of the task step data inside the task data to retrieve this information. |
| TaskInsightUserPlatformCategory | The platform category is an abstract category that only contains data in the concrete, domain-specific extensions. |

Each application model 718 can provide its own custom task insight category providers 1724, such that the task flow view 1712 will add these providers to the display for each application model 718 in the project 603 of the report 903 being displayed.

Figure 18:
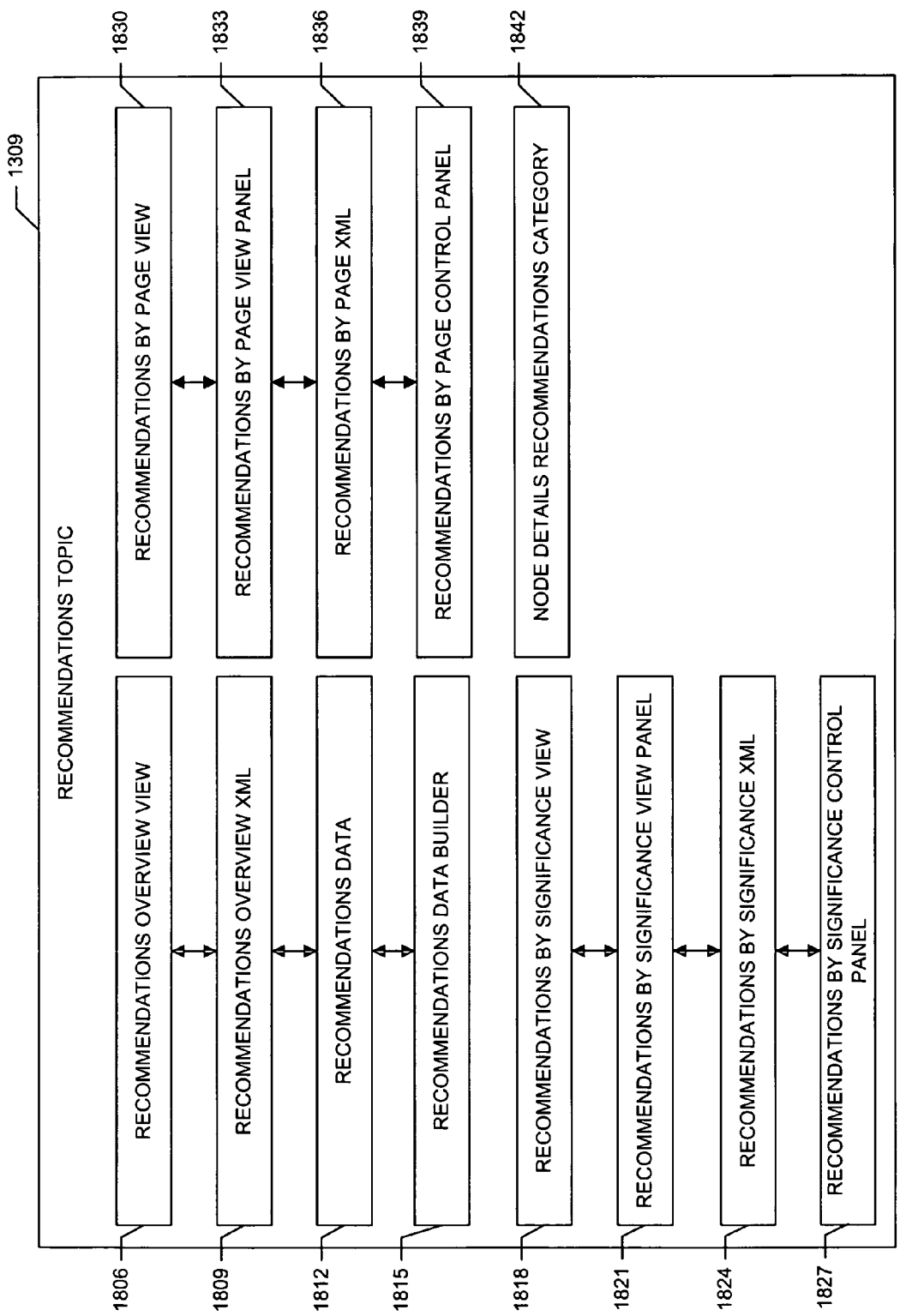
FIG. 18 displays a block diagram representation of a recommendations topic of the report topic components in accordance with some embodiments of the present invention.

FIG. 18 displays a block diagram representation of a recommendations topic 1309 of the report topic components 918 in accordance with some embodiments of the present invention. The recommendations topic 1309 comprises a recommendations overview view 1806, recommendations overview XML 1809, recommendations data 1812, a recommendations data builder 1815, a recommendations by significance view 1818, a recommendations by significance view panel 1821, recommendations by significance XML 1824, a recommendations by significance control panel 1827, a recommendations by page view 1830, a recommendations by page view panel 1833, recommendations by page XML 1836, a recommendations by page control panel 1839, and a node details recommendations category 1842.

The recommendations topic 1309 provides recommendations for changing the connectivity of a subject system's 133 state machine 403 (and thus the subject system 133) to better support the observed usage of the subject system 133. Recommendations are also given relevant to improving the performance of a task 1003, if there is a task topic in the report 903. The recommendations topic 1309 extends the report topic component 918 and provides many different views that extend the report view component 921. The views present data stored in recommendations data 1812 that contains the results of the recommendation analysis. The recommendations data 1812 may include a memory device capable of storing and retrieving data including, but not limited to, volatile memory 216 and/or non-volatile memory 214.

The recommendations overview view 1806 provides a high level overview of the recommendations implemented by the activity analysis system 153 in the report 903. The recommendations overview view 1806 includes graphical images of the most significant recommendation as shown in the recommendations by significance view 1818 and recommendations by page view 1830, and lists the number of recommendations by significance and by type. Such information is found in the recommendations data 1812 for the report 903. Thus, the recommendations overview view 1806 depends on a recommendations data builder 1815 to construct the recommendations.

Associated with the recommendations overview view 1806, the recommendations overview XML 1809 is adapted to create the XML document version of the recommendations overview view 1806 that can be transformed into HTML for display. The HTML page includes tabular statistics and the aforementioned images showing one of the recommendations.

The recommendations by significance view 1818 is an interactive graphical display of a single recommendation in the structure of the graph 706 for which it applies. The associated recommendations by significance view panel 1821 extends the report view panel 927 and contains a graphical map panel 1218 framework specialized to show the recommendation. This concrete realization of the graphical map panel 1218 framework is centered around a recommendations by significance graphical map panel 1218. The recommendations by significance view panel 1821 is registered with the user interface panel 1203 for use when displaying a report 903 within the activity analysis system 153.

Associated with the recommendations by significance view 1818, the recommendations by significance XML 1824 adapted to create the XML document version of the recommendations by significance view 1818 that can be transformed into HTML for display. The recommendations by significance control panel 1827 allows the user to configure whether the recommendations by significance view 1818 is shown as an applet in the external web-based report, or if screen snapshots of selected information are included. The recommendations by significance control panel 1827 allows the user to select the levels of significance for which to include recommendation screenshots.

The recommendations by page view 1830 is an interactive graphical display of all the recommendations for a particular graph node 709. The associated recommendations by page view panel 1833 extends the report view panel 927 and contains a graphical map panel 1218 framework specialized to show all of the recommendations for a particular node, or page. This concrete realization of the graphical map panel 1218 framework is centered around a recommendations by page graphical map panel. The recommendations by page view panel 1833 is registered with the user interface panel 1203 for use when displaying a report 903 within the activity analysis system 153

Associated with the recommendations by page view 1830, the recommendations by page XML 1836 is adapted to create the XML document version of the recommendations by page view 1830 that can be transformed into HTML for display. The recommendations by page control panel 1839 allows the user to configure whether the recommendations by page view 1830 is shown as an applet in the external web-based report, or if screen snapshots of selected information are included. The recommendations by page control panel 1839 allows the user to select pages for which to include recommendation screenshots.

The recommendations data 1812 extends the report data 909 and provides the list of recommendations and the list of findings from which the recommendations were created. recommendations data 1812 also provides filtering of the recommendations by significance, and access to recommendations by graph node 709.

The recommendations data builder 1815 extends the report meta data builder 948 and builds the recommendations data 1812 using the traffic data 1503 and task data 1751 for the report 903. If the report 903 contains a task topic 1306, the recommendations data builder 1815 uses task data 1751 and traffic data 1503 for users starting the task 1003. Otherwise, the recommendations data builder 1815 uses traffic data 1503 for all the sessions 803 in the report 903.

The node details recommendations category 1842 extends the node details category provider 1469 to provide information regarding the recommendations generated by the activity analysis system 153 for a particular graph node 709. Given a graph node 709, node details recommendations category 1842 lists textually in its panel each recommendation relevant to the graph node 709.

Figure 19:
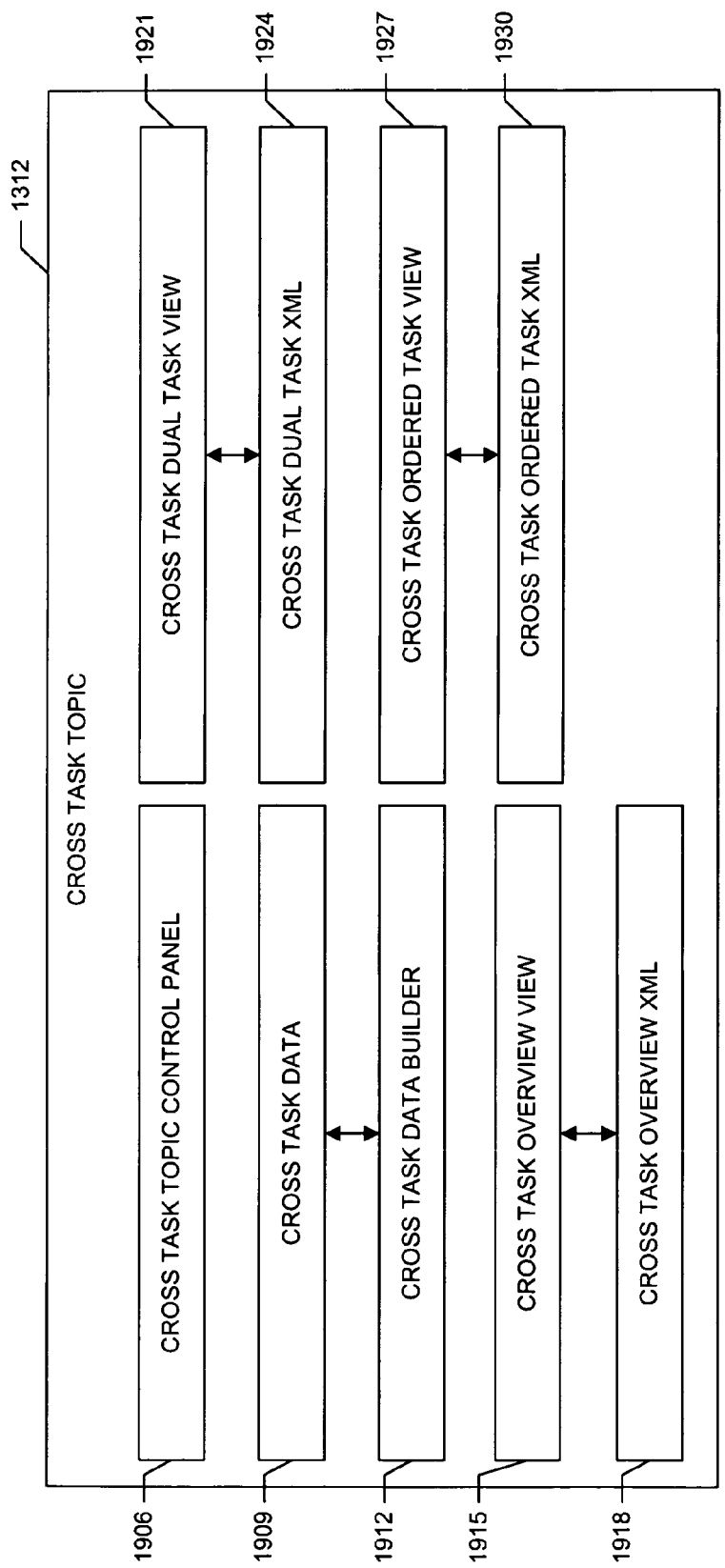
FIG. 19 displays a block diagram representation of a cross task topic of the report topic components in accordance with some embodiments of the present invention.

FIG. 19 displays a block diagram representation of a cross task topic 1312 of the report topic components 918 in accordance with some embodiments of the present invention. The cross task topic 1312 assists in the analysis of multiple tasks 1003, potentially across multiple domains. The cross task topic 1312 comprises a cross task topic control panel 1906, cross task data 1909, a cross task data builder 1912, a cross task overview view 1915, cross task overview XML 1918, a cross task dual task view 1921, cross task dual task XML 1924, a cross task ordered task view 1927, and cross task ordered task XML 1930.

The cross task reporting capabilities of the activity analysis system 153 provide an analysis of how users perform multiple tasks 1003. These cross task reporting capabilities include determining how often different tasks 1003 are performed in the same session 803, and in what sequence. The cross task topic 1312 extends the report topic component 918 and provides three different views that extend the report view component 921. The cross task topic 1312 is configured by the user of the activity analysis system 153 to include the names of the task report templates to include in the cross task analysis. The views present data stored in the cross task data 1909 that contains the results of the analysis. The cross task data 1909 may include a memory device capable of storing and retrieving data including, but not limited to, volatile memory 216 and/or non-volatile memory 214.

The cross task topic control panel 1906 extends the report component control panel 933 and allows the user of the activity analysis system 153 to select from a list of report templates 906 previously defined in the project 603 which are to be included in the cross task report template.

A variation on the cross task topic 1312 allows performance of tasks 1003 across multiple sessions 803 to be analyzed. To accomplish this, the cross task topic 1312 performs the cross-task analysis by user key, computing which tasks 1003 within the topic were performed together across all sessions 803 for the same user. The resulting cross task data 1909 gives an aggregate view of task 1003 performance by user instead of by session 803.

Figure 26A:
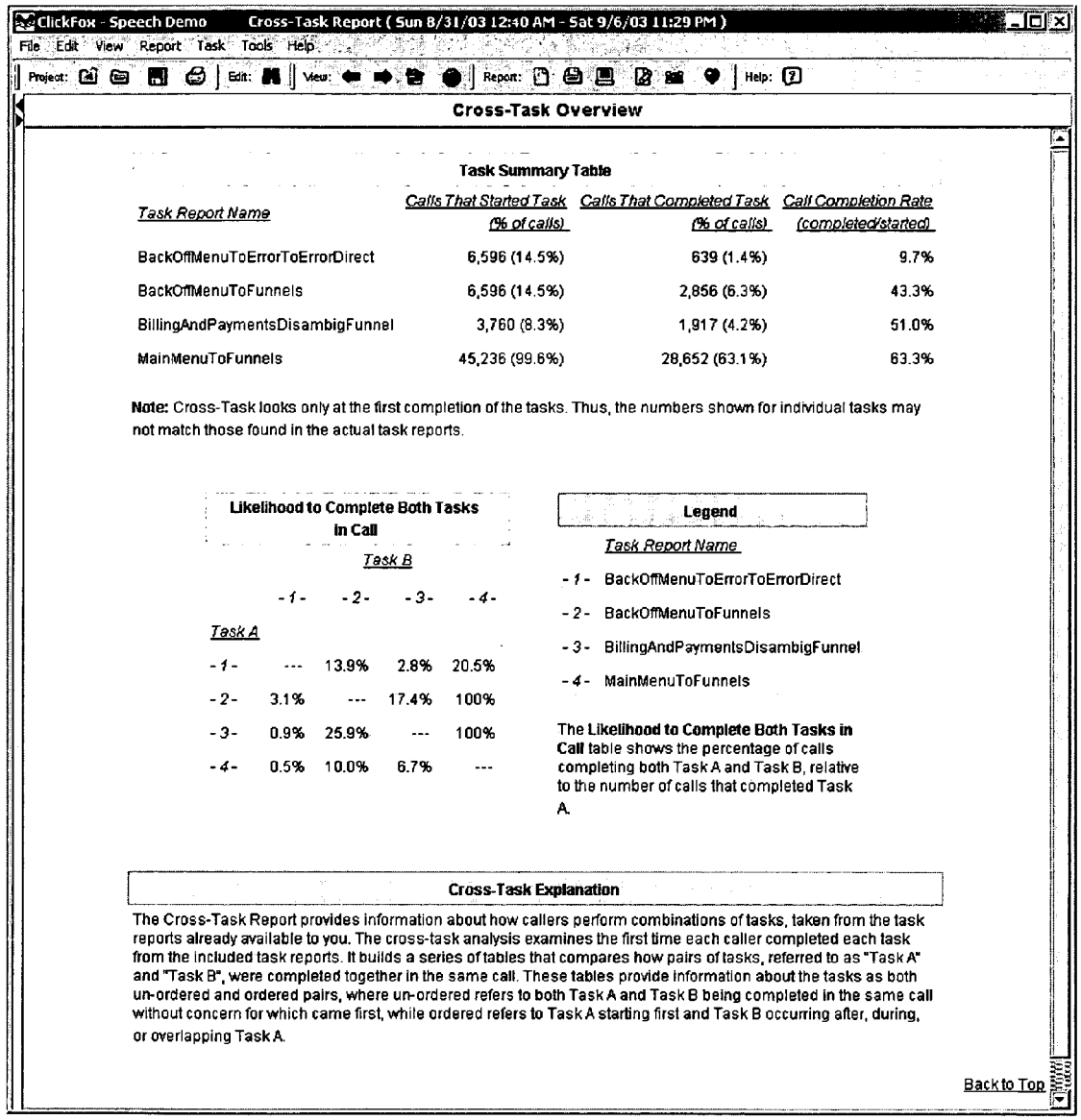
Figure 26B:
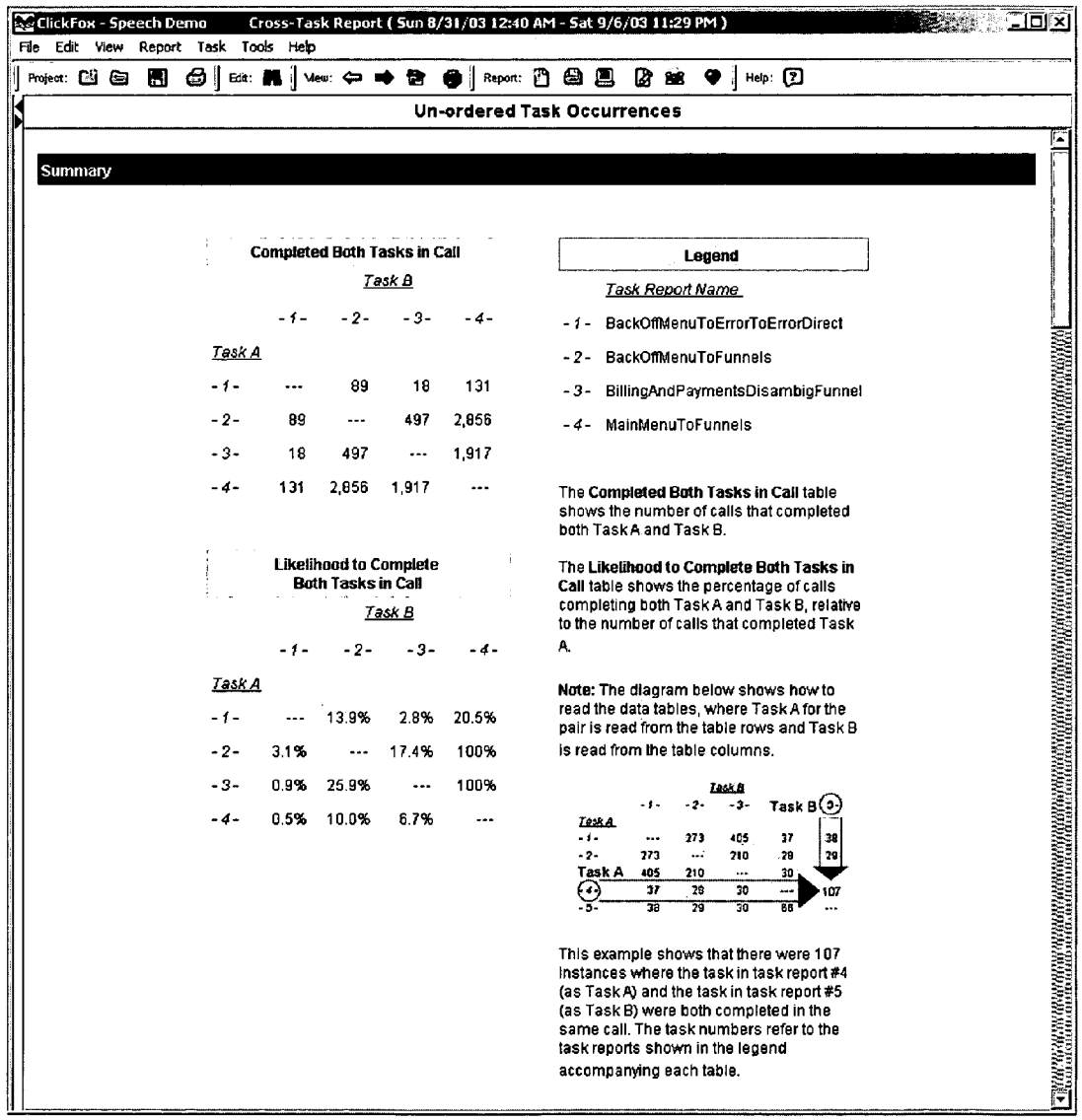

The cross task overview view 1915 extends the report view component 921 and provides a high level overview of the cross-task analysis in the report 903. The cross task overview view 1915 includes a summary of how many times each task 1003 from the task report templates occurred in the sessions 803 that are part of the report 903. The cross task overview view 1915 also includes a matrix displaying the count of sessions 803 in which each pairing of tasks 1003 both occurred. For example, if there were three task report templates A, B, and C, then the matrix would have the counts for A and B, A and C, and B and C. Such information is found in the cross task data 1909 for the report 903. Thus, the cross task overview view 1915 depends on a cross task data builder 1912 to construct the statistics. Screenshots of the cross task overview view 1915, including an HTML display, is illustrated in FIGS. 26A-26C.

Associated with the cross task overview view 1915, the cross task overview XML 1918 is adapted to create the XML document version of the cross task overview view 1915 that can be transformed into HTML for display. The HTML page includes the aforementioned statistics.

Figure 27A:
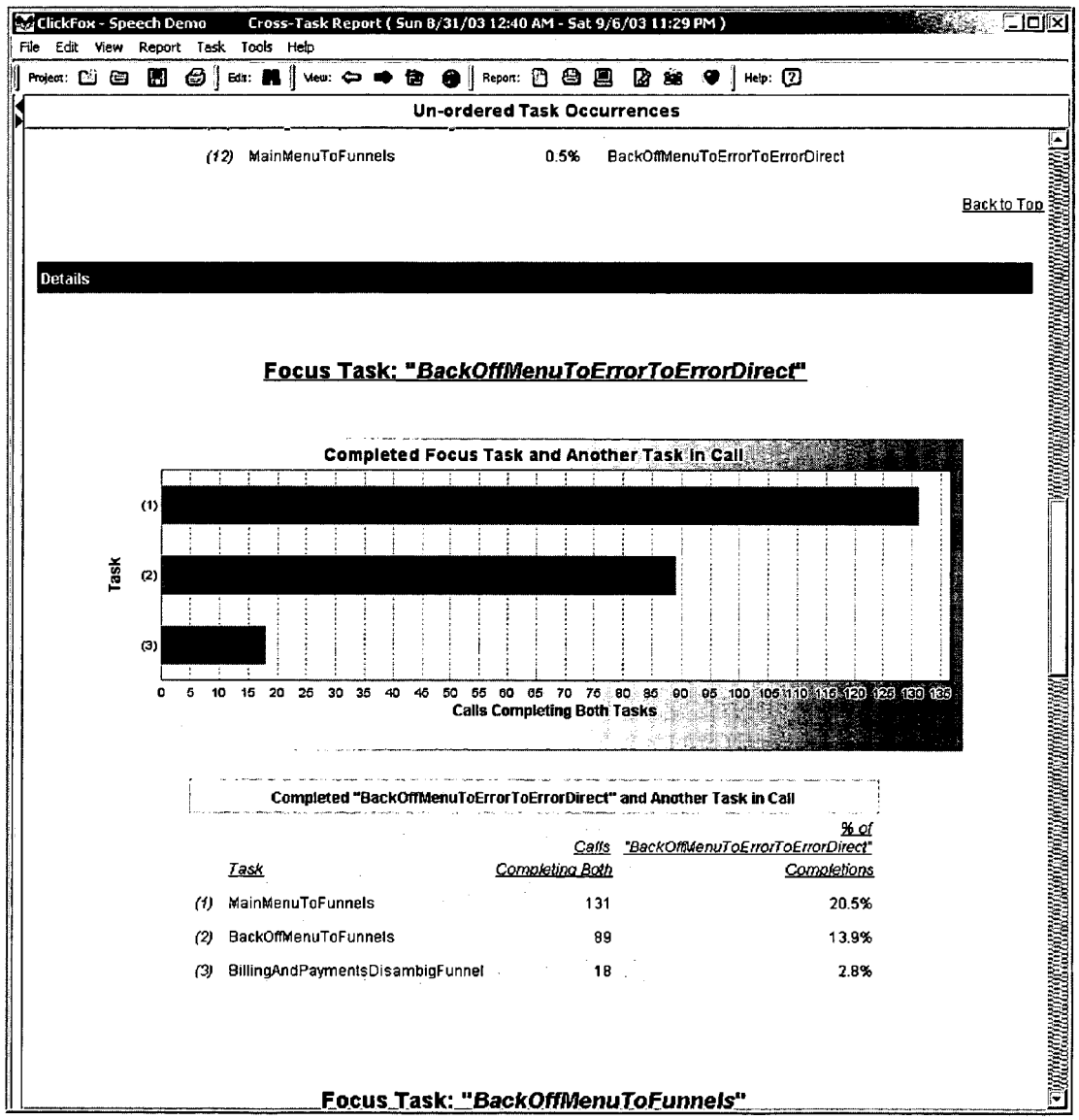
FIGS. 27A-27C, collectively known as FIG. 27, display screenshots of a cross task dual task view of the cross task topic, illustrating an HTML display, in accordance with some embodiments of the present invention.
Figure 27B:
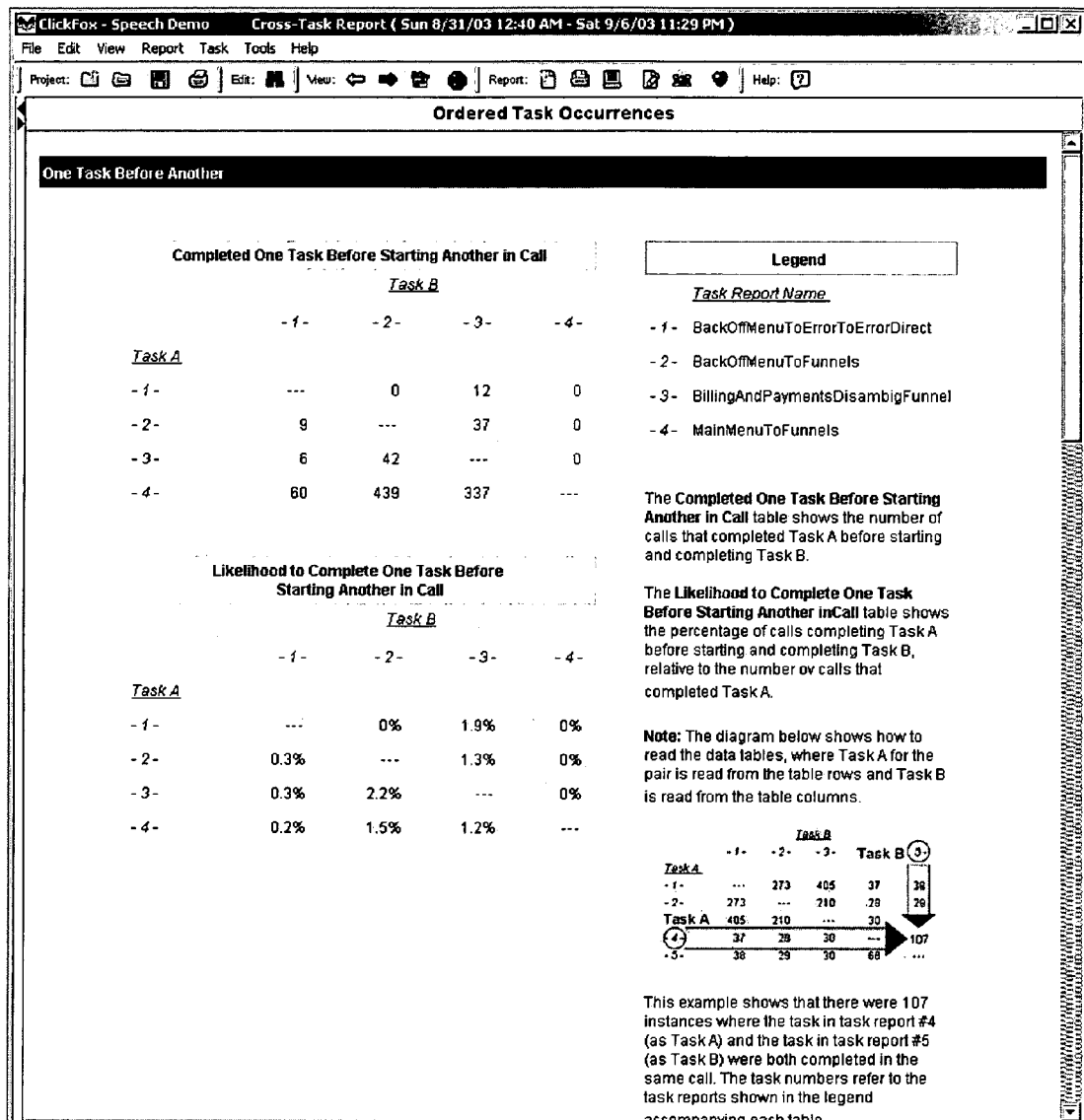
Figure 27C:
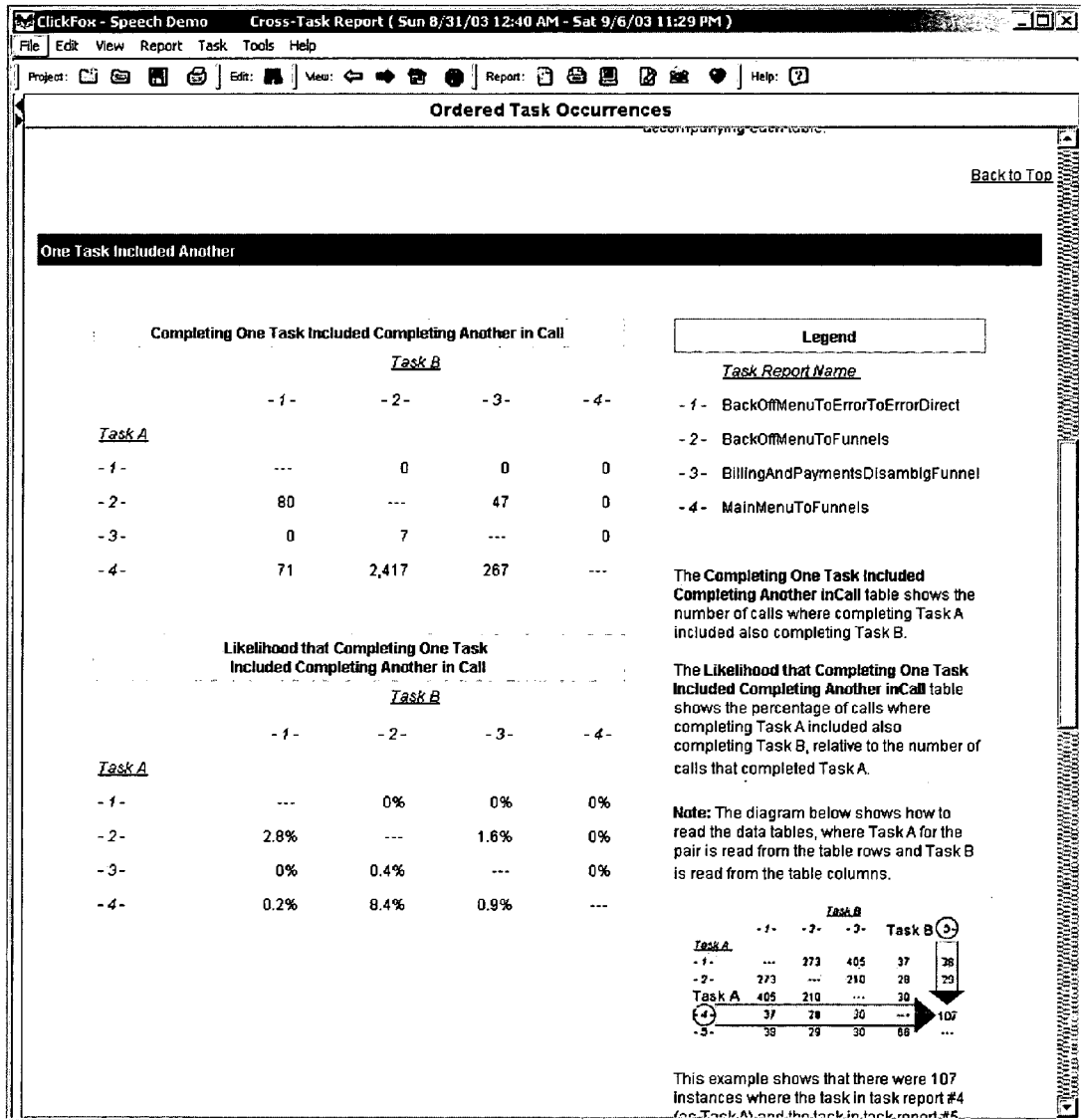

The cross task dual task view 1921 extends the report view component 921 and provides many statistics regarding how each pair of tasks 1003 from the task report templates were performed. The cross task dual task view 1921 includes a summary matrix displaying the count of sessions 803 in which each pairing of tasks 1003 both occurred. The cross task dual task view 1921 has a ranking table that shows in order of decreasing count the top task 1003 pairs performed together in a session 803, with relative percentages to each individual task 1003 in the pair. The cross task dual task view 1921 has a likelihood table that shows, for each task, the probability, as a percentage, that each of the other tasks 1003 is performed in the same session 803. For example with three tasks A, B, and C, for task A the cross task dual task view 1921 gives the probability for also performing task B in a session 803, and for also performing task C in a session 803. Screenshots of the cross task dual task view 1921, including an HTML display, is illustrated in FIGS. 27A-27C.

Associated with the cross task dual task view 1921, the cross task dual task XML 1924 is adapted to create the XML document version of the cross task dual task view 1921 that can be transformed into HTML for display. The HTML page includes the aforementioned statistics.

Figure 28:
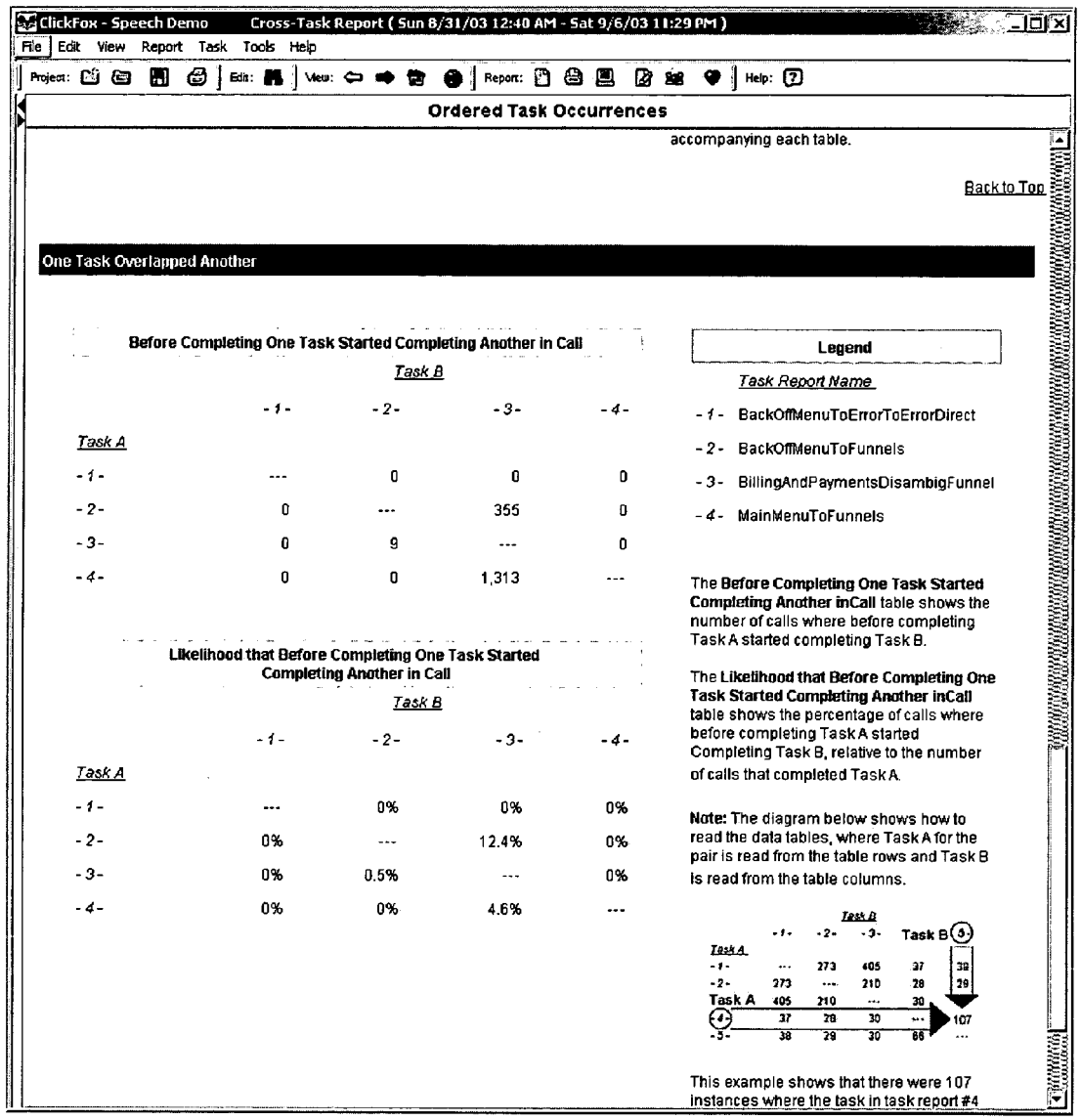
FIG. 28 displays a screenshot of a cross task ordered task view of the cross task topic, illustrating an HTML display, in accordance with some embodiments of the present invention.

The cross task ordered task view 1927 extends the report view component 921 and provides statistics regarding the order of the tasks 1003 performed together in a session 803. The cross task ordered task view 1927 includes a "before" matrix that shows the count of sessions 803 in which each pairing of tasks 1003 is performed, one being before another. For example, the count for task A before task B, and the count for task B before task A. The cross task ordered task view 1927 includes an "inclusion" matrix that shows the count of sessions 803 in which each pairing of tasks 1003 is performed, one including another. For example, the count where, when task A is performed, task B is also performed, and where, when task B is performed, task A is also performed. Further, the cross task ordered task view 1927 includes an "overlap" matrix that shows the count of sessions 803 in which each pairing of tasks 1003 is performed one overlapping another. This is a "less strict" ordering than the inclusion matrix. For example, the count where performing task A started and overlapped with performing task B, and the count where performing task B started and overlapped with performing task A. A screenshot of the cross task ordered task view 1927, including an HTML display, is illustrated in FIG. 28.

Associated with the cross task ordered task view 1927, the cross task ordered task XML 1930 is adapted to create the XML document version of the cross task ordered task view 1927 that can be transformed into HTML for display. The HTML page includes the aforementioned statistics.

Cross task data 1909 extends the report data 909 and provides the cross-task performance statistics. The cross task data 1909 generally includes five two-dimensional arrays, or matrices of integers. Each integer is addressed using a task report template index (e.g., if the data is built for five different tasks 1003 then the indices run from zero to four). The value in the matrix[a, b] gives the count for the task 1003 index a and b, where order matters if the matrix deals with ordered data. Otherwise, only one half of the matrix is populated. The three ordered matrices are "before," "contains," and "overlap." The two unordered matrices are "both" and "equals." Table 9 illustrates an example of the concepts surrounding ordered and unordered matrices.

TABLE 9

| Matrix Type | Task Execution Order |
|---|---|
| BEFORE (task A before task B) | AAAAAAA<br>BBBB |
| CONTAINS (task A contains task B) | AAAAAAA<br>BBBB |
| OVERLAPS (task A overlaps task B) | AAAAAAA<br>BBBB |
| EQUALS (task A equals task B) | AAAAAAA<br>BBBBBBB |
| BOTH | Task A and B are both performed in session, regardless of order or location |

The cross task data builder 1912 extends the report session data builder 945 and builds the cross task data 1909 based on the set of task report templates 906 configured in the cross task topic 1312.

Application of the Activity Analysis System to Various Exemplary Domains

The conceptual model of the activity analysis system 153 is specialized in many different domains. In each domain, the different aspects of the framework described herein are made concrete and any minor changes or customizations needed for that domain are added. For example, there may be a web domain presentation model, an IVR domain presentation model, a CRM domain presentation model, and a SFA domain presentation model. One skilled in the art will recognize that the conceptual model of the activity analysis system 153 can be extended to any domain in which an interactive system can be modeled as states and transitions and in which usage of the subject system 133 can be logged.

As described above, the activity analysis system 153 is adapted for use in various domains. For exemplary purposes only, the following description describes a web site domain as implemented by the present system. Within the exemplary domain, various components relate to or derive from the more general components described above. The reference numerals used to describe the various components of the web site domain, therefore, represent that these various components are instances or children of the more general (parent) components, or that the various components are related to or derived from the more general components.

In the web domain, the subject system 133 being analyzed by the activity analysis system 153 is accessed using a web browser. A web application or web site provides the web presentation user interface via the browser; thus in the web presentation model the subject system 133 is a web site. Also, in the web domain, a web server logs the retrieval of web pages, which correspond to states in the web site presentation model.

More specifically, a web site 715A is used to model the user interface 303A of a web application or web site. The website 715A thus extends the presentation model 715. The web site 715A is associated with a web site snapshot 412A that extends the state machine snapshot 412, and a web site config 409A that extends the state machine config 409. A site snapshot builder 415A class implements the state machine snapshot builder 415 and builds the web site snapshot 412A, using a spider that crawls a web site to construct the model graph 421. The web site config 409A provides configurations for defining how the web site snapshot 412A is created. This configuration allows URLs of pages to be transformed as they are encountered by the spider such that the resulting model graph 421 can have model nodes 424 that represent a single web page or groups of web pages.

Also associated with a web site 403A is a site definition panel 430A that extends the state machine definition panel 403. The site definition panel 430A allows the user of the activity analysis system 153 to define parameters of the web site 403A, edit the web site config 409A, and add web site snapshots 412A. A site editor panel allows editing of the model graph 421 for any web site snapshot 412A, including the ability to add and remove nodes and edges.

The web server 503A represents a web server in the web domain. For the purpose of the model utilized by the activity analysis system 153, the web server 503A is a source of events regarding the web site 403A; hence the web server 503A extends the log source 503. The web server 503A has an associated web server log entry 509A that extends the log entry 509 and represents the information in a typical web server log entry. Typically, two parsers are supplied for the typical web server log file formats, including the common log format and the extended log format. The two parsers are the CLF log parser 506A and the ELF log parser 506B, both of which extend the log parser 506. Table 10 describes the fields of the web server log entry 509A.

TABLE 10

| Name | Description |
| --- | --- |
| HOST | Host IP address or hostname making the request. |
| IDENT | Remote logname of user, as from the CLF log entry. |
| AUTH | Authenticated username of user, as from the CLF log entry. |
| DATE | Timestamp of the log entry. |
| REQUEST_TYPE | Request type: GET, POST, HEAD, INDEX, etc. |
| REQUEST_FILE | URL of the file being requested. |
| STATUS | HTTP status code, as from the CLF log entry. |
| SIZE | Content length of the document transferred. |
| REFERER | URL the HTTP client was on prior to making this request, as from the ELF log. |
| USER_AGENT | The software the HTTP client claims to be using, as from the ELF log. |
| COOKIE | Optional, additional custom information provided by log pre-processing Perl scripts that parse the CLF and ELF log entries and add a custom field value based on the state in the log entry and on some external data. |

Associated with a web server 503A is a web server definition panel 518A that extends the log source definition panel 518. The web server definition panel 518A allows the user of the activity analysis system 153 to define parameters of the web server 503A and to add log files for analysis.

In the web domain, web session context 818A extends the session context 818 and is used as the primary session context 818 for each session 803. Web session context 818A keeps host (IP address) information, user-agent information, and the out of site referral URL for the session 803, extracted from the web logs. Web session entry context 818B keeps AUTH, IDENT, and referral information for each session entry 806.

A web-specific sub-class of each of the report components 915 exists in the web domain. Each of the class names is prefixed with "Web." At a minimum, these classes are customized with terminology particular to the web domain, and know how to work with the web domain specific data described below.

Web demographic data builder 1512A is able to use the information in the web session context 818A to create the geographic data in the demographic data 1509, using a database of IP address to geographical data. Web user platform data builder 1530A creates the web user platform data 1527A that has the web browser type, operating system, connection speed (T1, Broadband, DSL, Dial-up, etc.), Internet Service Provider name, connection location (home or business). Such information is obtained from a database mapping IP address of the user to the aforementioned parameters.

The user-agent information in the web session context 818A is used for the former, while the host information is used to access a database of IP address to connection speed and location. Web referral data 1515A is based on the referral URL kept in the web session context 818A and is built by the web referral data builder 1518A.

The web user platform filter 1633A includes filtering ability based on the web browser type, operating system, connection speed, and connection location connection speed, and connection location (home or business). For session filtering, the web user platform filter 1633A uses a sub-class of session filter 833, such as session user agent filter. In order for an examined session 803 to pass the session filter 833 created by the web user platform filter 1633A, the session 803 should have: a user who used a web browser in the set of accepted web browsers (MSIE, Netscape Navigator, other) (session user agent filter), and a user who used an operating system in the set of accepted operating systems (Windows, Mac OS, UNIX, Linux) (session OS filter).

The web task data builder 1754A supplies the web demographic data builder 1512A, web user platform data builder 1530A, and web referral data builder 1518A as task stage data builders for the task data 1751 created in the web domain.

Web task insight referrals category extends task insight referrals category to show how a task was performed, broken down by referring hosts (the hostname in the referral URL) and referring search engines (referral URLs from web sites that provide search capabilities, such as Google, Yahoo, etc.). This provider uses web referral data 1515A that is built as one of the task step 1006 inside the task data 1751 to retrieve this information.

Web task insight user platform category extends task insight user platform category to show how a task 1003 was performed, broken down by the following information about the user's platform: connection speed (T1, Broadband, DSL, Dial-up, etc.), Internet Service Provider name, whether the connection is from a home or business, and the type of browser used. This provider uses web user platform data 1527A that is built as one of the task step 1006 inside the task data 1751 to retrieve this information.

The web domain introduces a new report topic component 918 specific to the web, called the web server topic 918A. The web server traffic reporting capabilities of the activity analysis system 153 expose the usage of a subject system 133. The web server topic 918A extends the report topic component 918 and provides many different views that extend the report view component 921. The views present data stored in the web server data 909A, which extends the report data 909.

The web server overview view 1403A provides a high level overview of the accesses to the web server 503A. The web server overview view 1403A includes general statistics about the web server 503A such as the number of files and directories, and general statistics about the accesses such as the count, total visits, and average visits per day. Other than the general web server 503A statistics, this information is found in the web server log data 909B for the report 903. Thus, the web server overview view 1403A also depends on a web server log data builder 948A to construct the data for the report 903.

Associated with the web server overview view 1403A, the web server overview XML 1406A is adapted to create the XML document version of the web server overview view 1403A that can be transformed into HTML for display. The HTML page includes tabular statistics and charts showing the overall access timeline per week and/or day.

The web server categorized activity view provides a breakdown of the web server 503A accesses into categories by day of week and by hour of day. Such information is found in the web server log data 909B for the report 903. Thus, the web server categorized activity view also depends on a web server log data builder 948A to construct the data for the report 903.

The associated web server categorized activity XML is adapted to create the XML document version of the web server categorized activity view that can be transformed into HTML for display. The HTML page includes tabular statistics and charts showing accesses by day of week and by hour of day.

The web top accesses view provides a summary of the top file accesses, entry pages, and exit pages, and the top directories in terms of accesses. The web top accesses view also includes information about redirects. Such information is found in the web server log data 909B for the report 903. Thus, the web top accesses view also depends on a web server log data builder 948A to construct the data for the report 903.

The associated web server top accesses XML is adapted to create the XML document version of the web top accesses view that can be transformed into HTML for display. The HTML page includes tabular statistics and charts showing the results.

The web server document type view provides statistics regarding accesses to various document types. The web server document type view includes information about the different MIME types, file extensions, and particular types of files such as portable document formats (PDFs). Such information is found in the web server log data 909B for the report 903. Thus, the web server document type view also depends on a web server log data builder 948A to construct the data for the report 903.

The associated web server document type XML is adapted to create the XML document version of the web server document type view that can be transformed into HTML for display. The HTML page includes tabular statistics and charts showing the results.

The web server errors view provides statistics regarding errors the web server 503A experiences. These errors include "404 page not found" and status information. Such information is found in the web server log data 909B for the report 903. Thus, the web server errors view also depends on a web server log data builder 948A to construct the data for the report 903.

The associated web server errors XML is adapted to create the XML document version of the web server errors view that can be transformed into HTML for display. The HTML page includes tabular statistics.

The web server log data 909B extends the report data 909 and provides a plethora of web server access data for a web server log source 503. Some of the data is file or page-based, such as accesses, entry page count, and exit page counts. Aggregate totals are kept over all files. Access data is also categorized by day in the time period, and by day of week and hour of day.

The web server log data builder 948A extends report meta data builder 948, filling in the web server log data 909B by accessing the log source's 503 log data for the date range of the report 903.

The basic shopping cart application provides a general design for modeling web shopping cart application logic 136. The framework includes the basic features of a cart such as: management of a list of items in the cart, removing items from the cart, a check-out process, shipping rate information, a wish-list, cookie-based user information, and help access. For each specific web application's shopping cart that is to be analyzed by the activity analysis system 153, the interfaces and classes of the shopping cart framework can be extended as needed.

Some form of a shopping cart application exists on every e-commerce web site. The cart application 718B provides a general application logic 136 model for shopping carts, extending application model 718.

The cart application 718B is associated with a cart snapshot 412B that extends the state machine snapshot 412 and a cart config 409B that extends the state machine config 409. The cart snapshot builder 415B constructs a cart snapshot 412B from a data file describing the structure of the cart.

Associated with a cart application 718B is a cart application definition panel 430B that extends the state machine definition panel 430. The cart application definition panel 430B allows the user of the activity analysis system 153 to define the parameters of the shopping cart.

Tracking user interaction with a particular web site's shopping cart typically should be customized per web site. In some cases it can be done directly from the web server log, so that no additional shopping cart log source is necessary (the web server 503A and web server log entry 509A is used). However, there can be additional logging related to the shopping cart not captured by the web server 503A, in which case the activity analysis system 153 provides a cart log source 503B and its associated cart log entry 509B. The cart log source 503B includes basic identification of a user, what they purchased when, and different transactions related to the cart: items added and removed.

Associated with a cart log source 503B is a cart log source definition panel 518B that extends the log source definition panel 518. The cart log source definition panel 518B allows the user of the activity analysis system 153 to define the parameters of the bill payment log source 503C.

The cart session builder 824A realizes application session builder 824. The cart session builder 824A creates an application session 812 and application session entries 815 with the associated shopping cart related session contexts: cart session context 818C that realizes session context 818 and cart session entry context 818D that realizes session context 818.

The shopping cart reporting capabilities track visitor usage of a shopping cart application in a subject system 133. The cart topic 918B extends the report topic component 918 and provides many different views that extend report view component 921. The views present data stored in cart data 909C that is built to analyze how the shopping cart was utilized in a set of sessions 803. This analysis includes analyzing how visitors performed tasks 1003 defined internally to examine different aspects of the cart application 718B state machine, such as how frequently different products were added, removed, and purchased.

The cart topic 918B also can be configured with a cart purchase task match filter 1015A, cart item count task match filter 1015B, and a cart instructions task match filter 1015C to focus on various population segment behavior. The cart purchase task match filter 1015A is used to specify a particular minimum and maximum dollar amount of purchases and/or the amount of products purchased in a given usage of the shopping cart. The cart item count task match filter 1015B screens visitors based on the number of items they added and removed from the cart. The cart instructions task match filter 1015C includes or excludes visitors that used the instructional help portions of the cart.

The cart topic 918B has an associated cart topic control panel 933A that extends the report component control panel 933. The cart topic control panel 933A allows the user of the activity analysis system 153 to set the previously mentioned parameters of the shopping cart analysis.

The cart overview view 1706A provides a high level overview of the shopping cart analysis. The cart overview view 1706A includes overall statistics on the usage of the shopping cart, and a graphical image summarizing visitor flow through the states of the cart. The associated cart overview XML 1709A is adapted to create the XML document version of the cart overview view 1706A that can be transformed into HTML for display.

The cart flow view 1712A is an interactive graphical display of the flow of visitors through the shopping cart, aggregated over the set of sessions 803 in the report 903. The associated cart flow view panel 927A extends the report view panel 927 and contains a graphical representation of the visitor flow, and tabbed panels containing charts summarizing arrivals and departures to each of the states in the cart. The cart flow view panel 927A is registered with the user interface panel 1203 for use when displaying a report 903.

The associated cart flow XML 1718A is adapted to create the XML document version of the cart flow view 1712A that can be transformed into HTML for display. The cart flow control panel 1721A allows the user of the activity analysis system 153 to configure whether the cart flow view 1712A is shown as an applet in the external web-based report, or if screen snapshots of selected information are included.

The cart paths view 1727A is an interactive graphical display of the actual paths via which visitors used the shopping cart for the report 903. The cart paths view 1727A includes paths through checkout, instructions, and other states of the shopping cart. The associated cart paths view panel 927B extends the report view panel 927 and contains a graphical map panel 1218 framework specialized to show the paths. The cart paths view panel 927B is registered with the user interface panel 1203 for use when displaying a report 903.

The associated cart paths XML 1733A is adapted to create the XML document version of the cart paths view 1727A that can be transformed into HTML for display. The cart paths control panel 1736A allows the user to configure whether the view is shown as an applet in the external web-based report, or if screen snapshots of selected information are included.

The cart stats view 1739A provides detailed statistics regarding usage of the shopping cart. Some of the statistics describe overall performance, while others summarized behavior for each state in the cart. Such information is found in the cart data 909C for the report 903. Thus, the cart stats view 1739A depends on a cart data builder 945A to construct the cart analysis data in the report 903. For summary data for the overall traffic to compare to the cart results, the cart stats view 1739A depends on the traffic data 1503 and the traffic data builder 1506.

The associated cart stats XML 1742A is adapted to create the XML document version of the cart stats view 1739A that can be transformed into HTML for display. The HTML page includes tabular statistics.

The cart data 909C extends the report data 909 and provides several different types of data regarding the usage of the shopping cart in a set of sessions 803. The cart data 909C contains task data 1751 that is created for tasks 1003 analyzed to ascertain how visitors used the cart. The cart data builder 945A extends the report session data builder 945, filling in the cart data 909C, session 803 by session 803. The cart data builder 945A accepts as parameters the set of sessions 803 and an optional session filter 833 with which to filter the set of sessions 803 prior to the analysis.

The basic bill payment application provides a general design for modeling bill payment application logic. The framework includes the basic features of a bill payment application such as the following: management of a list bills to pay, setup of banking accounts, automatic payment, and manual payment. For each specific web application's bill payment that is to be analyzed by the activity analysis system 153, the interfaces and classes of the bill payment framework can be extended as needed.

Some form of bill payment application exists on many banking web sites and other e-commerce web sites. The bill pay application 718C provides a general application logic model for bill payments, extending the application model 718.

The bill pay application 718C is associated with a bill pay snapshot 412C that extends the state machine snapshot 412 and a bill pay config 409C that extends the state machine config 409. The bill pay snapshot builder 415C constructs a bill pay snapshot 412C from a data file describing the structure of the bill payment process, specified as the URL in the bill pay application 718C.

Associated with a bill pay application 718C is a bill pay application definition panel 430C that extends the state machine definition panel 430. The bill pay application definition panel 430C allows the user of the activity analysis system 153 to define the parameters of the bill payment.

Tracking user interaction with a particular web site's bill payment typically should be customized per web site. In some cases it can be done directly from the web server log, so that no additional bill payment log source is necessary (the web server 503A and web server log entry 509A is used). However, there can be additional logging related to the bill payment not captured by the web server 503A, in which case the activity analysis system 153 provides a bill pay log source 503D and its associated bill pay log entry 509C.

Associated with a bill pay log source 503D is a bill pay log source definition panel 518C that extends the log source definition panel 518. The bill pay log source definition panel 518C allows the user of the activity analysis system 153 to define the parameters of the bill payment log source 503C.

The bill pay session builder 824B realizes the application session builder 824. The bill pay session builder 824B creates an application session 812 and application session entries 815 with the associated bill payment related context; bill pay session context 818E which realizes the session context 818 and bill pay session entry context 818F which realizes the session context 818.

The bill payment reporting capabilities track visitor usage of a bill payment application in a subject system 133. The bill pay topic 918C extends the report topic component 918 and provides many different views that extend the report view component 921. The views present data stored in bill pay data 909D that is built to analyze how the bill payment was utilized in a set of sessions 803. This analysis is done by analyzing how visitors performed tasks 1003 defined internally to examine different aspects of the bill pay application state machine 403.

The bill pay topic 918C also can be configured with a bill pay frequency task match filter 1015D, bill pay count task match filter 1015E, bill pay duration task match filter 1015F, and bill pay dollar amount task match filter 1015G to focus on various population segment behavior. The bill pay frequency task match filter 1015D is used to specify a particular minimum and maximum frequency with which the visitor uses the bill payment. The bill pay count task match filter 1015E screens visitors based on the number of bills they pay on-line. The bill pay duration task match filter 1015F specifies a minimum and maximum usage of the bill pay system in a given interaction. The bill pay dollar amount task match filter 1015G isolates users that pay a particular dollar volume of bills.

The bill pay topic 918C has an associated bill pay topic control panel 933B that extends the report component control panel 933. The bill pay topic control panel 933B allows the user of the activity analysis system 153 to set the previously mentioned parameters of the bill payment analysis.

The bill pay overview view 1706B provides a high level overview of the bill payment analysis. The bill pay overview view 1706B includes overall statistics on the usage of the bill payment, and a graphical image summarizing visitor flow through the states of bill payment. The associated bill pay overview XML 1709B is adapted to create the XML document version of the bill pay overview view 1706B that can be transformed into HTML for display.

The bill pay flow view 1712B is an interactive graphical display of the flow of visitors through the bill payment, aggregated over the set of sessions 803 in the report 903. The associated bill pay flow view panel 927C extends the report view panel 927 and contains a graphical representation of the visitor flow, and tabbed panels containing charts summarizing arrivals and departures to each of the states in the bill payment. The bill pay flow view panel 927C is registered with the user interface panel 1203 for use when displaying a report 903.

The associated bill pay flow XML 1718B is adapted to create the XML document version of the bill pay flow view 1712B that can be transformed into HTML for display. The bill pay flow control panel 1721B allows the user of the activity analysis system 153 to configure whether the bill pay flow view 1712B is shown as an applet in the external web-based report, or if screen snapshots of selected information are included.

The bill pay paths view 1727B is an interactive graphical display of the actual paths via which visitors used the bill payment for the report 903. The bill pay paths view 1727B includes paths through the states of the bill payment. The associated bill pay paths view panel 927D extends the report view panel 927 and contains a graphical map panel 1218 framework specialized to show the paths. The bill pay paths view panel 927D is registered with the user interface panel 1203 for use when displaying a report 903 within the activity analysis system 153.

The associated bill pay paths XML 1733B is adapted to create the XML document version of the bill pay paths view 1727B that can be transformed into HTML for display. The bill pay paths control panel 1736B allows the user to configure whether the bill pay paths view 1727B is shown as an applet in the external web-based report, or if screen snapshots of selected information are included.

The bill pay stats view 1739B provides detailed statistics regarding usage of the bill payment. Some of the statistics describe overall performance, while others summarized behavior for each state in the bill payment. Such information is found in a bill pay data 909D for the report 903. Thus, the bill pay stats view 1739B depends on a bill pay data builder 945B to construct the bill pay data in the report 903. For summary data for the overall traffic to compare to the cart results, the bill pay stats view 1739B depends on the traffic data 1503 and traffic data builder 1506. The associated bill pay stats XML 1742B is adapted to create the XML document version of the bill pay stats view 1739B that can be transformed into HTML for display. The HTML page includes tabular statistics.

The bill pay data 909D extends the report data 909 and provides several different types of data regarding the usage of the bill payment in a set of sessions 803. The bill pay data 909D contains the task data 1751 that is created for tasks 1003 analyzed to ascertain how visitors used the bill payment.

The bill pay data builder 945B extends the report session data builder 945, filling in the bill pay data 909D, session 803 by session 803. The bill pay data builder 945B accepts as parameters the set of sessions 803 and an optional session filter 833 with which to filter the set of sessions 803 prior to the analysis.

The basic search application provides a general design for modeling search application logic. The framework includes the basic features of a search application such as the following: a quick search input, a basic search input, and advanced search input, and search results. For each specific web application's search that is to be analyzed by the activity analysis system 154, the interfaces and classes of the search framework can be extended as needed.

Some form of search application exists on almost all web sites. The search application 718D provides a general application logic model for searches in the activity analysis system 153, extending the application model 718.

The search application 718D is associated with a search snapshot 412D that extends the state machine snapshot 412 and a search config 409D that extends the state machine config 409. The search snapshot builder 415D constructs a search snapshot 412D from a data file describing the structure of the search process, specified as the URL in the search application 718D.

Associated with a search application 718D is a search application definition panel 430D that extends the state machine definition panel 430. The search application definition panel 430D allows the user of the activity analysis system 153 to define the parameters of the search.

Tracking user interaction with a particular web site's search typically should be customized per web site. In most cases it can be done directly from the web server log, so that no additional search log source is necessary (the web server 503A and web server log entry 509A is used). However, there can be additional logging related to the search not captured by the web server, in which case the activity analysis system 153 provides a search log source 503E and its associated search log entry 509D.

Associated with a search log source 503E is a search log source definition panel 518D that extends the log source definition panel 518. The search log source definition panel 518D allows the user of the activity analysis system 153 to define the parameters of the search log source 503E.

The search session builder 824C realizes the application session builder 824. The search session builder 824C creates an application session 812 and application session entries 815 with the associated search related context: search session context 818G which realizes session context 818 and search session entry context 818H which realizes the session context 818.

The search reporting capabilities of the activity analysis system 153 track visitor usage of a search application in a subject system 133. The search topic 918D extends the report topic component 918 and provides different views that extend the report view component 921. The views present data stored in search data 909E that is built to analyze how the search was utilized in a set of sessions 803. This analysis is done by analyzing how visitors performed tasks 1003 defined internally to examine different aspects of the search application state machine 403.

The search topic 918D also can be configured with a search keyword task match filter 1015H to focus on various population segment behavior. The search keyword task match filter 1015H is used to specify a regex that matches search keywords to include in the report 903. The search topic 918D has an associated search topic control panel 933C that extends the report component control panel 933. The search topic control panel 933C allows the user of the activity analysis system 153 to set the previously mentioned parameters of the search analysis.

The search overview view 1706C provides a high level overview of the search analysis. The search overview view 1706C includes overall statistics on the usage of the search, and a graphical image summarizing visitor flow through the states of search. The associated search overview XML 1709C is adapted to create the XML document version of the search overview view 1706C that can be transformed into HTML for display.

The search flow view 1712C is an interactive graphical display of the flow of visitors through the search, aggregated over the set of sessions 803 in the report 903. The associated search flow view panel 927E extends the report view panel 927 and contains a graphical representation of the visitor flow, and tabbed panels containing charts summarizing arrivals and departures to each of the states in the search. The search flow view panel 927E is registered with the user interface panel 1203 for use when displaying a report 903 within the activity analysis system 153.

The associated search flow XML 1718C is adapted to create the XML document version of the search flow view 1712C that can be transformed into HTML for display. The search flow control panel 1721C allows the user of the activity analysis system 153 to configure whether the search flow view 1712C is shown as an applet in the external web-based report, or if screen snapshots of selected information are included.

The search paths view 1727C is an interactive graphical display of the actual paths via which visitors used the search for the report 903. The search paths view 1727C includes paths through the states of the search. The associated search paths view panel 927F extends the report view panel 927 and contains a graphical map panel 1218 framework specialized to show the paths. The search paths view panel 927F is registered with the user interface panel 1203 for use when displaying a report 903 within the activity analysis system 153.

The associated search paths XML 1733C is adapted to create the XML document version of the search paths view 1727C that can be transformed into HTML for display. The search paths control panel 1736C allows the user to configure whether the view is shown as an applet in the external web-based report, or if screen snapshots of selected information are included.

The search stats view 1739C provides detailed statistics regarding usage of the search. Some of the statistics describe overall performance, while others summarized behavior for each state in the search. Results are broken down by top keywords. This information is found in a search data 909E for the report 903. Thus, the search stats view 1739C depends on a search data builder 945C to construct the search data in the report 903. For summary data for the overall traffic to compare to the search results, the search stats view 1739C depends on a traffic data 1503 and the traffic data builder 1506.

The associated search stats XML 1742C is adapted to create the XML document version of the search stats view 1739C that can be transformed into HTML for display. The HTML page includes tabular statistics.

The search keywords view 1727D is an interactive graphical display of the searches broken down by keywords. The associated search keywords view panel 927G extends the report view panel 927. The search keywords view panel 927G is registered with the user interface panel 1203 for use when displaying a report 903.

The associated search keywords XML 1733D is adapted to create the XML document version of the search keywords view panel 927G that can be transformed into HTML for display. The search keywords control panel 1736D allows the user to configure whether the search keywords view panel 927G is shown as an applet in the external web-based report, or if screen snapshots of selected information are included.

The search data 909E extends the report data 909 and provides several different types of data regarding the usage of the search in a set of sessions 803. The search data 909E contains task data 1751 that is created for tasks 1003 analyzed to ascertain how visitors used the search. The search data builder 945C extends the report session data builder 945, filling in the search data 909, session 803 by session 803. The search data builder 945C accepts as parameters the set of sessions 803 and an optional session filter 833 with which to filter the set of sessions 803 prior to the analysis.

For exemplary purposes only, the following description describes an IVR domain as implemented by the present system. Within the exemplary domain, various components relate to or derive from the more general components described above. The reference numerals used to describe the various components of the IVR domain, therefore, represent that these various components are instances or children of the more general (parent) components, or that the various components are related to or derived from the more general components.

In the IVR domain, users interact with the subject system 133 via the telephone, either by touch-tones (DTMF) or voice (speech). In the activity analysis system 153 there is an IVR presentation model to model the IVR system's presentation aspect. All IVR systems keep logs of their activity, although not in a standardized way as in the web domain. The user of the IVR system is termed a caller, and the session of usage of an IVR system is termed a call.

The activity analysis system 153 can be used to analyze IVR applications, both DTMF-based and speech based applications. As such the activity analysis system 153 includes components derived from the model framework to model the IVR domain. In the IVR domain, an IVR presentation model 715B is used to model the user interface 303 of an IVR application, be it DTMF-based or speech-based. The IVR presentation model 715B thus extends the presentation model 715. The IVR presentation model 715B is associated with an IVR presentation model snapshot 412E that extends the state machine snapshot 412, and an IVR presentation model config 409E that extends the state machine config 409. The default state machine snapshot builder 415 is used to read the graph command file to build an IVR presentation model snapshot 412E. The IVR presentation model config 409E provides configurations for defining how the IVR presentation model snapshot 412E is created.

Also associated with an IVR presentation model 715B is an IVR presentation model definition panel 430E that extends the state machine definition panel 430. The IVR presentation model definition panel 430E allows the user of the activity analysis system 153 to define parameters of the IVR presentation model 715B, edit the IVR presentation model config 409E, and add IVR presentation model snapshots 412A. The IVR presentation model editor panel allows editing of the model graph 421 for any IVR presentation model snapshots 412A, including the ability to add and remove nodes and edges.

The IVR log source 503F models an IVR system in the IVR domain. For the purpose of the activity analysis system 153 model, the IVR log source 503F is a source of events regarding the IVR system; hence IVR log source 503F extends the log source 503. The IVR log source 503F has an associated IVR log entry 509E that extends the log entry 509 and represents the information in a typical IVR application log entry. A parser sub-class is written for each different IVR system's log file format, which creates the common IVR log entry 509E type. The IVR log entry 509E contains fields common to IVR system implementations such as timestamp, caller ID, node (menu, form, prompt) identifier, and user input. Additionally, there are several custom fields that are used to store particular system info such as speech recognition confidence, barge-in, and status. Generally, the IVR log entry 509E contains various fields, as described in Table 11.

TABLE 11

| Field Name | Description |
| --- | --- |
| CALLER_ID | Telephone number of the caller. |
| IDENT | Account number or other identification of the caller from the IVR system. |
| AUTH | Authenticated username of the caller from the IVR system. |
| DATE | Timestamp of the log entry. |
| STATE | Identifier (URI or state ID) of the state in IVR system requested, such as the prompt, menu, form, etc. |
| STATUS | Status code of the state. |
| COOKIE | Optional, additional custom information provided by log pre-processing Perl scripts that parse the CLF and ELF log entries and add a custom field value based on the state in the log entry and on some external data. |

Associated with the IVR log source 509A is an IVR log source definition panel 518E that extends the log source definition panel 518. The IVR log source definition panel 518E allows the user of the activity analysis system 153 to define parameters of the IVR log source 503F and to add log files for analysis.

In the IVR domain, IVR session context 818I extends the session context 818 and is used as the primary session context for each session 803. IVR session context 818I keeps caller ID information for the session 803, extracted from the IVR log entries 509A.

An IVR-specific sub-class of each of the report components 915 exists in the IVR domain. Each of the class names is prefixed with "IVR." At a minimum, these classes are customized with terminology particular to the IVR domain, and know how to work with the IVR domain specific data.

IVR demographic data builder 1512B is able to use the information in the IVR session context 818I to create the geographic data in the demographic data 1509, using a database with specific data. The IVR task data builder 1754B supplies the IVR demographic data builder 1512B as a task stage data builder for the task data 1751 created in the IVR domain.

At the application logic level, the activity analysis system 153 provides both DTMF and speech application models for accepting user input. The DTMF user input is simple (e.g., touch-tone key presses), while the speech input is much more complex (e.g., spoken utterances). The latter involves many different parameters around the speech recognition engine.

An IVR application model 718E extends the application model 718 to model user input generically in an IVR system. The DTMF application model 718F extends the IVR application model 718E to model the DTMF input and speech application model 718G extends the IVR application model 718E to model the speech input and recognition. Associated with each is an IVR application definition panel 430F that extends the state machine definition panel 430. The IVR application definition panel 430F allows the user of the activity analysis system 153 to define the parameters of the IVR application.

Because the IVR log entry 509E includes the user input information and has place-holders for system-specific data, a separate log source is not required for the IVR application model. Each IVR application session builder knows how to process the IVR log entry 509E for its system.

The IVR application session builder 824D realizes the application session builder 824. The IVR application session builder 824D has two sub-classes, including DTMF application session builder 824E and speech application session builder 824F. The DTMF application session builder 824E and speech application session builder 824F create an application session 812 and application session entries 815 with the associated session contexts 818. IVR application session context 818J realizes the session context 818 and is extended by the DTMF application session context 818K and speech application session context 818L. The latter adds information about the speech recognition for the application session: the recognized count and rejected count per node, the recognition confidence and rejection confidence per node, and the number of barge-ins per node. This information is accumulated in the speech application session context for each node while the speech application session 812A is built. IVR application session entry context 818M realizes the session context 818 and is kept in each application session entry 815. The IVR application session entry context 818M includes the user input provided in the session entry 806.

The IVR application model 718E introduces a new report topic to analyze the behavior of a speech recognition system. The speech topic 918E extends the report topic component 918, and includes several different views that extend the report view component 921. The views present data stored in speech data 909F that is built to analyze how the speech recognition engine was utilized in a set of sessions 803. This analysis includes analyzing the speech recognitions and rejections, confidence levels, and barge-ins across the different nodes of the presentation graph 721.

The speech topic 918E has an associated speech topic control panel 933D that extends the report component control panel 933. The speech topic control panel 933D allows the user of the activity analysis system 153 to set parameters of the speech recognition analysis.

The speech overview view 1706D provides a high level overview of the speech recognition analysis. The speech overview view 1706D includes overall statistics on the speech recognition process. The associated speech overview XML 1709D is adapted to create the XML document version of the speech overview view 1706D that can be transformed into HTML for display.

The speech stats view 1739D provides detailed statistics regarding the speech recognition system. Some of the statistics describe overall performance, while others summarized behavior for each node in the presentation graph 721. Such information is found in the speech data 909F for the report 903. Thus, the speech overview view 1706D depends on a speech data builder 945D to construct the speech analysis data in the report 903.

The associated speech stats XML 1742D is adapted to create the XML document version of the speech stats view 1739D that can be transformed into HTML for display. The HTML page includes tabular statistics.

The path user input data 909G extends the report data 909 and records the counts of user input strings, including the complete phrases and input broken down by individual words. This is kept over a sequence of steps in a task path. A path user input data builder 945E extends the report session data builder 945 and creates the path user input data 909G by accessing the IVR application session entry context 818M from a session 803 that contains an IVR application session 812B. In the DTMF application model 718F the word breakdown is not relevant.

A node path user input data builder 945F, which extends the report session data builder 945, is used to create node path user input data 909H, which extends the report data 909. Node path user input data 909H contains a set of path user input data 909G for a given set of nodes in the presentation graph 721. Given the set of nodes, the node path user input data builder 945F creates the path user input data 909G for the following paths: the node itself, the node followed by each of the other nodes with outgoing traffic from the node (outgoing 2 step path), the node preceded by each of the other nodes with incoming traffic into the node (incoming 2 step path), and for the dominant incoming paths into the node and outgoing paths originating at the node up to a present path length—to be displayed in the IVR traffic viewer view 1509A. The node path user input data builder 945F utilizes the traffic data 1503 to make these path determinations.

The speech data 909F extends the report data 909 and provides several different types of statistics regarding the speech recognition. These include but are not limited to the recognized count and rejected count per node, the recognition confidence and rejection confidence per node, and the number of barge-ins per node. The speech data builder 945D extends the report session data builder 945 and creates the speech data 909F by accessing the speech application session context 818L from a session 803 that contains a speech application session 812A and accumulating the data kept in the context for each node in the presentation graph 721.

The node details DTMF category 1469A extends the node details category provider 1469 to provide DTMF user input information in the IVR traffic viewer view's 1509A node details display. The node details for a given graph node 709 show the DTMF input, count, and percentage that was received for the given graph node 709. Such data is retrieved from the node path user input data 909H built for the IVR traffic viewer view 1409A when the DTMF application model 718F is present in the project 603.

The edge details DTMF category 1472A extends the edge details category provider 1472 to provide DTMF user input information in the IVR traffic viewer view's 1509A edge details display. The edge details DTMF category 1472A works for both edges and edges within a task path. The edge details for a given source graph node 709 and a destination graph node 709 show the DTMF input, count, and percentage that occurred at the source graph node 709 and caused a transition to the destination graph node 709. The edge details for a given task path and then more specifically the details for an edge within the path shows the speech input, count, and percentage that occurred within the path at the source graph node 709 of the edge and caused a transition to the next graph node 709 in the task path. Such data is retrieved from the node path user input data 909H built for the IVR traffic viewer view 1409A when the DTMF application model 718F is present in the project 603.

The node details speech category 1469B extends the node details category provider 1469 to provide speech recognition user input information in the IVR traffic viewer view's 1509A node details display. The node details for a given graph node 709 show the speech recognition input, count, and percentage that was received for the given graph node 709. There are two sub-categories: one with the full utterance phrase counts and the other with utterance keyword counts. Such data is retrieved from the node path user input data 909H built for the IVR traffic viewer view 1409A when the speech application model 718G is present in the project 603. FIG. 29 displays a screenshot of an IVR traffic viewer view panel 1512A of the IVR traffic topic, showing the speech node details category illustrating utterances.

The edge details speech category 1472B extends the edge details category provider 1472 to provide speech recognition user input information in the IVR traffic viewer view's 1509A edge details display. The edge details speech category 1472B works for both edges and edges within a task path. The edge details for a given source graph node 709 and a destination graph node 709 show the speech input, count, and percentage that occurred at the source graph node 709 and caused a transition to the destination graph node 709. FIG. 30 displays a screenshot of an IVR traffic viewer view panel 1512A of the IVR traffic topic, showing the speech edge details category illustrating utterances for an edge. The edge details for a given task path and then more specifically the details for an edge within that path shows the speech input, count, and percentage that occurred within the path at the source graph node of the edge and caused a transition to the next graph node in the task path. FIG. 31 displays a screenshot of an IVR traffic viewer view panel 1512A of the IVR traffic topic, showing the speech node details category illustrating utterances for a dominant path. There are two sub-categories: one with the full utterance phrase counts and the other with utterance keyword counts. Such data is retrieved from the node path user input data 909H built for the IVR traffic viewer view 1409A when the speech application model 718G is present in the project 603.

The task insight DTMF category 1724A extends the task insight category provider 1724. The task insight DTMF category 1724A differs from other task insight providers in that it does not show information for a particular user attribute through the performance entire task. The task insight DTMF category 1724A shows the DTMF input values, counts, and percentage for each step in the task. These input values are different for each step; therefore, it does not include the overall task performance charts and tables. This provider uses path user input data 909G, which is built as one of the task step 1006 inside the task data 1751 when the DTMF application model 718F is present in the project 603, to retrieve this information.

The task insight speech category 1724B extends the task insight category provider 1724. The task insight speech category 1724B differs from other task insight providers in that it does not show information for a particular user attribute through the performance of the entire task 1003. The task insight speech category 1724B shows the speech recognition input values, counts, and percentage for each step in the task. These input values are different for each step; therefore, it does not include the overall task performance charts and tables. There are two sub-categories: one with the full utterance phrase counts and the other with utterance keyword counts. FIG. 33 displays a screenshot of an IVR task flow view panel of the task topic, showing task flow insight illustrating a speech task insight category showing utterances for the task step, in accordance with some embodiments of the present invention. This provider uses the path user input data 909G, which is built as one of the task step 1006 inside the task data 1751 when the speech application model 718G is present in the project 603, to retrieve this information.

For a CRM domain, customer relationship management (CRM) tools exist to keep track of contact points with a customer. Each customer is identified by some key: name, account number, phone number, and other similar data. The CRM database in such a system includes all of the data organized by time and customer. When a customer interacts with the company or vice-versa it is recorded in the CRM tool. A customer service representative (CSR) utilizes CRM software applications to keep track of calls, including the source, issue, action items, and resolution. The database or log of calls processed by such a system includes all of the data organized by time and user.

The activity analysis system 153 models such a system with a CRM presentation model and a CRM application model. The former includes states in the user interface with which the user of the CRM system interacts, if logging of such interaction is relevant. The latter includes access to the CRM operations data. A CRM log source reads the customer contact data created by the CRM support system and converts it to log entries for analysis.

When doing a cross-channel analysis, the activity analysis system 153 can analyze how a potential customer interacts with a company's web site or call center. In this case only the CRM application model is relevant because it is the customer contact that is interesting. Alternatively, the activity analysis system 153 can analyze how the CRM tool itself is used by the company—in which case the CRM presentation model is relevant.

In the SFA Domain, sales force automation (SFA) tools exist to keep track of sales and marketing operations relevant to a potential customer. Each customer is identified by some key: name, account number, phone number, etc. The SFA database in such a system includes all of the data organized by time and customer. Each time a salesperson contacts a potential customer it is recorded in the SFA tool.

The activity analysis system 153 models such a system with an SFA presentation model and a SFA application model. The former includes states in the user interface with which the salesperson interacts, if logging of such interaction is relevant. The latter includes access to the SFA operations data. A SFA log source reads the customer contact data created by the SFA support system and converts it to log entries for analysis.

When doing a cross-channel analysis, the activity analysis system 153 can analyze how a potential customer interacts with a company's web site or call center as a result of a sales call. In this case, only the SFA application model is relevant because it is the customer sales contact that is interesting. Alternatively, the activity analysis system 153 can analyze how the SFA tool itself is used by the company—in which case the SFA presentation model is relevant.

More particularly, a cross-channel analysis provides analysis of how a customer or user interacts across several of a company's systems. For example, the activity analysis system 153 can model a self-service area of a web site, a speech-based IVR system, and a CRM call center application. Such cross-channel analysis involves using the various state machine definition panels 430 to define a web site, IVR presentation model, speech application model, and CRM application model, to name a few. For logging, log sources 503 are created to define the web server log source, IVR log source, CRM log source, or other appropriate log source 503.

To create the reports for analysis, the presentation graph 721 is created across the model graphs 421 for the state machines 403. The resulting cross-channel presentation graph 721 includes a root node for each domain, or channel, thereby allowing a user of the activity analysis system 153 to examine the structure of each system in the different domains.

A notable feature for the cross-channel analysis is the ability to identify a user of the subject systems 133 being modeled across the domains. Typically, there is an account based login that identifies the user of the web site, an account number entered in the IVR system, and an account number given to the CSR to be entered in the CRM system. In such cases, the session key and user key can be the account number. However, if the user identification methods are different in each domain, each log source 503 configuration manager 1115 identifies a data file that maps key values for that log source to a global key value (unique across all the log sources and domains). Accordingly, the session 803 can be constructed through a presentation graph 721 that spans state machines 403 with different log sources 503 in different domains. The session key and user key values are then the same for the same actual user of the subject system 133, allowing subsequent application of the reporting functionality across the multiple domains.

Additionally, it is sometimes desirable to configure the session timeout to be longer in order to track task performance across the domains that occurs over longer periods of time separating the access. A timeout of one day, for example, allows sessions 803 to be created that include a user accessing a web site and then an IVR system later in that day. An infinite timeout allows the user interaction with the system to be treated as one very long session 803 to see all of the cross-domain tasks 1003 regardless of time separation. The cross-task analysis by user key may be useful in cross-channel analysis, revealing how sets of tasks were performed together by user instead of simply by session.

EXAMPLE

Operational Characteristics of Activity Analysis System in Web Domain

The following is a description of the operational characteristics of the activity analysis system 153 with reference to the web domain. The description of operational characteristics is for exemplary purposes only. One skilled in the art will recognize that similar descriptions of operational characteristics exist for each domain used by the activity analysis system 153.

To define a new web site 715A, the user of the activity analysis system 153 clicks a button in a state machine list (definition) panel 430. A request is sent to the state machine repository 406 to create an instance of a web site 715A, initially configured within a predetermined pattern. The user is then prompted by the state machine list panel to provide the name of the site, the site URL, and a configuration description of the site, all of which are set within the web site 715A object. The new web site 715A is then added to the state machine repository 406, wherein the new web site 715A is generally stored as XML. Storing the web site 715A includes the storing of the web site's 715A child components (e.g., state machine config 409 and state machine snapshots 412, if any exist), although only the default web site config 409A currently exists at this point.

Next, a site definition panel 430A is created and passed to the web site 715A, in order for the user to edit the web site 715A configuration and/or create web site snapshots 412A. If the user desires to edit the configuration, indicated by clicking on the appropriate button, a site editor panel is launched. The site editor panel acquires the current state machine config 409 from the web site 715A and retrieves the default web site config 409A object. If web site snapshots 412A already exist for the web site 715A, then a new web site config 409A would be returned. From the web site config 409A, a configuration manager 1115 instance is retrieved, through which the site editor panel user interface can get and set the configuration values in response to user interaction.

The site configuration defines many different options that affect how a web site snapshot 412A is constructed from visiting the site. These include, but are not limited to, configuration of how forms in the HTML are played, grouping of pages for a more abstract analysis, how states in the site are handled, and the addition and/or deletion of pages.

When the user is finished editing the site configuration, the site editor panel is closed. This results in the web site config 409A being updated in the web site 715A, which in turn saves the new state of the web site config 409A. When the user finishes and closes the site definition panel 430A, then the state of the web site 715A is updated into the state machine repository 406, saving the new state of the web site 715A.

The user can use the site definition panel 320A to initiate the creation of web site snapshots 412A. Web site snapshots 412A can also be initiated automatically through the batch controller 1112. First, the web site 715A is asked to create an instance of its state machine snapshot builder 415, returning a new site snapshot builder 415A. Then, a new state machine snapshot director 418 is instantiated, given the web site 715A as the state machine 403 and the site snapshot builder 415A as the state machine snapshot builder 415. The state machine snapshot director 418 works generically for all types of state machines 403 built by different builders.

The state machine snapshot director 418 is asked to construct the state machine snapshot 412, working asynchronously. Accordingly, the state machine snapshot director 418 is provided with an asynchronous completion listener, which is notified when the construction is complete, and the web site 715A object is provided as the opaque asynchronous completion token as in the asynchronous completion token pattern. First, the state machine snapshot director 418 initializes the state machine snapshot builder 415 with the state machine 403, which is the web site 715A in this case. The site snapshot builder 415A requests that the web site 715A create an instance of its state machine snapshot 412, and a web site snapshot 412A object is returned, in a predetermined pattern. The site snapshot builder 415A sets the valid date range for the web site snapshot 412A to be the current time to infinitely in the future (i.e., it is valid forever). The site snapshot builder 415A then requests the current state machine config 409 from the web site 715A, and sets the state machine config 409 in the web site snapshot 412A to be used to build the snapshot.

Next, the state machine snapshot director 418 asks the site snapshot builder 415A to build the web site snapshot 412A. This is an asynchronous process, so the state machine snapshot director 418 provides an asynchronous completion listener. The site snapshot builder 415A then retrieves the web site config 409A and creates a model graph 421 that will be used to represent the web site 715A in the web site snapshot 412A. The state machine snapshot director 418 then commences spidering of the web site identified by the site's URL, filling in the model nodes 424 of the model graph 421 as the state machine snapshot director 418 encounters pages, operating according to the site configuration in the web site config 409A. When spidering is complete, the state machine snapshot director 418 sets the model graph 421 in the web site snapshot 412A and returns the asynchronous completion event indicating success, if the spidering completed properly.

It should be noted that state machine snapshot builders 415 in all domains incorporate a graph command file with parsing capability. The web domain is special in that it can spider the subject system live. However, often the domain presents no way of live access to the subject system 133 such that the structure can be recorded. In these cases, the graph command file is manually generated. Typically, the graph command file contains a list of model nodes 424 to create and the model edges to create between them.

The asynchronous completion event for building is received by the state machine snapshot director 418. If successful, the site snapshot builder 415A is asked to finish building, cleaning up any necessary housekeeping tasks. Then the completed web site snapshot 412A is retrieved from the site snapshot builder 415A and returned in an asynchronous completion event to the site definition panel 430A.

The site definition panel 430A now presents the user with a dialog box whereby the valid date range of the web site snapshot 412A can be adjusted, in the case that the web site snapshot 412 is used to represent a site that existed in the past. Finally, the web site snapshot 412A is added to the web site 715A. The web site state machine 403 checks the valid date range of the web site snapshot 412A, and, if there is a previous web site snapshot 412A whose date range is infinite into the future and the new web site snapshot's 412A date range is after the start date of the previous web site snapshot 412A, then the previous web site snapshot's 412A end date is set to the start date of the new web site snapshot 412A. Then the web site snapshot 412A is stored as an XML file along with its child component being the model graph 421.

To define a web server 503A, a user clicks on a button in the log source list (definition) panel 518. The log source list panel requests that the log repository 515 create an instance of a web server 503A, having a predetermined pattern. The user is then prompted to enter the name of the web server, the server URL, and the description of the web server, all of which are set in the web server 503A object. The web server 503A is then added to the log repository 515 as an XML file. Storing the web server 503A also stores all corresponding child components (internal log repository entries 509, if any exist), although no such data exists at this point.

Next, a web server definition panel 518A is created and passed to the web server 503A, in order for the user to edit the web server 503A configuration and/or add log files. To edit the configuration, the user interface 303 uses get and set methods on the web server 503A in response to user interaction. The web server 503A configuration defines many different options that affect how a server log is parsed. These include but are not limited to setting the log file format, the server aliases, and the session identifying key. When the user finishes and closes the web server definition panel 581A, then the state of the web server is updated into the log repository 515, saving the new state of the web server 503A.

The web server definition panel 518A allows a user to add web server log entries 509A to the web server 503A. When the user clicks the appropriate button, the web server definition panel 518A creates a log source entries panel passing the web server 503A as the log source 503. The log source entries panel allows the user to specify the URL(s) of log file(s) to add to the log source 503, in this case the web server 503A. For each URL specified, the web server 503A is directed to add log entries 509. A time offset allows the user to specify whether the timestamps in the log should be adjusted to account for time zone differences. The process works asynchronously, so an asynchronous completion listener is passed as well.

The log source 503 creates the appropriate log parser 506 in preparation for adding log entries 509 from a URL. In this case, the log source 503 is a web server 503A so an ELF log parser 506B is created. The parsing process begins with a call to the log parser 506 to initialize parsing, given the log source 503, log file URL, and the time offset. The log source then tests the log parser 506 to make sure it is able to read the URL properly. If so, the log parser 506 reads the log, for which the log parser 506 returns a log iterator which allows the log source 506 to access the log data. The log iterator is used to iterate through the log data. As the iterator is iterating, the log parser 506 reads the log line and uses the log source 503 to create a log entry 509. In this case, the log entry is a web server log entry 509A, created by the web server 503A using a predetermined method. The web server log entry 509A is returned from the log iterator and added to the internal log entry repository 515 kept by the web server 503A.

Once all web server log entries 509A are added, an asynchronous completion event is returned to the log source entries panel. The panel then queries the web server 503A for the current log data date range and counts to display to the user.

A report organizer panel allows the user to define a new project 603. This can also be initiated from the main menu provided by the user interface 303. First, the project manager 606 creates a new project 603 instance, using a predetermined method. A project definition panel 609 is then created and provided the project 603 to define.

The project definition panel 609 acquires the list of all state machines 403 that have been defined from the state machine repository 406, categorizing the list according to whether or not the state machines 403 are presentation models 715 or application models 718. The list of presentation models 715 are displayed to the user. When the user selects a presentation model 715 from the user interface, the list of compatible application models 718 for that presentation model 715 is retrieved and displayed. Additionally, whenever the user selects a state machine 403, the user interface 303 displays the list of compatible log sources 503.

When the user has provided a project name and selected the desired presentation models, application models, and log sources 503 to include in the project (indicated when the user submits the information through the user interface 303), the provided information is recorded in the project via set methods. Subsequently, the report organizer panel adds the project 603 to the project manager 606. This results in the project 603 being saved in the data storage unit 1109. In order for report templates 906 to be defined for the project 606, some of the report visit filters require a presentation graph 721. Thus, a project 603 has a "default" presentation graph 721 which is created before any report templates are defined. This default presentation graph 721 spans the entire date range of the log data that exists for the log sources 503 included in the project 603. The project 603 creates the default presentation graph 721, asynchronously. The project 603 requests that the project manager 606 create a presentation graph 721 and, therefore, the project 603 provides the project manager 606 with the list of presentation models 715 and the log source date range, as well as an asynchronous completion listener to be notified when the graph creation is complete.

After the presentation graph 721 is built, the presentation graph 721 is returned via an asynchronous completion event to the project 603, which sets the received presentation graph

721 as its default graph. Then the project 603 returns an asynchronous completion event to the report organizer panel to notify that the graph creation is complete. If completed successfully, the report organizer panel updates the project 603 and provides it to the project manager 606, whereby the project 603 is stored in the data storage unit 1109, including the ID of the newly created default graph.

To define a report template 906, a user of the activity analysis system 153 begins by clicking a button provided by the report organizer panel. The user is provided with a list of report templates 906 already created from which the settings can be used. If a user does not desire to choose any of the report templates 906 from the list, then a new default report template 906 can be created. The report organizer panel then creates a new report template 906 instance. Next, the report organizer panel creates a report template definition panel 930 passing in the new report template 906 and the initial report template 906 the user selected, if applicable.

The report template definition panel 930 uses the report manager 912 to retrieve the configuration for report topic components 918 to be provided to the user as options for inclusion within the definition of the report template 906. For each report topic component 918, report template definition panel 930 creates a check box in the user interface 303 and then requests that the report topic component 918 create the report component control panel 933. If the report topic component 918 has an associated report component control panel 933, the report topic component 918 creates a new instance of the report component control panel 933 (the new instance is a sub-class of report component control panel 933). The report template definition panel 930 then includes the report component control panel 933 next to the check box in the user interface 303.

The report template definition panel 930 includes controls for specifying the date range and schedule of the report template 906, as well as for customizing the views of each topic and visit filters. The report template definition panel 930 creates a report view panel 927 to customize the view display. The report view panel 927 has a tab for each available report topic component 918. Inside each tab is a check box for each report view component 921 belonging to the corresponding report topic. The report view panel 927 retrieves the list of report view components 921 from the report manager 912. Next, with the check box for each report view component 921, the report view panel 927 includes the report component control panel 933 for that view, if applicable. The report component control panel 933 is retrieved from each report view component 921 in a similar manner to the topics described above.

The report template definition panel 930 creates a report filters panel to allow the user to edit the report filter components 924. The report filters panel retrieves the list of report filter components 924 from the report manager 912. The report filters panel creates a tab for each report filter component 924 and installs the report component control panel 933 for each report filter component 924 as the body of the corresponding tab.

Once the report template definition panel 930 is created according to the current report configuration, the settings are loaded into the user interface 303, if an initial report template 906 was selected by the user. The report template definition panel 930 ensures that each report component control panel 933 of the report topic components 918 is loaded from the initial report template 906. The report component control panel 933 determines whether the corresponding report topic component 918 is part of the initial report template 906. If so, report topic component 918 provides its settings via accessors and the report component control panel 933, accordingly. Next, the report views component 921 loads from the initial report template 906. Then, the report views component 921 iterates through all of the report component control panels 933 for the views, which are loaded from the initial report template 906. Each of these report component control panels 933 first checks if the corresponding report view component 921 is part of the initial report template 906. If so, the report view component 921 provides its settings via accessors and the report component control panel 933, accordingly. Similarly, the report filter panel then loads from the initial report template. The report filter panel iterates through each report component control panel 933 which checks the initial report template 906 for the presence of corresponding report filter component 924.

Now the user interacts with the user interface 303 to set the report template 906 attributes and pick topics, views, and visit filters to include in the new report template 906. The user is only allowed to select and customize views for the topics that have been selected. The name, category, date range, and schedule provided by the user are set in the new report template 906 using modifier methods. Next, the report template definition panel 930 stores the data to the new report template 906. The report template definition panel 930 iterates through each topic that the user has checked and requests that the report manager 912 create a new instance of the report topic component 918 based on the topic's name. The report manager 912 uses the loaded report topic components 918 as prototypes for creating the new objects. Each new report topic component 918 is added to the new report template 906. If a report component control panel 933 exists in the user interface for that topic, the report component control panel 933 stores the state data in the new report template 906. The report component control panel 933 retrieves the newly created report topic component 918 in the report template 906 and uses modifier methods to set the report topic settings.

Next, the report template definition panel 930 requests that the report view panel 927 store its state data in the new report template 906. The report view panel 927 iterates through each view that the user has selected and requests that the report manager 612 create a new instance of the report view component 921 based on the view's name. The report manager 912 uses the loaded report view components 921 as prototypes to create the new objects. Each new report view component 921 is added to the new report template 906. If a report component control panel 933 exists in the user interface for that view, the report component control panel 933 is stores the state data in the new report template 906. The report component control panel 933 retrieves the newly created report view component 921 in the report template 906 and uses modifier methods to set the report view settings.

Similarly, the report template definition panel 930 requests that the report filters panel stores the state data in the new report template 906. The report filters panel iterates through each of the report filter components 924 and determines whether the components are in a default state. If not, then the report manager 912 creates a new instance of the report filter component 924 based on the filter's name. The report manager 912 uses the loaded report filter components 924 as prototypes to create the new objects. Each new report filter component 924 is added to the new report template 906. The report component control panel 933 saves its state data in the new report template 906. The report component control panel 933 retrieves the newly created report filter components 924 in the report template 906 and uses modifier methods to set the report filter settings.

After receiving confirmation from the user, the report organizer panel accesses the current project 603 and adds the new report template 906 to the project 603. This results in the report template being stored as an XML file within the project 603.

After a user has defined a report template 906, the user can create a report 903 using the report template 906 via the report organizer panel. Additionally, reports 903 are created automatically via the batch controller 1112 according to the report template 906 schedule.

The first step in creating a new report 906 is creating a report builder 936 instance. Then, a report director 939 is instantiated, and is then provided with the report template, project 603, a "with-respect-to" date, and the report builder 936. The with-respect-to date is the date used to create the new reports date range based on the date range in the report template 906.

Following a predetermined pattern, the report director 939 asynchronously constructs a new report 903, which is provided with an asynchronous completion listener. The report director 939 requests that the report builder 936 initialize the building process. At this point, the report builder 936 creates a new instance of the report implementation (e.g., the implementing class of the report 903). The report builder 936 then uses the date range in the report template 906 and the with-respect-to date to set the date range of the report implementation. For example, if the date range of the report template 906 includes last week, and the with respect to date is Monday June 12, then the date range of the report 903 will be Sunday June 4 through Saturday June 10.

The report director 939 requests that the report builder 936 build the report's 903 presentation graph 721. The report builder 936 uses the graph manager 703 to create the presentation graph 721, providing the graph manager 703 with the list of presentation models 715 for the report template 906 retrieved from the project 603, and the date range of the report 903. The presentation graph 721 creation can happen synchronously in the report building process, because the report building is already occurring asynchronously. When the presentation graph 721 has been created and returned, the presentation graph 721 is set in the report implementation. Similarly, if there are application models 718 within the project 603 for the report template 906, the graph manager 703 creates corresponding application graphs 733, which are set in the report implementation.

Next, the report director 939 requests that the report builder 936 build the report's sessions 803. The report template 906 provides the session filter 833 to be uses for the report 903. The report template 906 retrieves a session filter 833 from each of the report filter components 924, which were originally created according to particular filter settings. Then, an AND operation is applied to the session filters 833, and the results are returned to the report builder 936, which sets the session filter 833 in the report implementation. Next, the report builder 936 requests that the session manager 827 create the sessions 803 for the report 903. The report builder 936 provides the session manager 827 with the report's 903 presentation graph 721 and date range. The session 803 creation can happen synchronously in the report building process, because the report building is already happening asynchronously. When the session set is created and returned, the session filter 833 is applied to the session set, resulting in a filtered session set that represents the visit filters specified in the report template 906. This filtered session set is configured in the report implementation.

The report director 939 then requests that the report builder 936 create and submit the report data builders 942. From the report template 906, the report builder 936 retrieves each report view component 921, wherein each report view component 921 creates its input data builders. Each view creates one or more report session data builders 945 and/or report meta data builders 948 as needed by the concrete view type. The report session data builders 945 and/or report meta data builders 948 are added to the report builder 936. For each report data builder 942 added, the report builder 936 returns a data ID that the view keeps to identify the report data 909 that will be built by the report data builder 942. Report data builders 942, that are dependent on other report data 909 to create their own data, will create the report data builders 942 needed and add them to the report builder 936 as well.

Next, the report director 939 requests that the report builder 936 build the report's session data. Report session data is report data 909 that is dependent on accessing the sessions 803 that are part of the report 903 in order to create corresponding data. Each report session data builder 945 that was added to the report builder indicates whether corresponding input data dependency is satisfied. A particular report session data builder 945 might be dependent on the existence of another piece of report data 690 in addition to the sessions 803, in which case the report session data builder 945 responds that the input data dependencies are not satisfied. If, however, the dependencies are satisfied, the report session data builder 945 is placed in a set and processed together.

The set of report session data builders 945 is then iterated over, wherein each report session data builder 945 initializes the building of corresponding data by instantiating their sub-class of report data 909 for the current report 903. Then the set of sessions 803 is retrieved from the report 903 and iterated over; wherein each session 803 is passed to each report session data builder 945 in order to build the data relevant to that session 803. Once all the sessions 803 are processed, all of the report session data builders 945 finish their building process. Then, the resulting report data 909 and the report data ID are retrieved from each report session data builder 945 and the report builder 936 sets the data in the report implementation using each report data ID.

Once the set of report session data builders 945 is processed, a determination is made as to whether the remaining report session data builders 945 are now ready to build their data. This process repeats until all session data builders have built their report data 909.

Next the report director 939 directs the report builder 936 to build the report's meta-data. Report meta data is report data 909 that is not dependent on accessing the sessions 803, but can be dependent on other report data 909. Each report meta data builder 948 that was added to the report builder determines whether the corresponding input data dependency is satisfied. If the dependencies are satisfied, the report meta data builder 948 is placed in a set and processed together.

The set of report meta data builders 948 is then iterated over, wherein each report meta data builder 948 initializes the building of data by instantiating their sub-class of report data 909 for the current report 903. Then, each report meta data builder 948 builds corresponding data for the current report 903. Finally, all of the report meta data builders 948 finish the building process. Then, the resulting report data 909 and the report data ID are retrieved from each report meta data builder 948. The report builder sets the data in the report implementation using each report data ID.

Once the set of report meta data builders 948 is processed, a determination is made as to whether the remaining report meta data builders 948 are now ready to build data. This process repeats until all report meta data builders 948 have built their report data 909.

Because all of the report data 909 has been created for the report 903, the report director 939 retrieves the report 903 from the report builder 936 and returns an asynchronous completion event containing the report 903 to the report organizer panel. The report organizer panel retrieves the current project 603 and adds the resulting report 903 to it, which results in the report 903 being stored.

To view a report 903, the activity analysis system 153 utilizes a report view panel 927, a sub-class of the user interface panel 1203. The report view panel 927 is the main display panel in most deployment configurations that display reports. The report view panel 927 is notified when a new report 903 is set in the user interface 303. A new report 903 is generally set in the user interface 303 after a user has selected a report 903 to view from the report organizer panel.

When the report view panel 927 receives the update event that a new report 903 is displayed in the user interface 303, the report view panel 927 subsequently displays the new report 903 views. First, the report view panel 927 clears all existing report view panels 927 that are registered as wrapped components. Then, the report view panel 927 adds the wrapped components for the new report 903, as follows. From the report 903, report view panel 927 retrieves the report template 906 which includes a list of report view components 921. Each report view component 921 creates a corresponding view panel, if applicable (e.g., if the report view component 921 uses XML/XSL to create the display, then the HTML pane panel 1206 framework is used to display the view, without requiring a report view panel 927 for that view). If the view has a view panel, a sub-class of report view panel 927, the view provides the view URI to use to identify the view panel. Then, this report view panel 927 is added as a "wrapped component" to the report viewer panel 927 associated with the view URI.

Next, the report view panel 927 creates and installs an instance of the report menu 1242 for the report 903. An item is added to the menu for the report summary, which exists in every view. Then, the report menu 1242 retrieves the list of report topic components 918 from the report template 906, in display rank order. Each report topic component 918 provides a list of report view component names, also in display rank order. The report menu 1242 then retrieves the first of those views that is present in the template from the report template 906. The report view component 631 that is found first is set as the starting view for that topic in the report menu 1242 by recording the view URI, and the topic is added as an item in the report menu 1242.

Now that the report view panel user interface is ready to display the report 903, the first view set is always the report summary, which is a well-known view URI. To set a view URI, the current display is cleared. If a wrapped component exists with the requested view URI, the wrapped component is displayed in the body of the report view panel 927. Otherwise, the HTML pane panel 1206 is used to display the view URI. The HTML pane panel 1206 is given the view URI to display. The URI is then converted into a fully-qualified class name, which identifies either a subclass of the HTML pane implementation or XML pane implementation. A new instance of the class is created and set as the abstract HTML pane implementation panel in the HTML pane panel 1206. Generally, XSLT is used to create the HTML display; however, an HTML template could be used from the user interface directory in a similar manner.

Once the HTML pane panel 1206 has set the view URI, the HTML pane panel 1206 then displays the HTML as instructed by the report view panel 927. When the abstract HTML pane implementation is ready, it asynchronously creates the HTML string to display in the HTML pane panel 1206, when given an asynchronous completion listener. The two sub-classes of the abstract HTML pane implementation create the HTML string in different ways. The XML pane implementation starts by retrieving the report 903 from the user interface 303, and then asynchronously creates an XML document for the report 903. The concrete sub-class of the XML pane implementation retrieves the associated report view component 918 from the report template 906. The XML pane implementation uses the report data ID's stored in the report view component 921 sub-class to retrieve the needed report data 909 from the report 903. Also, the XML pane implementation creates an XML document that can be converted to HTML by the associated XSL file.

Upon completion of the XML document creation in the concrete sub-class of XML pane implementation, the XML document is returned in an asynchronous completion event to the XML pane implementation (parent or super). The XML pane implementation then creates the HTML string from the document using XSLT. The XSL file used for the translation is identified when the XML pane implementation is created, based on the view URI. Once the HTML content string is created, it is returned in an asynchronous completion event to the HTML pane panel 1206 and displayed in the HTML renderer. Accordingly, the user can use the report menu 1242 to navigate through the different topics and views of the report 903. In the web domain, each view is essentially a screen, or page, in the display.

To create a web-based report, or HTML report, the user can select the option from the report organizer panel. An external report 652 is instantiated to create the web report, given the report 903 for which the web report is to be created and the name of the index file to use to save the web report. The HTML report is then written asynchronously as follows.

To begin, the output directory for the web report HTML files, named the same as the index file minus the extension, is created. Common web report files are then copied into the directory. These files include the CSS style sheet, fixed HTML content, images, and other appropriate material. Next, the report index XML (a sub-class of XML pane implementation) object is created and a job to create its HTML content is added to the external report 951, with the report index XML object as the XML document creator. Then, the report summary XML (a sub-class of XML pane implementation) object is created and a job to create its HTML content is added to the external report 951, with the report summary XML object as the XML document creator. The table of contents entry is added to the menu for the summary.

The next part of the web report creation involves retrieving the list of report view components 921 from the report's 903 report template 906. For each report view component 921, a job is created to build the XML document. The name of the XSL file to use for creating the HTML content is retrieved from the report view component 921. Finally, a job is added for the report top XML (a sub-class of XML pane implementation).

Next, the jobs are processed asynchronously, in order. When one job completes the next one is started. For the jobs whose XML creator is a sub-class of the XML pane implementation, the only action is to request that the XML pane implementation create the XML document, providing the report 903 and output directory. When the XML document is created, the XSLT transform operation is invoked on the XML document using the XSL style sheet filename computed based on the name of the XML pane implementation class.

If the job's XML creator is a sub-class of the report view component 921, then the report view component 921 asynchronously creates the XML document for the view, when given the report 903. Additionally, the view provides its topic name, display name, and display rank. A table of contents menu item is created using this information; the table of contents entry uses the view display name, put in order of the topic display rank and the view display rank. This way all views for the same topic are together in the table of contents. The report view component 921 is then provides the view's table of contents. These are the anchors within the generated HTML page for the view that are put in the table of contents under the view's main entry. A sub-menu item is added to the table of contents menu for each menu item. When the XML document is created and the asynchronous completion event received by the external report 951, the XSLT transform is performed using the XSL file specified in the job. When the last job is finished, the table of contents menu is stored within the data storage unit 1109. The asynchronous completion event is then returned to the report organizer panel.

New presentation graphs 721 are created as part of the analysis of a project 603. When a presentation graph 721 is needed for the set of presentation models 715 in the project 603, the graph manager 703 requests that each presentation model 715 create an associated presentation graph builder 727. Each presentation graph builder 727 is adapted to build a presentation graph 721 implementation that corresponds to the concrete presentation model 715 implementation.

Next, the graph manager 703 creates a presentation graph director 730, which uses the presentation graph builders 727 to build the corresponding presentation graphs 721 and the corresponding presentation nodes 724. Each presentation graph builder 727 depends on the model graph 421 of the state machine snapshot 415 (of the presentation model 715) to build a corresponding presentation graph 721. The resulting presentation graph 721 is associated with the state machine snapshot 415 of the presentation model 715 over the date range for which the presentation graph 721 is built, and the corresponding presentation nodes 724 contain references to the associated model nodes 424 from which each was built. Once the separate presentation graphs 721 are built by the presentation graph builders 727, the presentation graph director 730 merges the presentation graphs 721 for the presentation models 715 into a single presentation graph 721.

Similarly, when an application graph 733 should be created for each application model 718 in the project 603, the graph manager 703 requests that the application model 718 create an associated application graph builder 739. The application graph builder 739 is adapted to build an application graph 733 implementation that corresponds to the concrete application model 718 implementation. Next, the graph manager 703 creates an application graph director 742, which uses the application graph builder 739 to build the corresponding application graph 733 (following a predetermined pattern) and the associated application nodes 736. Each application graph builder 739 depends on the model graph 421 of the state machine snapshot 412 (of the application model 718) to build the corresponding application graph 733. The resulting application graph 733 is associated with the state machine snapshots 412 of the application model 718 over the date range for which it is built, and the corresponding application nodes 736 contain references to the associated model nodes 424 from which each was built.

After creating a graph 706, the graph manager 703 caches and persists the graph in its internal repository 309, recording the attributes and the valid date range. The valid date range for the graph can be larger than the requested date range, because the data range is based on the date range of the state machine snapshots 412 used to build the graph 706.

To create a session set, the session manager 827 requests that each presentation model 715 state machine 403 (with which the specified presentation graph 721 is associated to) create a session builder 821 for the associated session 803 implementation. Additionally, the session manager 827 requests that each application model 718 state machine 403 (for each application graph 733) create an application session builder 824 for the associated application session 812 implementation. The session manager 827 might already have a session repository 809 for the presentation graph 721 and the application graphs 733 and date range. If so, the sessions 803 might need to be stored to the session repository 809. If no session repository 809 exists, then an empty session repository 809 is created. The set of state machines 403 (presentation model 721 and application models 718), for which the sessions 803 will be associated, is then queried for the log sources 503 associated with each state machine 403. The log repository 515 is then accessed to retrieve the log entries 509 for those log sources over the requested date range. Finally, the session manager 827 creates a session director 830, whereby the session manager 827 provides the session director 830 with the presentation graph 721, application graphs 733, session repository 809, list of log entries 509, session builders 821, and application session builders 824.

The session director 830, session builders 821, and application session builder 824 build the sessions 803 following a predetermined design pattern, which results in a session set. The session 803, application session 812, session entry 806, and application session entry 815 all have associated session context 818 that captures the state of the session 803 particular to the concrete session 803 being built. The resulting sessions 803 are cached and persisted in the session repository 809. Some of the sessions 803 might not be complete with respect to future log data, and they are so noted. This allows the session construction on the boundary of the date range to be incrementally filled in as needed.

Figure 34:
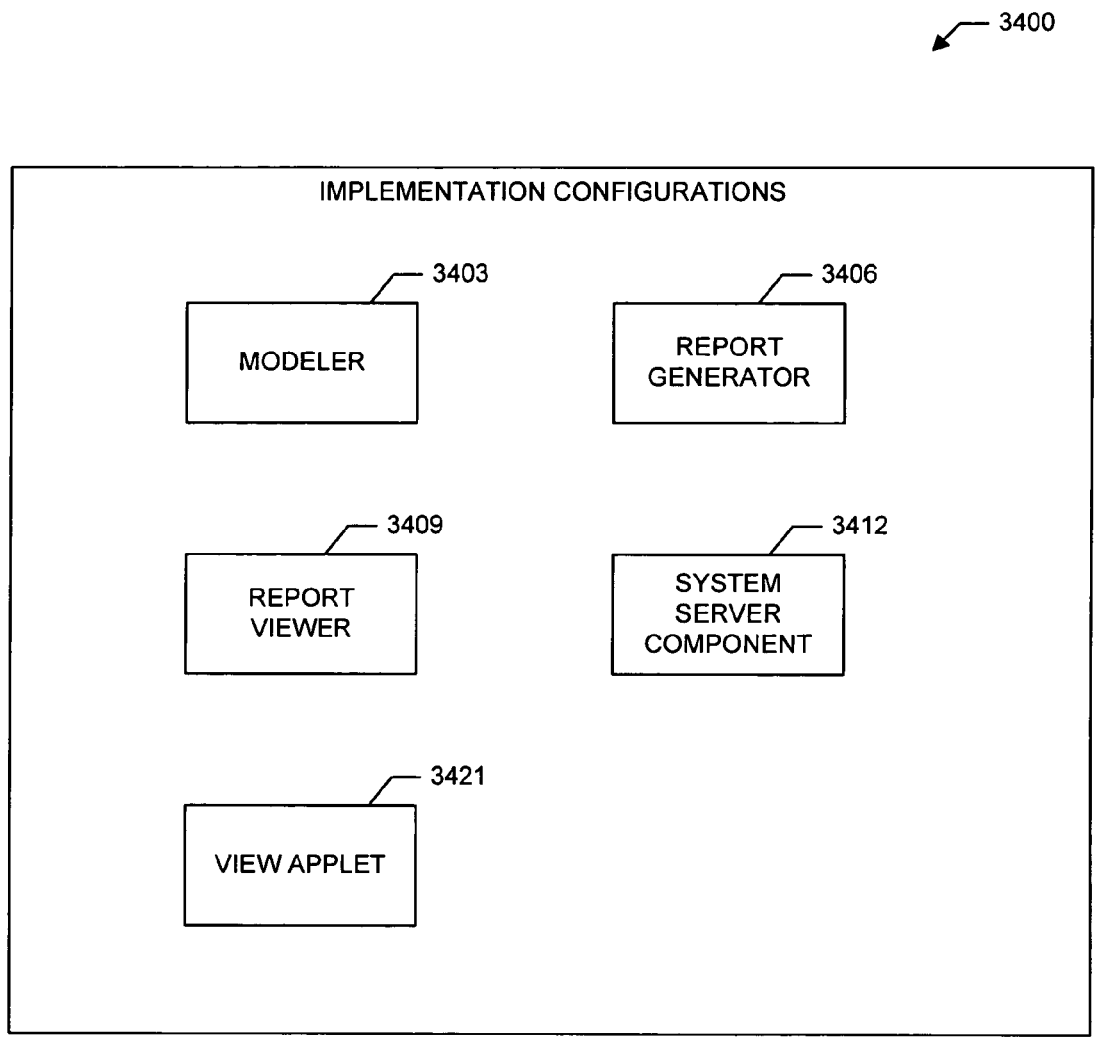
FIG. 34 displays a block diagram representation of implementation configurations of the activity analysis system in accordance with some embodiments of the present invention.

FIG. 34 displays a block diagram representation of implementation configurations 3400 of the activity analysis system 153 in accordance with some embodiments of the present invention. The various components that make up the activity analysis system 153 can be arranged and combined in different ways to build executable applications to support different deployment configurations. The flexible arrangement of the executable applications, within various implementation configurations 3400, permits the activity analysis system 153 to properly adapt to the unique characteristics of a particular deployment. An implementation configuration 3400 comprises a modeler 3403, a report generator 3406, a report viewer 3409, a system server component 3412, an activity analysis component 3515, a report manager 3418, and a view applet 3421.

The modeler 3403 models the subject system 133 and its corresponding event log sources 503. As such, the modeler 3403 includes the components of the system modeling unit 312, logging unit 318, graphs unit 324, and other domain specific packages.

The report generator 3406 allows projects 603, report templates 906, and task templates 1009 to be defined, and graphs 706, sessions 803, and reports 903 to be created. As such, the report generator 3406 includes components of the projects unit 321, reporting unit 315, graphs unit 324, sessions unit 330, and tasks unit 327 that that make up the data and build the data for projects 603, task templates 1009, report templates 906, graphs 706, sessions 803, tasks 1003, and reports 903. Because the report generator 3406 uses the modeled system, the report generator 3406 requires the components of the system modeling unit 312, logging unit 318, and specific domain model packages that provide the data model of the subject system 113. When running with a graphical user interface 303, the report generator's 3406 main user interface panel is the report generator panel and its associated menu. Without the graphical user interface 303, the report generator 3406 can be run in batch mode (from the command line).

The report viewer 3409 is built to view and interact with reports 903 that have been created within the activity analysis system 153. As such the report viewer 3409 includes components of the reporting unit 315 and the specific domain report packages, excluding the report builders. The report viewer 3409 also includes graph data from the graphs unit 324, but does not require access to the sessions unit 330, because the report data has already been built. The report viewer's 3409 main user interface panel is the report viewer panel and its associated menu.

The system server component 3412 includes the SOAP-accessible versions of the project 603 and report management classes. The system server component 3412 is used by the view applet and report viewer to access reports remotely.

The view applet 3421 allows the different user interfaces used in other components of the activity analysis system 153 to be included in and accessed via an applet. Depending on the user interface 303 being displayed, different classes are needed to provide the applet functionality. For example, a view applet 3421 that contains a particular report view includes the report classes and the user interface classes needed to access and view the data, plus the project and graph packages, and possibly the task package. View applets 3421 that display report data use a special form of data that is a serialized stream of the report 903, report template 906, graph 706, task 1003, and project 603 all in one file.

In operation, the executable applications discussed above and the corresponding components of the activity analysis system 153 permit the monitoring and analysis of a subject system 133. First, the system modeling unit 312 is used to model the structure of the subject system 133. Such modeling includes defining state machines 403 for the presentation model 715 and application model 718 of the subject system 133, and creating state machine snapshots 412 of the state machines 403 valid for particular date ranges.

Modeling of the subject system 244 event log sources 506 is accomplished by the logging unit 318 with input from the subject system 133 event logs. The logging unit 318 defines and configures the event log sources 503 so that the logs can be collected and processed. According to the configuration of the event log sources 503, the activity analysis system 153 can automatically collect event logs 503 as they are generated by the subject system 133. Optionally, event logs can be manually provided to the logging unit 318 of the activity analysis system 153.

Desired projects 603 are created by the projects unit 321 for the subject system 133 given the available state machines 403 for the subject system's 133 user interface 139 presentation and any application models. The projects unit 321 further permits designation of the event log sources from which the analysis will proceed.

Desirable reports 903 can be indicated with the reporting unit 315. Generally, reports 903 are defined through data including date range, a selection of report topics and views, and multiple visit filters to limit the visits to a particular set. Additionally, the reports 903 can be scheduled to run once or periodically with some frequency.

The activity analysis system 153 can automatically generate reports 903 on user behavior in the subject system 133 based on the report definitions (report templates 906) specified by the user of the activity analysis system 153. The automatic generation of reports 903 involves building of graphs 706 and sessions 803 from the state machines 403 and log sources 503, and then building of report data based on the report views specified in the report template 906. Building certain report data utilizes information from external subject system user databases, such as the Domain Name Service database mapping IP addresses to domain names. Once the reports 903 have been generated, the reports can be viewed through the user interface 303, such as a web browser. Many of the report views are interactive graphical visualizations supporting dynamic queries and filtering of data.

Tasks 1003 can be defined to compare the expected subject system 133 user behavior with actual user behavior. The tasks 1003 express the expected subject system user behavior in the context of the presentation and application models.

Figure 35:
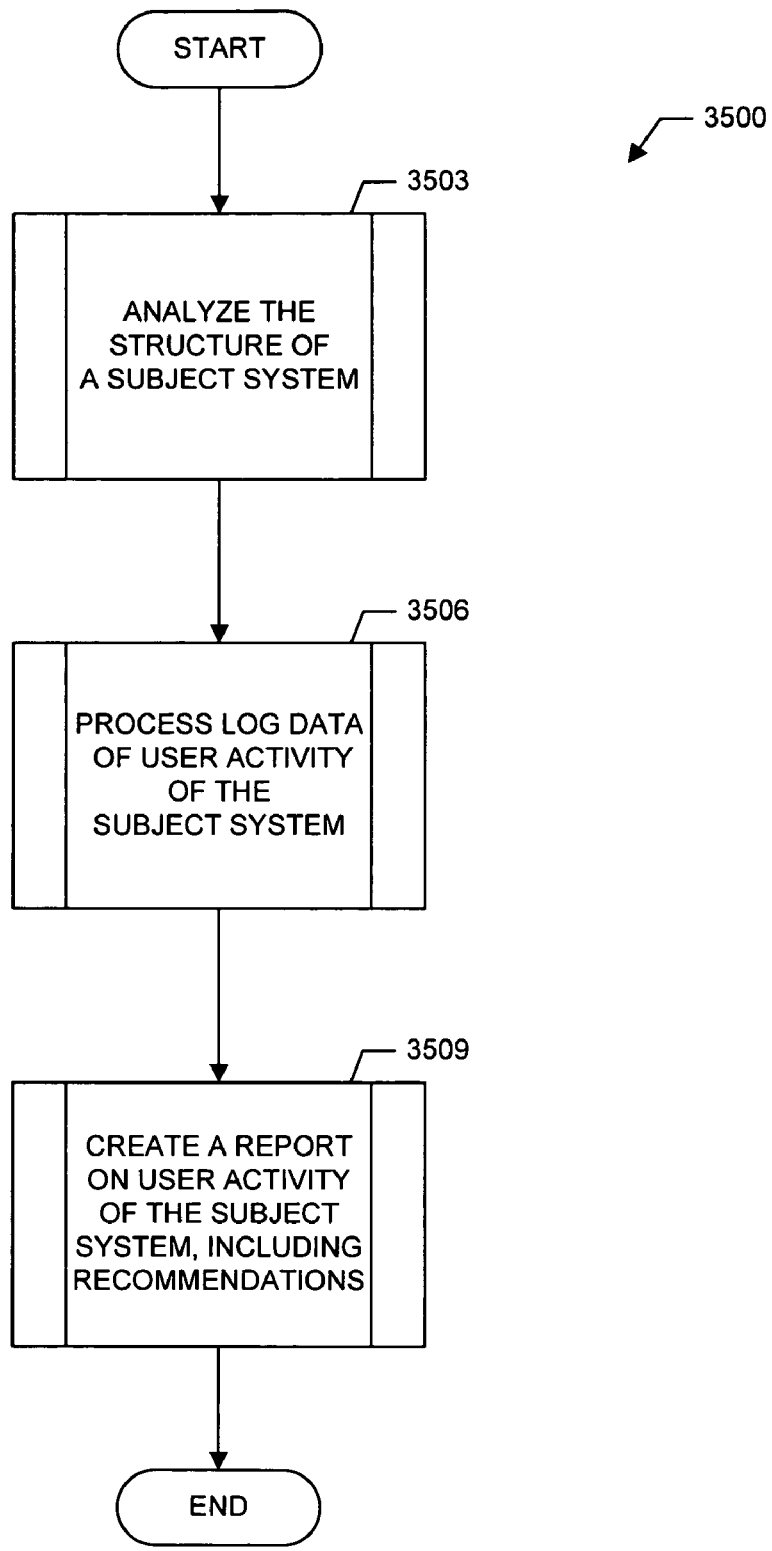
FIG. 35 displays a logic flow diagram representing a method of analyzing visitor activity of a subject system in accordance with some embodiments of the present invention.

FIG. 35 displays a logic flow diagram representing a method 3500 of analyzing visitor activity of a subject system 133 in accordance with some embodiments of the present invention. The activity analysis system 153 determines the structure of the subject system 133 in order to effectively evaluate user activity and, subsequently, provide recommendations to improve the subject system 133 based on the analyzed user activity.

The method 3500 of analyzing visitor activity of a subject system 133 begins at 3503 where the system modeling unit 312 analyzes the structure of the subject system 133. After the structure of the subject system 133 has been analyzed and defined, the logging unit 318, at 3506, processes log data of user activity of the subject system 133. User activity may include the steps or path the user takes to accomplish a task, the time spent visiting the subject system 133, and the other related activity. Once user activity has been processed or parsed by the logging unit 318, the reporting unit 315, at 3509, generates a report 903 on the user activity of the subject system 133, which can include recommendations of how to improve the subject system 133. Generally, improvement of the subject system 133 includes modifying the user interface 139 or application logic 136 of the subject system 133 to provide a more effective experience to the user visiting the subject system 133. The activity analysis system 153 then terminates operation in accordance to method 3500.

Figure 36:
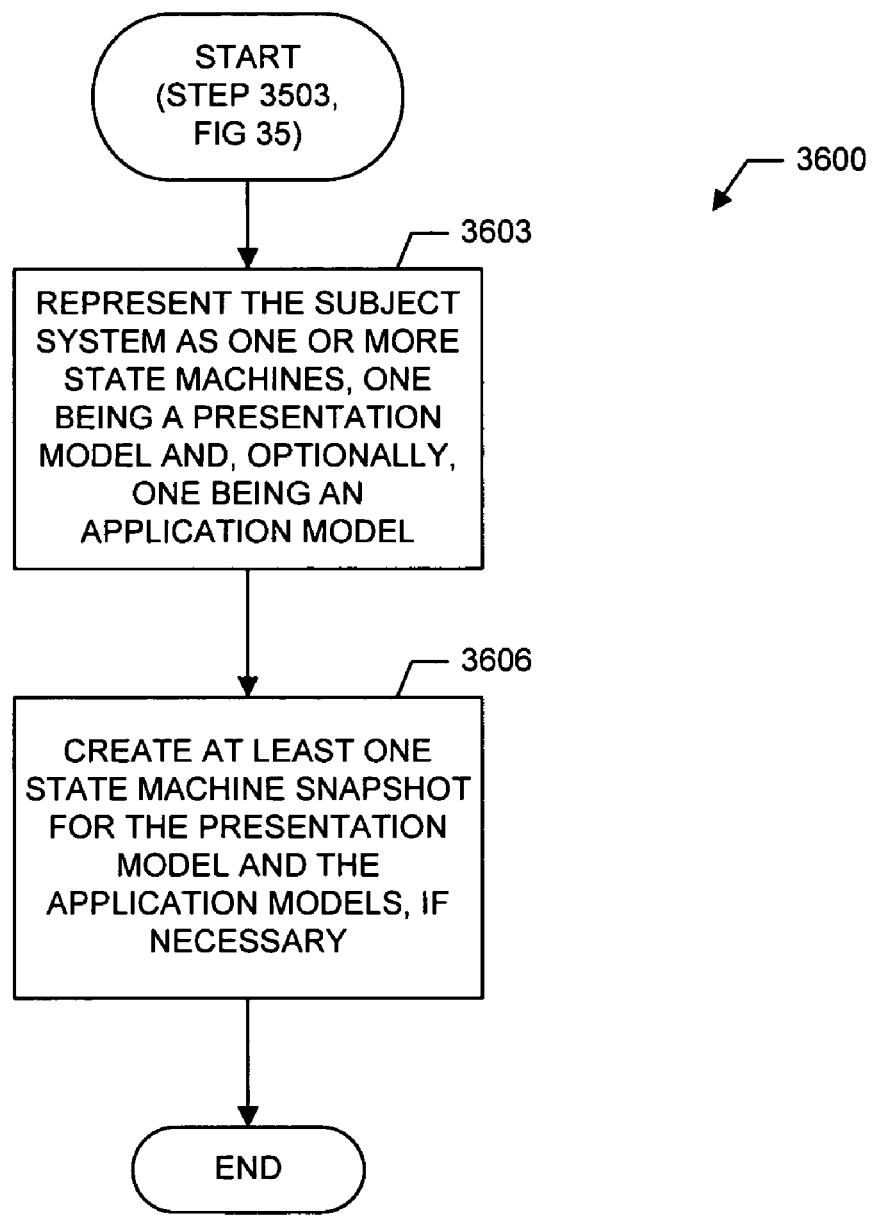
FIG. 36 displays a logic flow diagram representing a method of analyzing the structure of the subject system in accordance with some embodiments of the present invention.

FIG. 36 displays a logic flow diagram representing a method 3600 of analyzing the structure of the subject system 133 in accordance with some embodiments of the present invention. The system modeling unit 312, as illustrated in FIG. 35, analyzes the structure of the subject system 133. Analyzing the structure of the subject system 133 involves a decomposition of the subject system 133 into a presentation model 721 and application model 718, such that the presentation model 721 represents the user interface 139 of the subject system 133 and the presentation model 721 represents the application logic 136 of the subject system 133 used to facilitate user activity through the user interface 139. State machines 403 are generated for the application model 718 and the presentation model 721, whereby state machine snap shots 412 are recorded of the state machines 403. State machine snap shots 412 represent the state machine 403 at different times during development and use.

The method 3600 of analyzing the structure of the subject system 133 begins at 3606 where the system modeling unit 312 represents the subjects system 133 as at least one state machine 403, at least one of which is a presentation model 721, and optionally one or more application models 718. As described above, the presentation model 721 represents the user interface 139 of the subject system 133, while the application model 718 represents the application logic 136 behind the user interface 139 of the subject system 133. Next, at 3606, the system modeling unit 312 creates at least one state machine snapshot 412 for the presentation model 721 and may create at least one state machine snapshot 412 for each of the application models 718. Each state machine snapshot 412 generally comprises nodes and edges that represent the various steps of functionality of the subject system 133 and the paths that lead to and from each step, for a given period of time that the snapshot 412 represents. As the subject system 133 is modified, the presentation models 721 and application models 718 are altered to represent the modification by creating new state machine snapshots 412. The collection of state machine snapshots 412 representing a state machine 403 illustrates the evolution of the state machine 403 over a period of time (e.g., illustrates the modifications made to the subject system 133). The system modeling unit 312 then terminates operation in accordance with method 3600.

Figure 37:
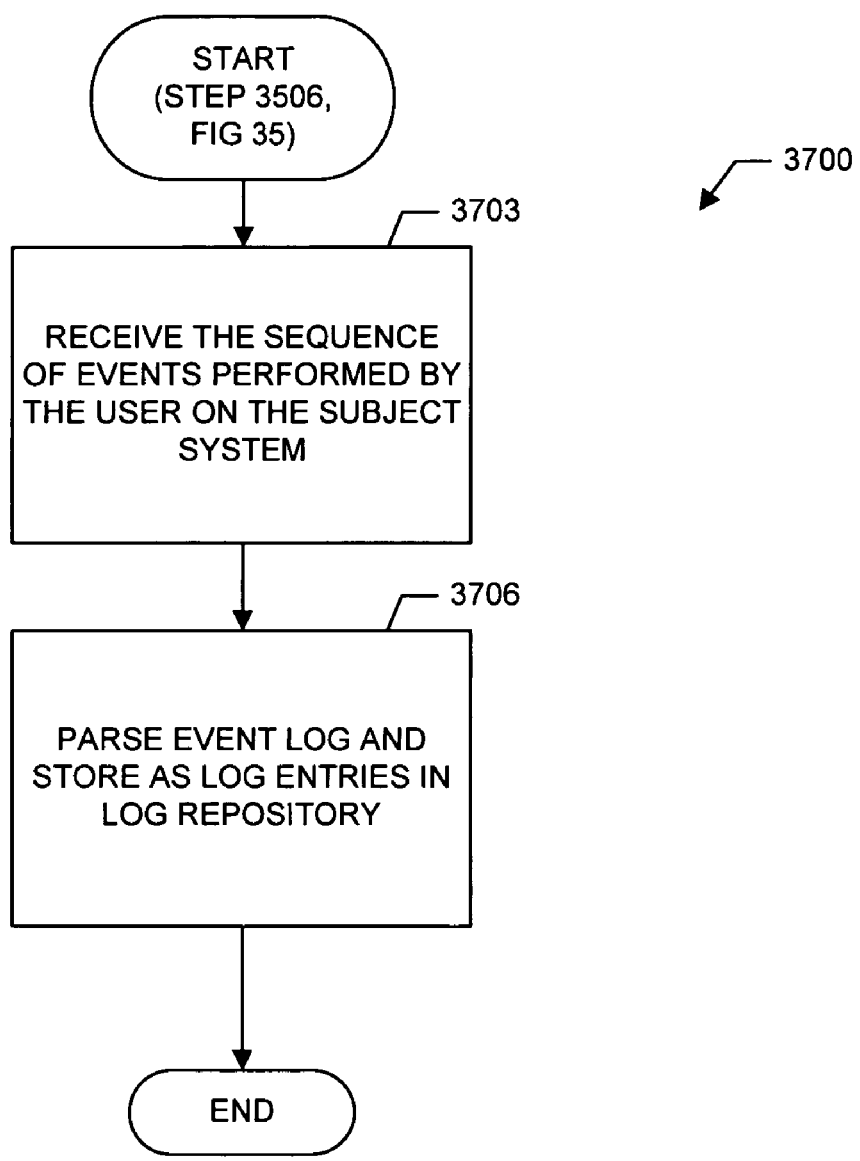
FIG. 37 displays a logic flow diagram representing a method of logging user activity of the subject system in accordance with some embodiments of the present invention.

FIG. 37 displays a logic flow diagram representing a method 3700 of logging user activity of the subject system 133 in accordance with some embodiments of the present invention. After the state machines 403 are generated to reflect the presentation model 721 and application model 718 of the subject system 133, user activity of the subject system 133 is monitored. The user activity is recorded as log data, so that the log data can be subsequently analyzed to determine the effectiveness of the subject system 133 with regard to the intended purpose of the subject system 133.

The method of logging user activity of the subject system 133 begins at 3703 where the logging unit 318 receives the sequence of events performed by a user on the subject system 133. The sequence of events of the user is generally referred to as user activity. Such user activity is useful in determining whether a desired task 1003 is being adequately performed on the subject system 133 or whether users find particular portions of the subject system 133 difficult to use.

Then, at 3706, the logging unit 318 parses the logged events and stores the parsed data as log entries 509 in the log repository 515. The logging unit 318 then terminates operation in accordance to method 3700.

Figure 38A:
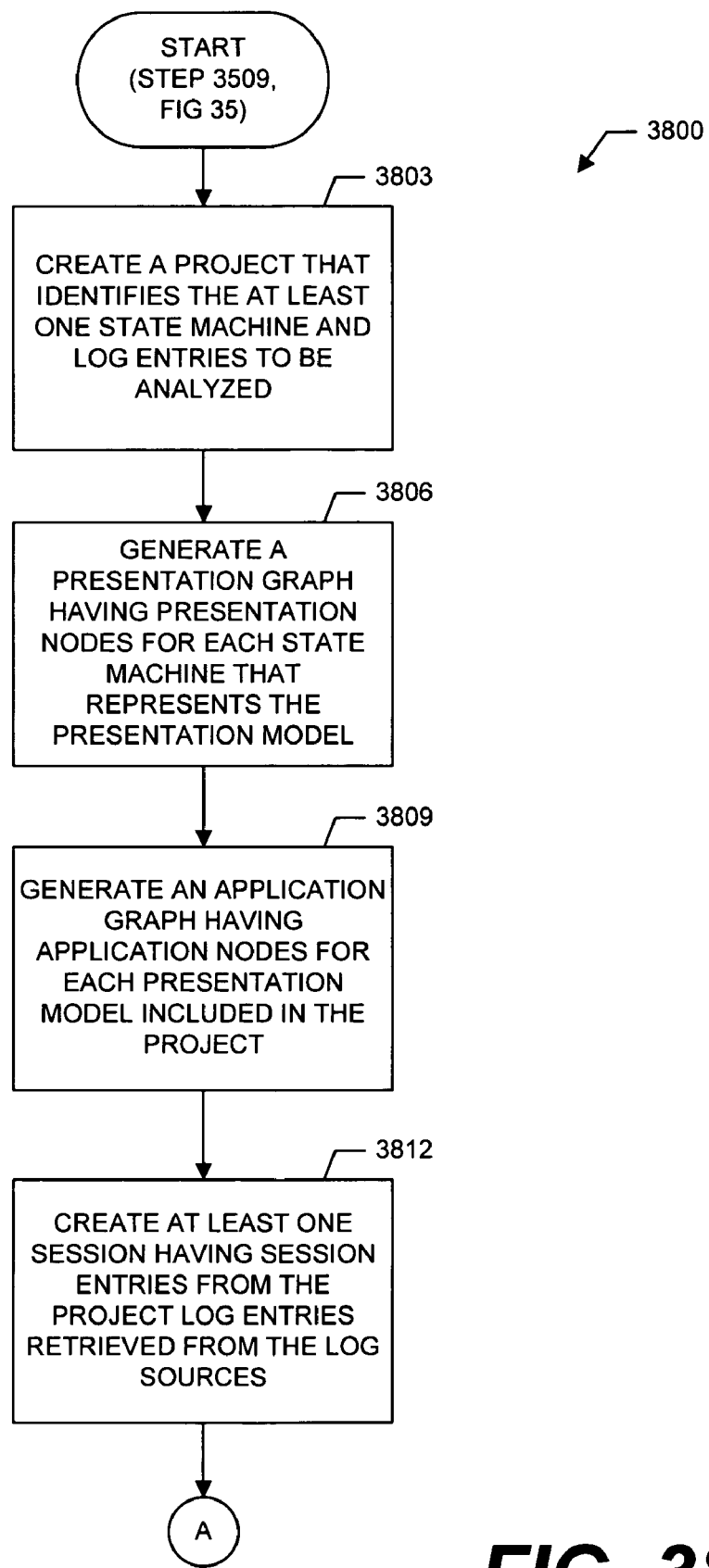
FIGS. 38A-38B, collectively known as FIG. 38, display a logic flow diagram representing a method of creating a report on user activity of a subject system in accordance with some embodiments of the present invention.
Figure 38B:
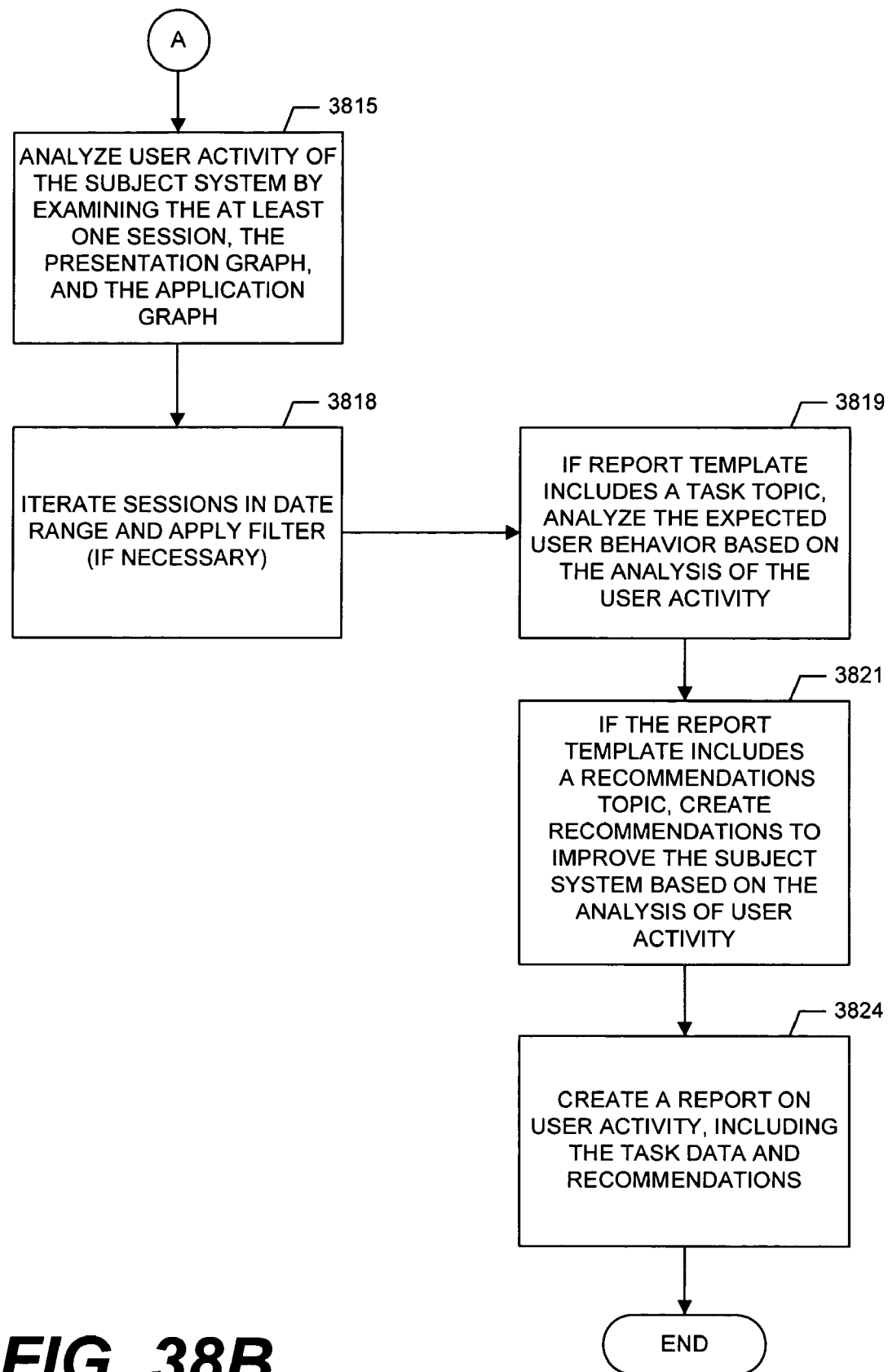

FIGS. 38A-38B, collectively known as FIG. 38, display a logic flow diagram representing a method 3800 of creating a report 903 on user activity of a subject system 133 in accordance with some embodiments of the present invention. Once the structure of the subject system 133 is determined and after a user's activity has been recorded, the activity analysis system 133 can analyze the activity of the user to determine whether the subject system 133 can be improved to reach its intended use. Such analysis can include the evaluation of whether a predetermined task 1003 within the subject system 133 has been completed by the user. Additionally, the analysis can include activity during sessions 803 (e.g., predetermined periods of time) of the subject system 133. Accordingly, a report 903 can be generated that provides significant data regarding user activity of a subject system 133 and with reference to tasks 1003 and sessions 803.

The method 3800 of creating a report 903 on user activity of a subject system 133 begins at 3803 where the project unit 321 creates a project 603 that identifies the state machines 403 and log entries 509 to be analyzed and reported upon. Next, at 3806, the graphs unit 324 generates a presentation graph 721, having nodes, for each presentation model 815 included in the project 603. The generated presentation graph 721 may be used within a report 903 to assist in reporting the results of the user activity analysis. At 3809, the graphs unit 324 generates an application graph 733, having application nodes, for each state machine 403 that represents the application model 718.

The generated application graph 721 may be used within a report 903 to assist in reporting the results of the user activity analysis.

At 3812, the session unit 330 creates at least one session 803, having session entries 806, from the log entries 509 retrieved from the log sources 503 within the project 603. Generally, each session 803 reflects continuous activity by a user of the subject system 133. A session 803 ends when a predetermined period of time has expired without any user activity of the subject system 133. Next, at 3815, the data management unit 306 analyzes the user activity of the subject system 133 by examining the sessions 803, presentation graph 721, and application graph 733. At 3818, the data management unit 306 iterates the sessions 803 within a date range and applies a report or session filter 833, if necessary. If the report template 906 being used to create the report 903 includes a task topic 1306, then, at 3819, the data management unit 306 utilizes the tasks unit 327 to analyze the expected user behavior based on the analysis of the user activity (e.g., analysis of the sessions 803, presentation graph 721, and application graph 733). If the report template 906 being used to create the report 903 includes a recommendation topic 1309, then, at 3821, the data management unit 306 utilizes the rule engine 309 to create recommendations to improve the subject system 133 based on the analysis of the user activity (e.g., analysis of the sessions 803, presentation graph 721, and application graph 733). Next, at 3824 the reporting unit 315 creates a report 903 on the user activity including the task data 1751 and recommendations. The reporting unit 315 generally includes the presentation graph 721 and application graph 733 within the report 903. The report 903 may then be viewed via a user interface 303. The reporting unit 315 then terminates operation in accordance with method 3800.

Whereas the present invention has been described in detail it is understood that variations and modifications can be effected within the spirit and scope of the invention, as described herein before and as defined in the appended claims. The corresponding structures, materials, acts, and equivalents of all mean-plus-function elements, if any, in the claims below are intended to include any structure, material, or acts for performing the functions in combination with other claimed elements as specifically claimed.

What is claimed is:

1. A system for analyzing user behavior of an interactive system, the system comprising:
   a system modeling unit adapted to model the interactive system into at least one state machine and to create at least one state machine snapshot corresponding to the at least one state machine;
   a logging unit adapted to parse at least one event corresponding to user behavior of the interactive system, wherein the logging unit creates at least one log entry for each event;
   a project unit adapted to identify a set of the at least one state machine and the at least one log entry;
   a graphs unit adapted to create at least one presentation graph and at least one application graph for the at least one state machine identified by the project unit;
   a sessions unit adapted to create at least one session having session entries from the at least one log entry; and
   a reporting unit adapted to analyze the at least one session, the at least one presentation graph, and the at least one application graph and to create a report including at least one recommendation based on the analysis, wherein the at least one recommendation corresponds to improving the interactive system.

2. A method for analyzing user behavior of an interactive system, the method comprising:
- analyzing a structure of the interactive system, the analyzing comprising:
  - representing the interactive system as at least one state machines, wherein a first state machine is a presentation model and an optional second state machine is an application model; and
  - creating at least one state machine snapshot for the presentation model and, if necessary, the application model;
- processing log data representing user activity of the interactive system; and
- creating a report on user activity of the interactive system, wherein the report includes recommendations to improve the interactive system based on the user activity.

3. The method of claim 2, wherein processing log data representing user activity of the interactive system comprises:
- receiving a sequence of events performed by a user on the interactive system; and
- parsing the sequence of events, wherein each event of the sequence of events is represented as a log entry.

4. The method of claim 3, wherein creating a report on user activity of the interactive system comprises:
- creating a project that identifies the at least one state machine and the log entries;
- generating a presentation graph having presentation nodes for each of the at least one state machine of the project that represents the presentation model;
- generating an application graph having application nodes for each of the at least one state machine of the project that represents the application model;
- creating at least one session having session entries corresponding to the log entries;
- examining the at least one session, the presentation graph, and the application graph;
- iterating the at least one session within a date range, wherein such iteration includes applying a filter to the at least one session;
- analyze expected user behavior based on the iteration, if a report template includes a task topic;
- create recommendations to improve the interactive system based on the iteration, if the report template includes a recommendation topic; and
- create a report on user activity, wherein the report includes the analysis of expected user behavior and the recommendations.

* * * * *